(12) United States Patent
Kim

(10) Patent No.: US 11,350,305 B2
(45) Date of Patent: May 31, 2022

(54) METHOD AND APPARATUS FOR PROCESSING DATA IN WIRELESS COMMUNICATION SYSTEM

(71) Applicant: Samsung Electronics Co., Ltd., Suwon-si (KR)

(72) Inventor: Donggun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 16/738,861

(22) Filed: Jan. 9, 2020

(65) Prior Publication Data

US 2020/0221329 A1    Jul. 9, 2020

(30) Foreign Application Priority Data

Jan. 9, 2019    (KR) .................. 10-2019-0003001
Jan. 15, 2019    (KR) .................. 10-2019-0005381
(Continued)

(51) Int. Cl.
*H04W 12/037*    (2021.01)
*H04W 12/041*    (2021.01)
(Continued)

(52) U.S. Cl.
CPC ..... *H04W 28/0263* (2013.01); *H04W 12/037* (2021.01); *H04W 12/041* (2021.01);
(Continued)

(58) Field of Classification Search
CPC ............ H04L 5/003–0098; H04W 12/009–80; H04W 28/02–26; H04W 72/04–10;
(Continued)

(56) References Cited

U.S. PATENT DOCUMENTS

2020/0252853 A1* 8/2020 Shi ..................... H04W 12/02
2020/0351749 A1* 11/2020 Tesanovic ......... H04W 28/0268
2021/0092667 A1* 3/2021 Zhu ................... H04W 28/0268

FOREIGN PATENT DOCUMENTS

WO    2018/147647 A1    8/2018

OTHER PUBLICATIONS

TSG RAN WG2, "LS on UL sharing applicability in different scenarios", 3GPP TSG-RAN WG2 Meeting #105, Feb. 25-Mar. 1, 2019, R2-1902822, 2 pages.
(Continued)

*Primary Examiner* — Timothy J Weidner

(57) ABSTRACT

A wireless node in a wireless communication system, the wireless node includes a transceiver and at least one controller coupled with the transceiver. The controller is configured to configure a first radio bearer connected to a first packet data convergence protocol (PDCP) layer and at least one second radio bearer connected to a radio link control (RLC) layer through a bandwidth allocation protocol (BAP) layer. The controller is also configured to configure a second PDCP layer for at least one radio bearer from among the at least one second radio bearer. The controller is further configured to process, at the second PDCP layer, at least one of a control message or data transmitted by the at least one radio bearer.

16 Claims, 34 Drawing Sheets

(30) Foreign Application Priority Data

| | | |
|---|---|---|
| Jan. 17, 2019 | (KR) | .......... 10-2019-0006435 |
| Jan. 25, 2019 | (KR) | .......... 10-2019-0010073 |
| Mar. 27, 2019 | (KR) | .......... 10-2019-0035120 |
| Dec. 27, 2019 | (KR) | .......... 10-2019-0176960 |

(51) Int. Cl.

| | |
|---|---|
| *H04W 12/0471* | (2021.01) |
| *H04W 12/106* | (2021.01) |
| *H04W 28/02* | (2009.01) |
| *H04W 28/06* | (2009.01) |
| *H04W 72/04* | (2009.01) |
| *H04W 76/12* | (2018.01) |
| *H04W 76/15* | (2018.01) |
| *H04W 80/02* | (2009.01) |
| *H04W 80/08* | (2009.01) |
| *H04W 84/04* | (2009.01) |
| *H04W 88/00* | (2009.01) |
| *H04W 88/08* | (2009.01) |
| *H04W 92/10* | (2009.01) |
| *H04W 92/20* | (2009.01) |

(52) U.S. Cl.
CPC ..... *H04W 12/0471* (2021.01); *H04W 12/106* (2021.01); *H04W 28/065* (2013.01); *H04W 72/0426* (2013.01); *H04W 72/0453* (2013.01); *H04W 76/12* (2018.02); *H04W 76/15* (2018.02); *H04W 80/02* (2013.01); *H04W 80/08* (2013.01); *H04W 84/045* (2013.01); *H04W 84/047* (2013.01); *H04W 88/005* (2013.01); *H04W 88/08* (2013.01); *H04W 92/10* (2013.01); *H04W 92/20* (2013.01)

(58) Field of Classification Search
CPC ..... H04W 76/10–50; H04W 80/02–12; H04W 84/005–22; H04W 88/005–188; H04W 92/02–24
See application file for complete search history.

(56) References Cited

OTHER PUBLICATIONS

Qualcomm, "CR to 38.300 on Integrated Access and Backhaul for NR", 3GPP TSG-RAN WG2 Meeting #105bis, Apr. 3-12, 2018, R2-1905476, 8 pages.

RAN2, "LS on clarification of CLI resource configuration", 3GPP TSG-RAN2 Meeting #108, Nov. 18-22, 2019, R2-1916645, 1 page.

\* cited by examiner

FIG. 1H
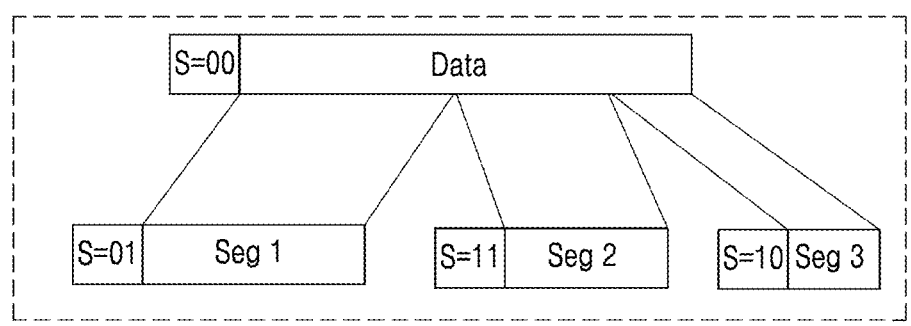
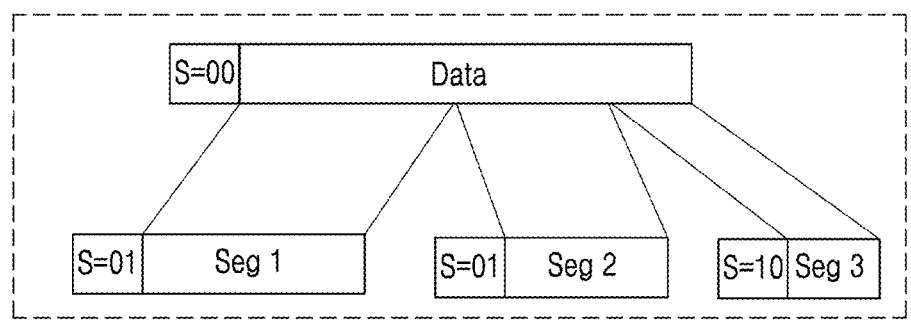
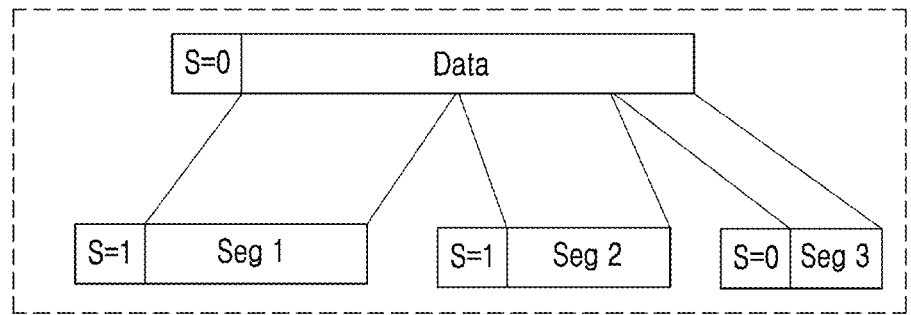

FIG. 2H-A
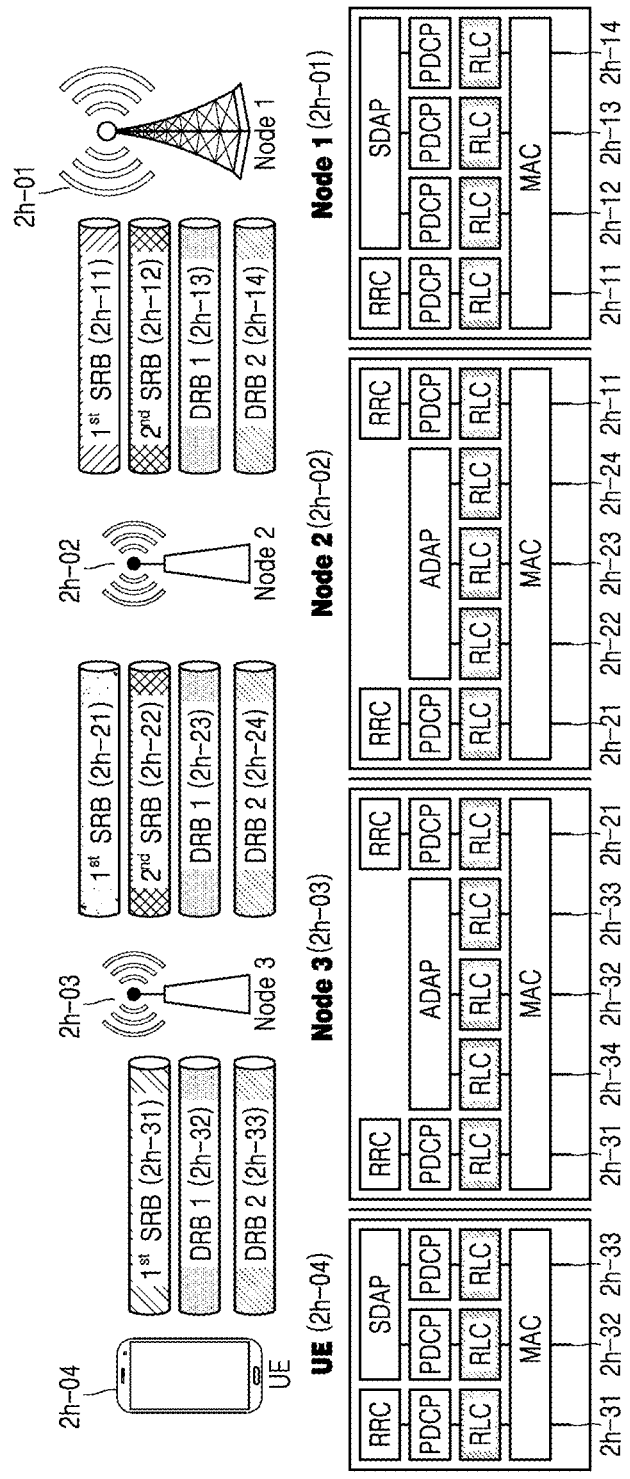

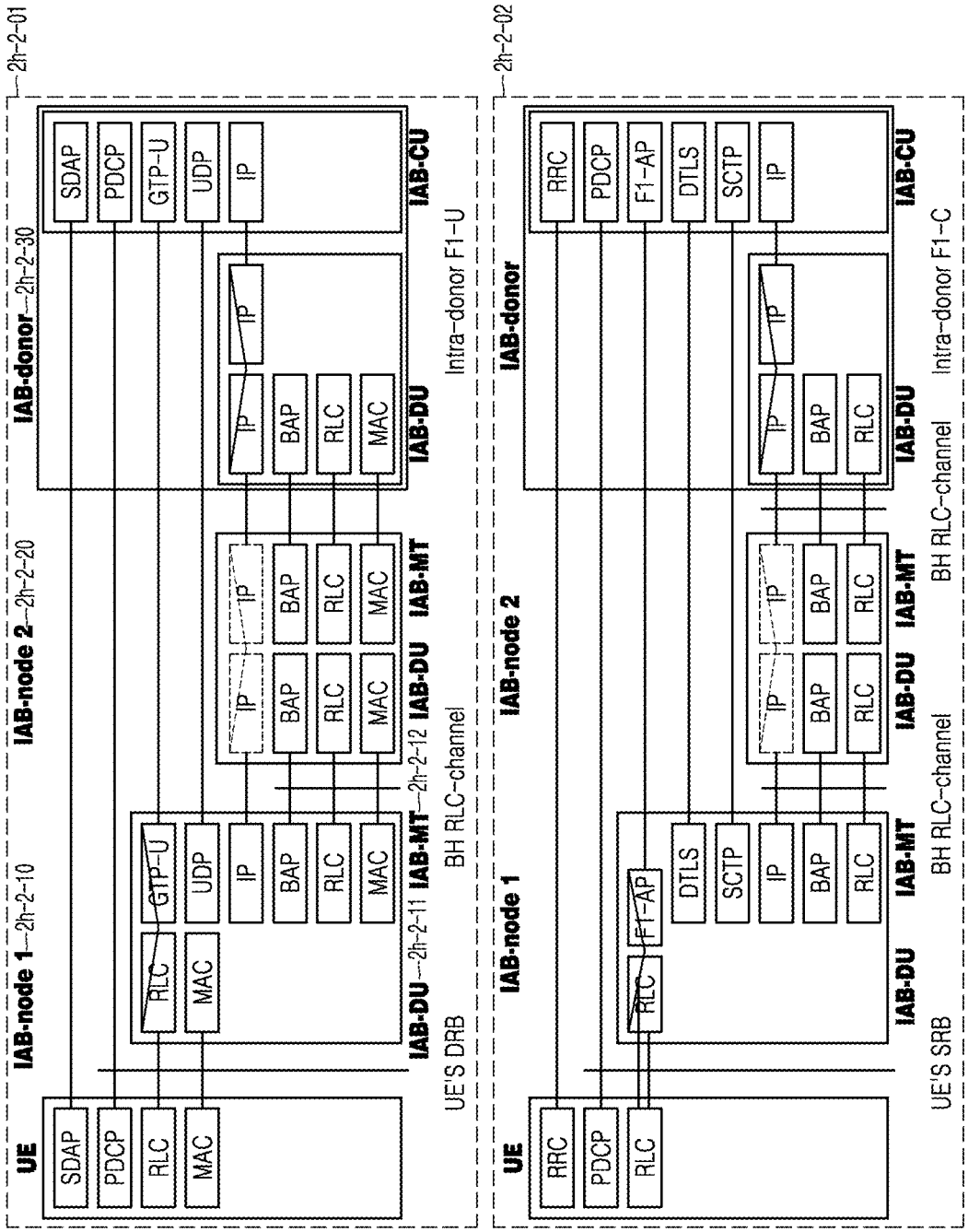
FIG. 2H-B

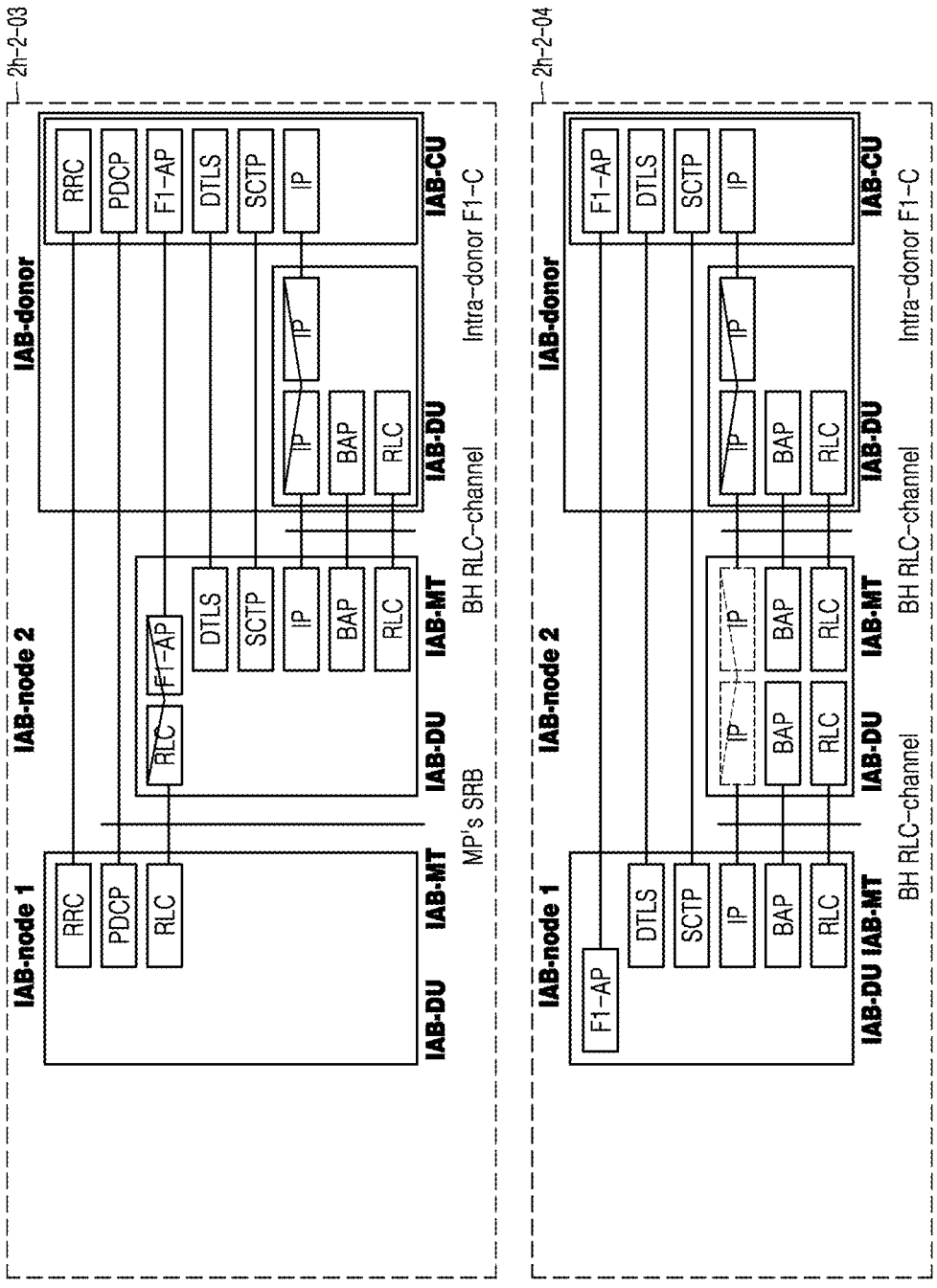
FIG. 2H-C

METHOD AND APPARATUS FOR PROCESSING DATA IN WIRELESS COMMUNICATION SYSTEM

CROSS-REFERENCE TO RELATED APPLICATIONS

This application is based on and claims priority under 35 U.S.C. § 119 to Korean Patent Application No. 10-2019-0003001 filed on Jan. 9, 2019, Korean Patent Application No. 10-2019-0005381 filed on Jan. 15, 2019, Korean Patent Application No. 10-2019-0006435 filed on Jan. 17, 2019, Korean Patent Application No. 10-2019-0010073 filed on Jan. 25, 2019, Korean Patent Application No. 10-2019-0035120 filed on Mar. 27, 2019, and Korean Patent Application No. 10-2019-0176960 filed on Dec. 27, 2019 in the Korean Intellectual Property Office, the disclosures of which are incorporated by reference herein in their entirety.

BACKGROUND

1. Field

The disclosure relates to a method and apparatus for processing data in a wireless communication system.

2. Description of Related Art

To meet increasing demand with respect to wireless data traffic after the commercialization of $4^{th}$ generation (4G) communication systems, efforts have been made to develop $5^{th}$ generation (5G) or pre-5G communication systems. For this reason, 5G or pre-5G communication systems are called 'beyond 4G network' communication systems or 'post long term evolution (post-LTE)' systems. A 5G communication system defined in 3GPP is called a New Radio (NR) system. To achieve high data rates, implementation of 5G communication systems in an ultra-high frequency or millimeter-wave (mmWave) band (e.g., a 60-GHz band) is being considered. To reduce path loss and increase a transmission distance in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas have been studied and applied to the NR system. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication, such as sensor networks, M2M, MTC, etc., are being implemented by a scheme such as beamforming, MIMO, and array antennas, and so forth. Application of cloud radio access network (Cloud-RAN) as the above-described big data processing technology may be an example of convergence of 5G communication technology and IoT technology.

Various services may be provided due to the aforementioned technical features and the development of mobile communication systems, such that methods for effectively providing these services are required.

SUMMARY

Provided are an apparatus and method for effectively providing a service in a mobile communication system.

Additional aspects will be set forth in part in the description which follows and, in part, will be apparent from the description, or may be learned by practice of the presented embodiments of the disclosure.

According to an embodiment of the disclosure, a wireless node in a wireless communication system includes a transceiver; and at least one controller coupled with the transceiver and configured to: configure a first radio bearer connected to a first packet data convergence protocol (PDCP) layer and at least one second radio bearer connected to a radio link control (RLC) layer through a backhaul adaptation protocol (BAP) layer; configure a second PDCP layer for at least one radio bearer from among the at least one second radio bearer; and process, at the second PDCP layer, at least one of a control message or data transmitted by the at least one radio bearer.

The second PDCP layer may be configured for each of the at least one radio bearer from among the at least one second radio bearer.

The at least one controller may be further configured to: perform, at the first PDCP layer, ciphering and deciphering process or integrity protection and verification on a control message for network connection or network access, the control message being transmitted through the first radio bearer, wherein the first radio bearer may include a signaling radio bearer (SRB) for transmitting the control message.

The at least one controller may be further configured to: perform, at the second PDCP layer, ciphering and deciphering process or integrity protection and verification on the control message and the data transmitted through the at least one second radio bearer, wherein the at least one second radio bearer may include at least one of a SRB for transmitting the control message between the wireless node and a uppermost node, and a data radio bearer (DRB) for transmitting the data to a next wireless node.

The at least one controller may be further configured to: receive, from an upper node, configuration information about the second PDCP layer; and configure the second PDCP layer for the at least one radio bearer from among the at least one second radio bearer, based on the configuration information.

The at least one controller may be further configured to: receive a configuration for a new security key for the second PDCP layer, use a preset security key for the wireless node as the new security key, or generate the new security key based on the preset security key for the wireless node.

The at least one controller may be further configured to: cipher complete data including an service data adaptation protocol (SDAP) header received from an upper layer, cipher data received from the upper layer except for the SDAP header, or cipher a header of the upper layer.

The at least one controller may be further configured to: map, at the BAP layer, an RLC channel received by at least one receiving RLC layer to at least one transmitting RLC layer.

According to another embodiment of the disclosure, a communication method performed by a wireless node in a wireless communication system includes configuring a first radio bearer connected to a first packet data convergence protocol (PDCP) layer and at least one second radio bearer connected to a radio link control (RLC) layer through a backhaul adaptation protocol (BAP) layer; configuring a second PDCP layer for at least one radio bearer from among the at least one second radio bearer; and processing, at the second PDCP layer, at least one of a control message or data transmitted by the at least one radio bearer.

The second PDCP layer may be configured for each of the at least one radio bearer from among the at least one second radio bearer.

The communication method may further include performing, at the first PDCP layer, ciphering and deciphering process or integrity protection and verification on a control message for network connection or network access, the control message being transmitted through the first radio bearer, wherein the first radio bearer may include a signaling radio bearer (SRB) for transmitting the control message.

The communication method may further include performing, at the second PDCP layer, ciphering and deciphering process or integrity protection and verification on the control message and the data transmitted through the at least one second radio bearer, wherein the at least one second radio bearer may include at least one of a SRB for transmitting the control message between the wireless node and a uppermost node, and a data radio bearer (DRB) for transmitting the data to a next wireless node.

The communication method may further include receiving, from an upper node, configuration information about the second PDCP layer; and configuring the second PDCP layer for the at least one radio bearer from among the at least one second radio bearer, based on the configuration information.

The processing, at the second PDCP layer, of at least one of the control message or the data transmitted by the at least one radio bearer may include receiving a configuration for a new security key for the second PDCP layer, using a preset security key for the wireless node as the new security key, or generating the new security key based on the preset security key for the wireless node.

The processing, at the second PDCP layer, of at least one of the control message or the data transmitted by the at least one radio bearer may include ciphering complete data including an service data adaptation protocol (SDAP) header received from an upper layer, ciphering data received from the upper layer except for the SDAP header, or ciphering a header of the upper layer.

The communication method may further include mapping, at the BAP layer, an RLC channel received by at least one receiving RLC layer to at least one transmitting RLC layer.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1H illustrates a detailed segmentation and reassembly method with respect to the first embodiment of the method of segmenting and reassembling upper layer data, according to an embodiment of the disclosure;

FIG. 1O illustrates operations of a transmitting end of a UE with respect to the method of segmenting and reassembling upper layer data, according to an embodiment of the disclosure;

FIG. 2H-A illustrates a diagram of a method of managing and processing bearers of radio nodes, the method being performed in the NR or 5G mobile communication system supporting wireless backhaul, according to an embodiment of the disclosure;

FIG. 2H-B and FIG. 2H-C illustrate a detailed embodiment of FIG. 2H-A, in which different types of data are differently processed or data is processed by different protocol layers and is transmitted, received or transferred in a wireless backhaul (IAB) network environment, according to an embodiment of the disclosure;

DETAILED DESCRIPTION

Figure 1A:
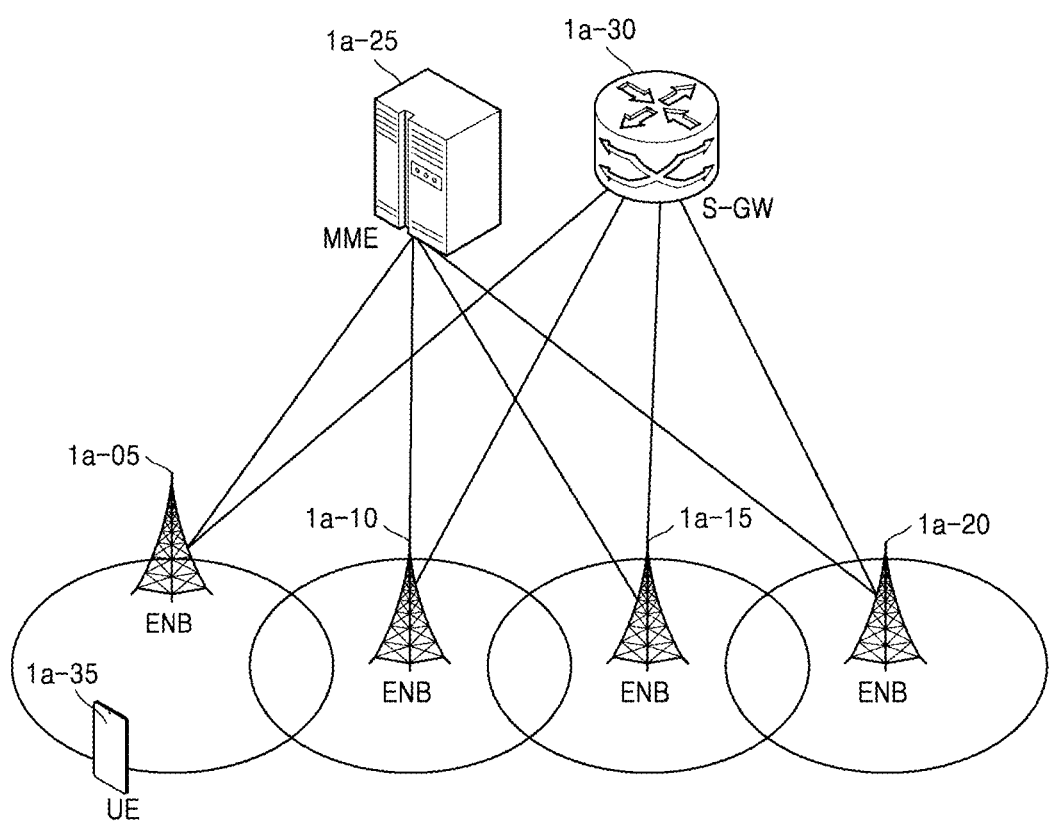
FIG. 1A illustrates a diagram of a configuration of a long term evolution (LTE) system to which an embodiment of the disclosure is applied.

FIGS. 1A through 2N, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Embodiments of the disclosure will now be described more fully with reference to the accompanying drawings. In the following description of embodiments of the disclosure, descriptions of techniques that are well known in the art and not directly related to the disclosure are omitted. This is to clearly convey the gist of the disclosure by omitting an unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. In the specification, the same elements are denoted by the same reference numerals.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block or blocks. The computer program instructions may also be stored in a computer usable or computer-readable memory that may direct the computer or other programmable data processing apparatus to function in a particular manner, such that the instructions stored in the computer usable or computer-readable memory produce an article of manufacture including instruction means that perform the functions specified in the flowchart block or blocks. The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term " . . . unit", as used in the present embodiment of the disclosure refers to a software or hardware component, such as field-programmable gate array (FPGA) or application-specific integrated circuit (ASIC), which performs certain tasks. However, the term " . . . unit" does not mean to be limited to software or hardware. A " . . . unit" may be configured to be in an addressable storage medium or configured to operate one or more processors. Thus, a " . . . unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and " . . . units" may be combined into fewer components and " . . . units" or may be further separated into additional components and " . . . units". Further, the components and " . . . units" may be implemented to operate one or more central processing units (CPUs) in a device or a secure multimedia card. Also, a " . . . unit" may include one or more processors in embodiments of the disclosure.

Hereinafter, terms identifying an access node, terms indicating network entities, terms indicating messages, terms indicating an interface between network entities, and terms indicating various pieces of identification information, as used in the following description, are exemplified for convenience of explanation. Accordingly, the disclosure is not limited to terms to be described below, and other terms indicating objects having equal technical meanings may be used.

For convenience of description, in the disclosure, terms and names or modifications of the terms and names defined in the 3rd Generation Partnership Project Long Term Evolution (3GPP LTE) standard are used therein. However, the disclosure is not limited to the terms and names, and may also be applied to systems following other standards. In the disclosure, an evolved node B (eNB) may be interchangeably used with a next-generation node B (gNB) for convenience of explanation. That is, a base station (BS) described by an eNB may represent a gNB. In the disclosure, the term "terminals" may refer to not only mobile phones, narrowband Internet of Things (NB-IoT) devices, and sensors but also other wireless communication devices.

In a next-generation mobile communication system, a base station may provide a service to a terminal based on a beam and may support various functions, such that a size of a radio resource control (RRC) message including not only beam-related configuration information for configuration of the terminal but also including configuration information about the various functions may be significantly increased. Also, the next-generation mobile communication system is requested to support processing of a plurality of items of massive data so as to provide various services and service a high data transmission rate.

A Packet Data Convergence Protocol (PDCP) layer is configured with a processable maximum size of data received from an upper layer. For example, a PDCP layer in the next-generation mobile communication system may support a size of maximally up to 9 kilobytes (KB) with respect to one data. Therefore, for example, when a size of an RRC message received from an RRC layer or a size of user layer data received from an upper layer such as a Transmission Control Protocol (TCP)/Internet Protocol (IP) or a User Datagram Protocol (UDP) is greater than a maximum size (e.g., 9 KB) supported by the PDCP layer, the PDCP layer cannot process the data.

FIG. 1A illustrates a diagram of a configuration of an LTE system to which an embodiment of the disclosure is applied.

Referring to FIG. 1A, a radio access network (RAN) of the LTE system may include a plurality of evolved nodes B (eNBs) (or nodes B or base stations) 1a-05, 1a-10, 1a-15, and 1a-20, a mobility management entity (MME) 1a-25, and a serving-gateway (S-GW) 1a-30. A UE (or a terminal) 1a-35 may access an external network via the eNB 1a-05, 1a-10, 1a-15, or 1a-20 and the S-GW 1a-30.

In FIG. 1A, the eNB 1a-05, 1a-10, 1a-15, or 1a-20 may correspond to an existing node B of a universal mobile telecommunications system (UMTS). The eNB 1a-05, 1a-10, 1a-15, or 1a-20 is connected to the UE 1a-35 through wireless channels and performs complex functions compared to the existing node B. All user traffic data including real-time services such as voice over Internet protocol (VoIP) may be serviced through shared channels in the LTE system, and thus an entity for collating status information, e.g., buffer status information, available transmission power status information, and channel state information, of UEs and performing scheduling may be required and the eNB 1a-05, 1a-10, 1a-15, or 1a-20 may operate as such an entity. One eNB generally may control a plurality of cells. For example, the LTE system may use radio access technology such as Orthogonal Frequency Division Multiplexing (OFDM) at a bandwidth of 20 MHz to achieve a data rate of 100 Mbps. The eNB may also use adaptive modulation & coding (AMC) to determine a modulation scheme and a channel coding rate in accordance with a channel state of the UE 1a-35. The S-GW 1a-30 is an entity for providing data bearers and may establish and release the data bearers by the control of the MME 1a-25. The MME 1a-25 is an entity for performing a mobility management function and various control functions on the UE 1a-35 and is connected to the plurality of eNBs 1a-05, 1a-10, 1a-15, and 1a-20.

Figure 1B:
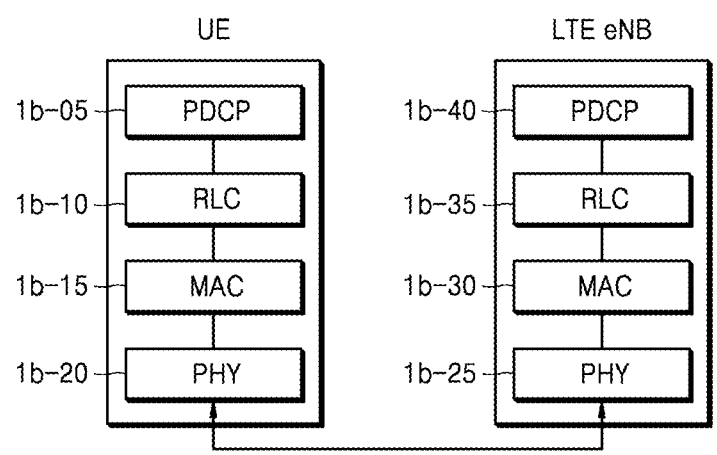
FIG. 1B illustrates a diagram of a radio protocol architecture of an LTE system to which an embodiment of the disclosure is applied.

FIG. 1B illustrates a diagram of a radio protocol architecture of an LTE system to which an embodiment of the disclosure is applied.

Referring to FIG. 1B, the radio protocol architecture of the LTE system may include PDCP layers 1b-05 and 1b-40, Radio Link Control (RLC) layers 1b-10 and 1b-35, and Medium Access Control (MAC) layers 1b-15 and 1b-30 respectively for a UE and an eNB. The PDCP layer 1b-05 or 1b-40 may perform, for example, IP header compression/decompression. Main functions of the PDCP layer 1b-05 or 1b-40 may be summarized as shown below.

Header compression and decompression: robust header compression (ROHC) only

Transfer of user data

In-sequence delivery of upper layer packet data units (PDUs) at PDCP re-establishment procedure for RLC acknowledged mode (AM)

For split bearers in DC (only support for RLC AM): PDCP PDU routing for transmission and PDCP PDU reordering for reception Duplicate detection of lower layer service data units (SDUs) at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink The RLC layer 1b-10 or 1b-35 may perform an automatic repeat request (ARQ) operation by reconfiguring PDCP PDUs to appropriate sizes. Main functions of the RLC layer 1b-10 or 1b-35 may be summarized as shown below.

Transfer of upper layer PDUs

Error correction through ARQ (only for AM data transfer)

Concatenation, segmentation and reassembly of RLC SDUs (only for unacknowledged mode (UM) and AM data transfer)

Re-segmentation of RLC data PDUs (only for AM data transfer)

Reordering of RLC data PDUs (only for UM and AM data transfer)

Duplicate detection (only for UM and AM data transfer)

Protocol error detection (only for AM data transfer)

RLC SDU discard (only for UM and AM data transfer)

RLC re-establishment

The MAC layer 1b-15 or 1b-30 may be connected to a plurality of RLC layers configured for one UE and may multiplex RLC PDUs into a MAC PDU and may demultiplex the RLC PDUs from the MAC PDU. Main functions of the MAC layer 1b-15 or 1b-30 may be summarized as shown below.

Mapping between logical channels and transport channels

Multiplexing/demultiplexing of MAC SDUs belonging to one or different logical channels into/from transport blocks (TBs) delivered to/from the physical layer on transport channels Scheduling information reporting Error correction through hybrid ARQ (HARQ)

Priority handling between logical channels of one UE

Priority handling between UEs by means of dynamic scheduling

Multimedia broadcast/multicast service (MBMS) service identification

Transport format selection

Padding

A physical (PHY) layer 1b-20 or 1b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer.

Figure 1C:
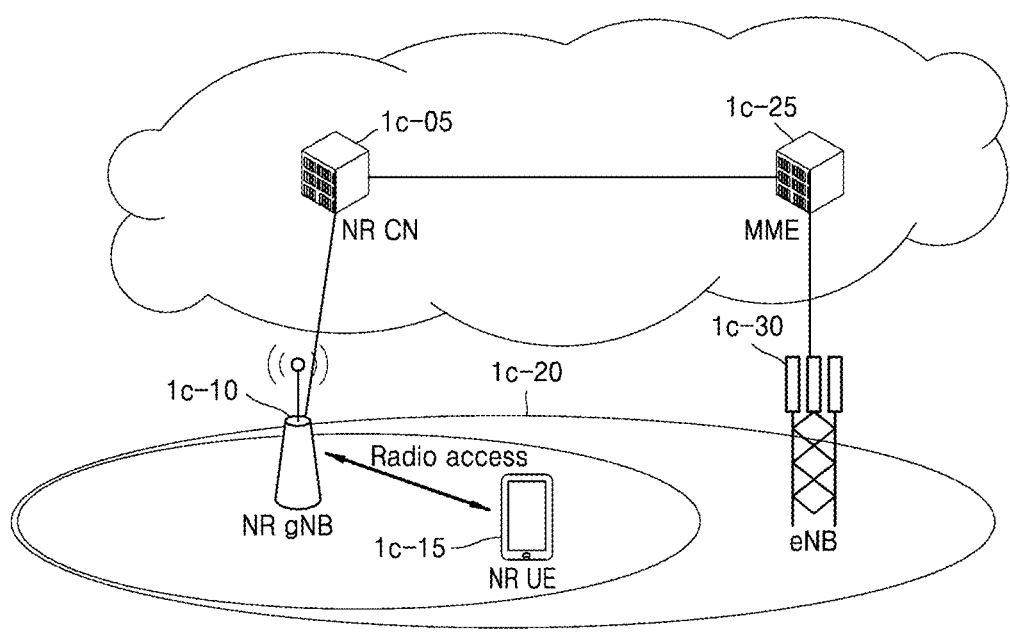
FIG. 1C illustrates a diagram of a next-generation mobile communication system to which an embodiment of the disclosure is applied.

FIG. 1C illustrates a diagram of a next-generation mobile communication system to which an embodiment of the disclosure is applied.

Referring to FIG. 1C, a radio access network of the next-generation mobile communication system (hereinafter, referred to as the NR or 5G communication system) includes a new radio node B (NR gNB, NR NB, or gNB) 1c-10 and a new radio core network (NR CN) 1c-05. A NR UE (or terminal) 1c-15 may access an external network via the NR gNB 1c-10 and the NR CN 1c-05.

In FIG. 1C, the NR gNB 1c-10 may correspond to an existing eNB of an LTE system. The NR gNB 1c-10 may be connected to the NR UE 1c-15 through wireless channels and may provide superior services compared to an existing node B. All user traffic data may be serviced through shared channels in the NR or 5G mobile communication system, and thus, an entity for collating buffer status information of UEs, available transmission power status information, and channel state information and performing scheduling may be required and the NR gNB 1c-10 may operate as such an entity. The NR gNB 1c-10 generally controls a plurality of cells. The NR or 5G communication system may have a bandwidth greater than the maximum bandwidth of the existing LTE system so as to achieve an ultrahigh data rate, compared to the existing LTE system, and may use OFDM as a radio access technology and may additionally use a beamforming technology. The NR gNB 1c-10 may use AMC to determine a modulation scheme and a channel coding rate in accordance with a channel state of the NR UE 1c-15. The NR CN 1c-05 may perform functions such as mobility support, bearer configuration, and quality of service (QoS) configuration. The NR CN 1c-05 may be an entity for performing a mobility management function and various control functions on the NR UE 1c-15 and may be connected to a plurality of base stations. The NR or 5G mobile communication system may cooperate with the existing LTE system, and the NR CN 1c-05 may be connected to an MME 1c-25 through a network interface. The MME 1c-25 may be connected to an existing eNB 1c-30.

Figure 1D:
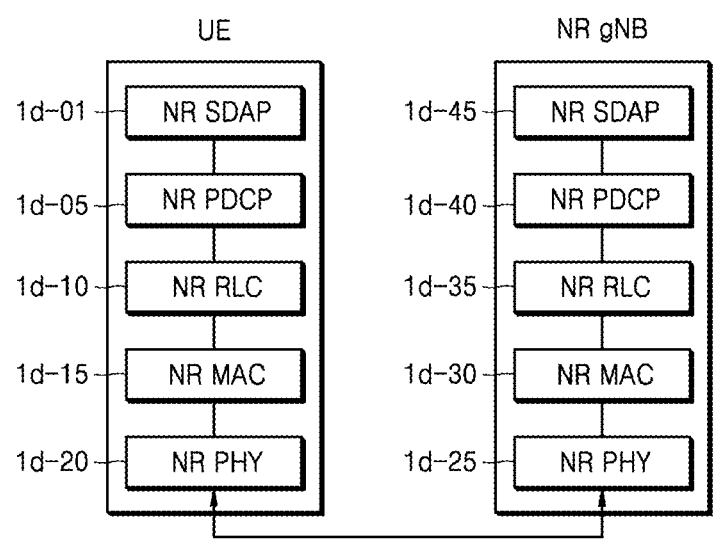
FIG. 1D illustrates a diagram of a radio protocol architecture of a New Radio (NR) or 5$^{th}$ generation (5G) mobile communication system to which an embodiment of the disclosure is applied.

FIG. 1D illustrates a diagram of a radio protocol architecture of the NR or 5G mobile communication system to which an embodiment of the disclosure is applied.

Referring to FIG. 1D, the radio protocol architecture of the NR or 5G mobile communication system may include NR Service Data Adaptation Protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR gNB. Main functions of the NR SDAP entity 1d-01 or 1d-45 may include some of the following functions.

Transfer of user plane data
Mapping between a QoS flow and a Data Radio Bearers (DRB) for both downlink (DL) and uplink (UL)
Marking QoS flow identifier (ID) in both DL and UL packets
Reflective QoS flow to DRB mapping for the UL SDAP PDUs With regard to a SDAP layer, information about whether to use a header of the SDAP layer or to use functions of the SDAP layer may be configured for the UE by using an RRC message per PDCP layer, per bearer, or per logical channel. When the SDAP header of the SDAP layer is configured, the UE may direct to update or reconfigure UL and DL QoS flow and data bearer mapping information by using a 1-bit non access stratum (NAS) reflective QoS indicator and a 1-bit access stratum (AS) reflective QoS indicator of the SDAP header. The SDAP header may include QoS flow ID information indicating QoS. The QoS information may be used as data processing priority information or scheduling information for appropriately supporting a service.

Main functions of the NR PDCP layer 1d-05 or 1d-40 may include some of the following functions.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink The reordering function of the NR PDCP layer 1d-05 or 1d-40 may include a function of reordering PDCP PDUs based on PDCP sequence numbers (SNs), the PDCP PDUs being received from a lower layer, and a function of delivering the reordered data to an upper layer in order. Alternatively, the reordering function of the NR PDCP layer 1d-05 or 1d-40 may include at least one of a function of immediately delivering the received PDCP PDUs without consideration of their orders, a function of recording missing PDCP PDUs by reordering the received PDCP PDUs, a function of reporting status information of the missing PDCP PDUs to a transmitter, or a function of requesting retransmission of the missing PDCP PDUs.

Main functions of the NR RLC layer 1d-10 or 1d-35 may include some of the following functions.

Transfer of upper layer PDUs
In-sequence delivery of upper layer PDUs
Out-of-sequence delivery of upper layer PDUs
Error correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In this regard, the in-sequence delivery function of the NR RLC layer 1d-10 or 1d-35 indicates a function of delivering RLC SDUs received from a lower layer to an upper layer in order. The in-sequence delivery function of the NR RLC layer 1d-10 or 1d-35a may include at least one of a function of reassembling the RLC SDUs and delivering the reassembled RLC SDU when a plurality of RLC SDUs segmented from one RLC SDU are received, a function of reordering received RLC PDUs based on RLC SNs or PDCP SNs, a function of recording missing RLC PDUs by reordering the received RLC PDUs, a function of reporting status information of the missing RLC PDUs to a transmitter, a function of requesting retransmission of the missing RLC PDUs, a function of delivering only RLC SDUs prior to a missing RLC SDU, to an upper layer in order when the missing RLC SDU exists, or a function of delivering all RLC SDUs received before a timer starts, to an upper layer in order although a missing RLC SDU exists when a preset timer stops.

The in-sequence delivery function of the NR RLC layer 1d-10 or 1d-35a may process the RLC PDUs in order of reception and deliver the RLC PDUs to the NR PDCP layer 1d-05 or 1d-40 regardless of SNs (out-of-sequence delivery), and when a segment is received, the in-sequence delivery function of the NR RLC layer 1d-10 or 1d-35 may reassemble the segment with other segments stored in a buffer or subsequently received, into a whole RLC PDU and deliver the RLC PDU to the NR PDCP layer 1d-05 or 1d-40. The NR RLC layer 1d-10 or 1d-35 may not have a concatenation function, and the concatenation function may be performed by the NR MAC layer 1*d*-15 or 1*d*-30 or be replaced with a multiplexing function of the NR MAC layer 1*d*-15 or 1*d*-30.

The out-of-sequence delivery function of the NR RLC layer 1*d*-10 or 1*d*-35 may include a function of directly delivering RLC SDUs received from a lower layer, to an upper layer out of order. The out-of-sequence delivery function of the NR RLC layer 1*d*-10 or 1*d*-35 may include at least one of a function of reassembling a plurality of RLC SDUs segmented from one RLC SDU and delivering the reassembled RLC SDU when the segmented RLC SDUs are received, or a function of recording missing RLC PDUs by storing RLC SNs or PDCP SNs of received RLC PDUs and reordering the received RLC PDUs.

The NR MAC layer 1*d*-15 or 1*d*-30 may be connected to a plurality of NR RLC layers configured for one UE, and main functions of the NR MAC layer 1*d*-15 or 1*d*-30 may include some of the following functions.

Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 1*d*-20 or 1*d*-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer.

Figure 1E:
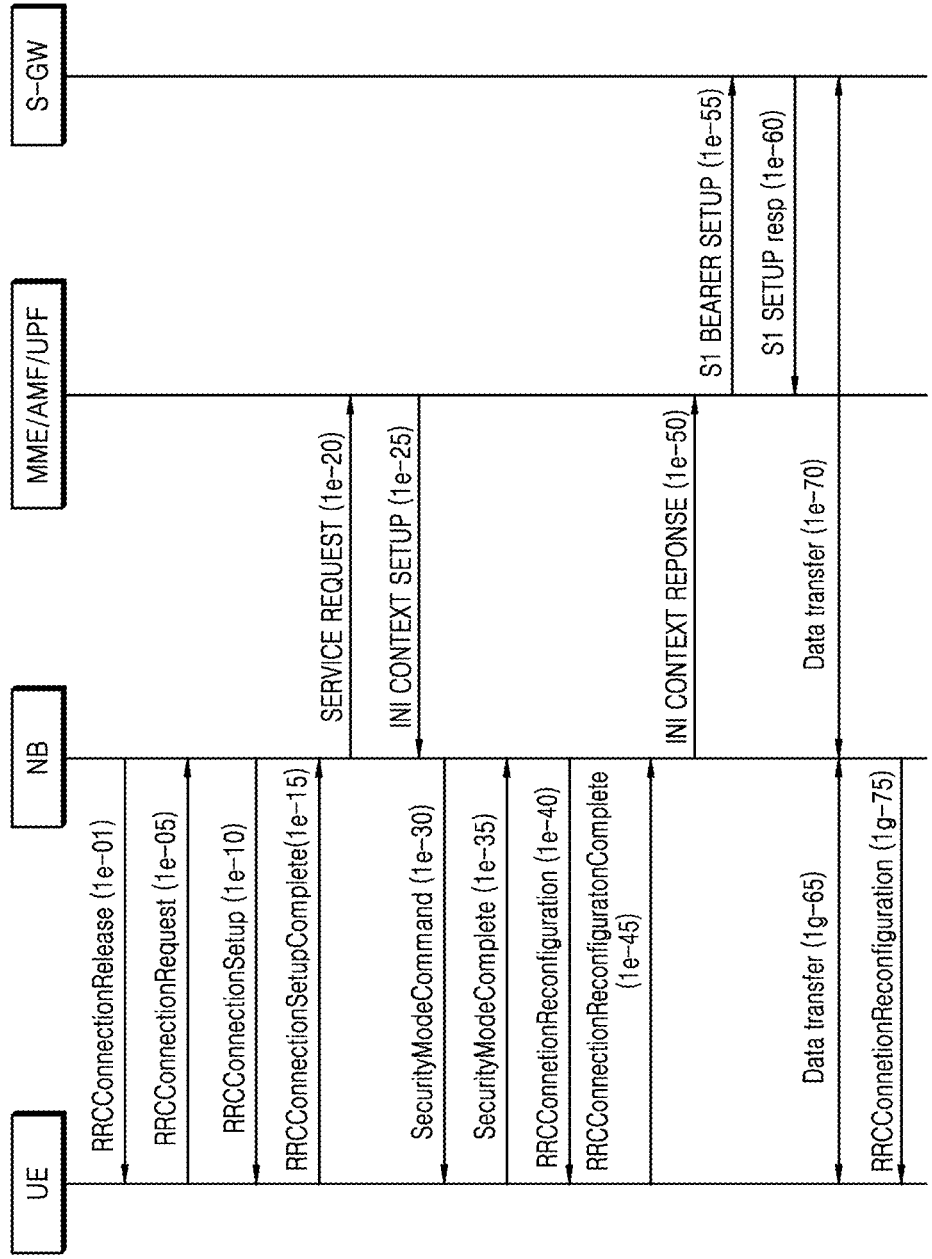
FIG. 1E illustrates a procedure for a user equipment (UE) to configure connection with a network, according to an embodiment of the disclosure.

FIG. 1E illustrates a procedure for a UE to configure connection with a network, according to an embodiment of the disclosure.

Referring to FIG. 1E, when the UE configured to transmit and receive data in an RRC connected mode does not transmit or receive data due to a predefined reason or for a predefined time, a gNB may transmit an RRCConnection-Release message to the UE so as to allow the UE to transit to an RRC idle mode or an RRC inactive mode (1*e*-01). Afterward, when the UE that is not currently configured for connection (hereinafter, also referred to as the idle-mode UE) has data to be transmitted, the UE may perform an RRC connection establishment process or an RRC connection resume procedure on the gNB.

The UE establishes inverse direction transmission synchronization with the gNB through a random access process and transmits an RRCConnectionRequest message to the gNB (1*e*-05). The RRCConnectionRequest message may include an identifier of the UE, an establishment cause or the like.

The gNB transmits an RRCConnectionSetup message to allow the UE to establish RRC connection (1*e*-10). The RRCConnectionSetup message may include at least one of configuration information for each logical channel configuration information for each bearer, configuration information of a PDCP layer, configuration information of an RLC layer, or configuration information of a MAC layer.

Via the RRCConnectionsetup message, the gNB may assign a bearer identifier for each bearer (for example, an SRB identifier or a DRB identifier), may indicate configuration of a PDCP layer, an RLC layer, a MAC layer, and a PHY layer for each bearer, and may indicate a logical channel identifier mapping. Via the RRCConnectionSetup message, the gNB may configure the length (for example, 12 bits or 18 bits) of a PDCP sequence number used by the PDCP layer for each bearer and may configure the length (for example, 6 bits, 12 bits, or 18 bits) of an RLC sequence number used by the RLC layer.

Via the RRCConnectionSetup message, the gNB may indicate whether a PDCP layer, a SDAP layer, an RRC layer or a new layer to use a method of segmenting and reassembling an RRC message or data described in the disclosure for each bearer (a SRB or a DRB). When the new layer uses the method of segmenting and reassembling an RRC message or data, the gNB may indicate whether to use a header of the new layer. For example, when it is configured to use the method of segmenting and reassembling an RRC message or data described in the disclosure, the header of the new layer may be used, and when it is configured not to use the method of segmenting and reassembling an RRC message or data described in the disclosure, the header of the new layer may not be used.

The UE that established the RRC connection transmits an RRCConnectionSetupComplete message to the gNB (operation 1*e*-15). The RRCConnectionSetupComplete message may include a control message such as a SERVICE REQUEST message for requesting an access and mobility management function (AMF) or an MME to configure a bearer for a certain service by the UE. The gNB transmits the SERVICE REQUEST message included in the RRCConnectionSetupComplete message to the AMF or the MME (operation 1*e*-20). The AMF or the MME may determine whether to provide the service requested by the UE.

As a result of the determination, when the service requested by the UE is to be provided, the AMF or the MME transmits an INITIAL CONTEXT SETUP REQUEST message to the gNB (operation 1*e*-25). The INITIAL CONTEXT SETUP REQUEST message may include QoS information to be applied in configuring a DRB, security information (e.g., a security key, a security algorithm, or the like) to be applied to the DRB, or the like.

The gNB exchanges a SecurityModeCommand message 1*e*-30 and a SecurityModeComplete message 1*e*-35 with the UE so as to configure a security mode. After the security mode is configured, the gNB transmits an RRCConnection-Reconfiguration message to the UE (operation 1*e*-40).

Via the RRCConnectionReconfiguration message, the gNB may assign a bearer identifier for each bearer (for example, an SRB identifier or a DRB identifier), may indicate configuration of a PDCP layer, an RLC layer, a MAC layer, and a PHY layer for each bearer, and may indicate a logical channel identifier mapping. Via the RRC-ConnectionReconfiguration message, the gNB may configure the length (for example, 12 bits or 18 bits) of a PDCP sequence number used by the PDCP layer for each bearer and may configure the length (for example, 6 bits, 12 bits, or 18 bits) of an RLC sequence number used by the RLC layer.

Via the RRCConnectionReconfiguration message, the gNB may indicate whether a PDCP layer, a SDAP layer, an RRC layer or a new layer to use the method of segmenting and reassembling an RRC message or data described in the disclosure for each bearer (a SRB or a DRB). When the new layer uses the method of segmenting and reassembling an RRC message or data, the gNB may indicate whether to use a header of the new layer. For example, when it is configured to use the method of segmenting and reassembling an RRC message or data described in the disclosure, the header of the new layer may be used, and when it is configured not to use the method of segmenting and reassembling an RRC message or data described in the disclosure, the header of the new layer may not be used.

Also, the RRCConnectionReconfiguration message may include configuration information about the DRB to process user data, and the UE may configure the DRB by using the configuration information and may transmit an RRCConnectionReconfigurationComplete message to the gNB (operation 1e-45). The gNB that completed the DRB configuration with the UE may transmit an INITIAL CONTEXT SETUP COMPLETE message to the AMF or the MME (operation 1e-50).

After the above procedures are completed, the UE may transmit or receive data to or from the gNB through a core network in operations 1e-55 and 1e-60. According to an embodiment of the disclosure, a data transmission procedure may largely include three steps of RRC connection establishment, security setting, and DRB configuration. Also, the gNB may transmit, to the UE, an RRCConnectionReconfiguration message to renew, add, or change the configuration for a certain reason (1e-65).

Via the RRCConnectionReconfiguration message, the gNB may assign a bearer identifier for each bearer (for example, an SRB identifier or a DRB identifier), may indicate configuration of a PDCP layer, an RLC layer, a MAC layer, and a PHY layer for each bearer, and may indicate a logical channel identifier mapping. Via the RRCConnectionReconfiguration message, the gNB may configure the length (for example, 12 bits or 18 bits) of a PDCP sequence number used by the PDCP layer for each bearer and may configure the length (for example, 6 bits, 12 bits, or 18 bits) of an RLC sequence number used by the RLC layer.

Via the RRCConnectionReconfiguration message, the gNB may indicate whether a PDCP layer, a SDAP layer, an RRC layer or a new layer to use the method of segmenting and reassembling an RRC message or data described in the disclosure for each bearer (a SRB or a DRB). When the new layer uses the method of segmenting and reassembling an RRC message or data, the gNB may indicate whether to use a header of the new layer. For example, when it is configured to use the method of segmenting and reassembling an RRC message or data described in the disclosure, the header of the new layer may be used, and when it is configured not to use the method of segmenting and reassembling an RRC message or data described in the disclosure, the header of the new layer may not be used.

The connection establishment procedure between the UE and the gNB according to the above embodiments of the disclosure may also be applied to connection establishment between the UE and an LTE gNB and to connection establishment between the UE and an NR gNB.

In the disclosure, a bearer may include a signaling radio bearer (SRB) and a data radio bearer (DRB). The SRB is mainly used to transmit and receive an RRC message of an RRC layer, and the DRB is mainly used to transmit and receive a plurality of items of data of a user layer. A UM DRB indicates a DRB using a RLC layer operating in a UM mode, and an AM DRB indicates a DRB using a RLC layer operating in an AM mode.

A method of segmenting and reassembling data of upper layer data (an RRC message or user layer data) described in the disclosure is characterized in defining a new indicator (e.g., a 1-bit or 2-bit indicator, or a sequence number) and segmenting and reassembling data, based on the indicator, in an RRC layer, a PDCP layer, a SDAP layer or a newly-defined layer, and segmenting and reassembling data of the PDCP layer or a layer there above. When the method of segmenting and reassembling data described in the disclosure is used by the new layer, the new indicator is defined and applied to a new header. The method of segmenting and reassembling upper layer data described in the disclosure may or may not be configured for each bearer.

In the disclosure, a UE or a base station may or may not use the method of segmenting and reassembling upper layer data described in the disclosure in each bearer. For example, when the method of segmenting and reassembling upper layer data described in the disclosure is configured in a specific bearer, the method of segmenting and reassembling upper layer data described in the disclosure may be applied to an RRC message or data transmitted or received in the specific bearer, and when the method is applied to the new layer, the new header including segmentation information may be used. Also, when the method of segmenting and reassembling upper layer data described in the disclosure is not configured in a certain bearer, the method of segmenting and reassembling upper layer data described in the disclosure may not be applied to the specific bearer, and when the method is applied to the new layer, the new header including segmentation information may not be used.

As another method, a routing method based on a size of an RRC message or user layer data may be used. In the disclosure, in a case where the UE or the base station attempts to transmit an RRC message or user layer data, when a size of the RRC message or the user layer data to be transmitted is greater than a set threshold value (e.g., 9 kb), the UE or the base station may segment and transmit the RRC message or the user layer data via a bearer (e.g., a new SRB4, SRB5 or DRB2) to which the method of segmenting and reassembling upper layer data described in the disclosure is configured. That is, a bearer configured with the method of segmenting upper layer data described in the disclosure may apply the segmenting method to the RRC message or the user layer data and may segment and transmit the RRC message or the user layer data. In a case where the UE or the base station attempts to transmit an RRC message or user layer data, when a size of the RRC message or the user layer data to be transmitted is not greater than the set threshold value (e.g., 9 kb), the UE or the base station may transmit the RRC message or the user layer data via a bearer (e.g., a SRB0, SRB1, SRB2 or DRB1) to which the method of segmenting and reassembling upper layer data described in the disclosure is not configured.

As another method, a separate bearer (a SRB or DRB) that supports data processing of data whose size is greater than a data size (e.g., 9 kb) supported by a PDCP layer may be defined and configured, and then an RRC message or data which is greater than the data size supported by the PDCP layer may be processed via the separate bearer, and data transmission and reception may be performed via the separate bearer.

In an embodiment of the disclosure, the base station may request the UE for capability information and receive a UE capability report message, and thus may check whether the UE can support the method of segmenting and reassembling upper layer data described in the disclosure.

Figure 1F:
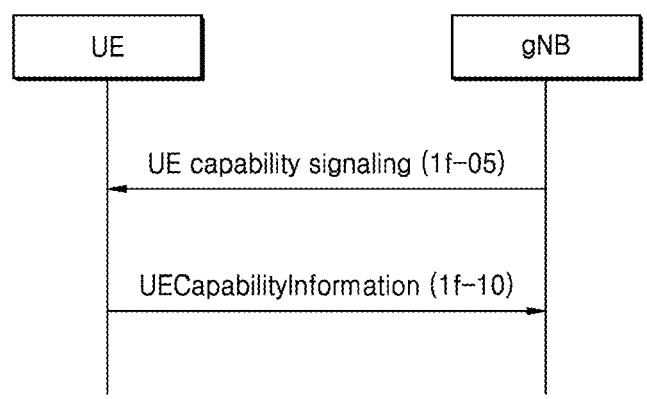
FIG. 1F illustrates a procedure for checking, by a next-generation node B (gNB), a capability of a UE, according to an embodiment of the disclosure.

FIG. 1F illustrates a procedure for checking, by a gNB, a capability of a UE, according to an embodiment of the disclosure.

Referring to FIG. 1F, to check a capability of the UE, the gNB may transmit a UECapabilityEnqiry message (1f-05) to the UE and thus may allow the UE to report the capability of the UE. When the UE receives the UECapabilityEnqiry message (1f-05) as an RRC message, to report the capability of the UE, the UE may configure UE capabilities in a UECapabilityInformation message (1*f*-10) and transmit it to the gNB, thereby reporting the capability of the UE.

When the UE transmits the UECapabilityInformation message (1*f*-10), the UE may include, in the message, an indicator indicating a support of the method of segmenting and reassembling upper layer data described in the disclosure and may transmit the message.

Even though the UE and a network configured with the method of segmenting and reassembling upper layer data described in the disclosure via an RRC connection configuration or resume procedure with respect to a specific bearer, when signal disruption or a radio link failure (RLF) occurs due to obstacles or jamming between the UE and the network or fast movement of the UE, the UE and the gNB perform an RRC Connection Re-establishment procedure to re-configure connection therebetween. At this time, the method of segmenting and reassembling upper layer data may be inactivated, suspended, released, fallen back, or not used with respect to a specific bearer. That is, when the UE performs the RRC Connection Re-establishment procedure, the method of segmenting and reassembling upper layer data may not use. For example, until the gNB re-configures the method of segmenting and reassembling upper layer data to the specific bearer, the method of segmenting and reassembling upper layer data described in the disclosure may not be applied (e.g., when the method of segmenting and reassembling upper layer data is applied to a new layer, a new header may not be used). When the gNB re-configures the method of segmenting and reassembling upper layer data to the specific bearer via the RRC Connection Re-establishment procedure or an RRC message, the method of segmenting and reassembling upper layer data described in the disclosure may be applied again (e.g., when the method of segmenting and reassembling upper layer data is applied to the new layer, the new header may be re-used).

As another method, for a bearer that was configured with the method of segmenting and reassembling upper layer data, the gNB and the UE may continuously apply the method of segmenting and reassembling upper layer data described in the disclosure in an RRC Re-establishment procedure, for convenience of implementation.

In a case where the method of segmenting and reassembling upper layer data described in the disclosure is applied to a new layer, when the UE transits to an RRC inactive mode or an RRC idle mode, the UE may completely discard a plurality of pieces of segmented data (segments), which are stored in a buffer corresponding to the new layer and are not reassembled, from a transmission new layer or a reception new layer and thus may prevent a reassembly error or an unnecessary transmission error which may occur when connection to a network is re-configured at a later time.

When the UE transits to the RRC inactive mode, the method of segmenting and reassembling upper layer data described in the disclosure may be suspended, and when RRC connection is re-configured, the method of segmenting and reassembling upper layer data may be resumed in response to indication by the network. When the UE transits to the RRC idle mode, the method of segmenting and reassembling upper layer data described in the disclosure may be released. A data discard procedure of the new layer may be defined according to a re-establishment procedure of the new layer, and when a PDCP layer performs re-establishment, the PDCP layer may trigger the discard procedure by transmitting an indicator to the new layer.

Hereinafter, particular embodiments of the method of segmenting and reassembling upper layer data described in the disclosure will now be described.

Figure 1G:
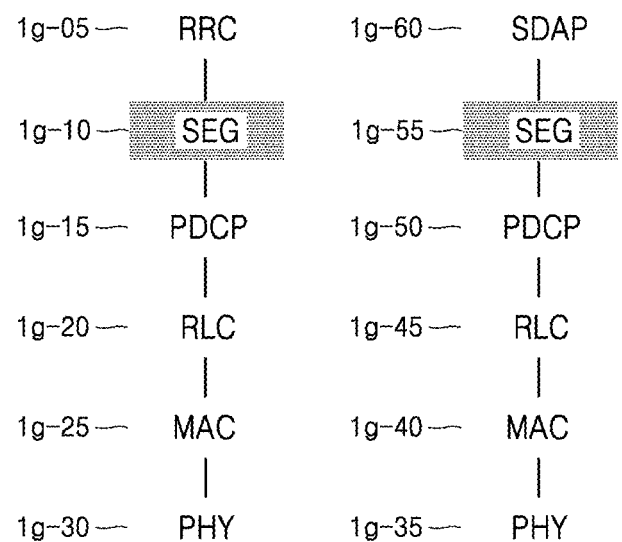
FIG. 1G illustrates a first embodiment of a method of segmenting and reassembling upper layer data, according to an embodiment of the disclosure.

FIG. 1G illustrates a first embodiment of the method of segmenting and reassembling upper layer data, according to an embodiment of the disclosure.

The first embodiment of the method of segmenting and reassembling upper layer data described in the disclosure is characterized in defining a new layer (i.e., a SEG layer), defining fields for segmentation and reassembly in a new header of the new layer, using the new layer in segmentation by a transmitting end, and using the new layer in reassembly by a receiving end.

In the first embodiment of the method of segmenting and reassembling upper layer data, the new layer may be positioned between a PDCP layer 1*g*-15 and an RRC layer 1*g*-05 with respect to SRBs transmitting and receiving an RRC message, may receive data from the RRC layer 1*g*-05 that is an upper layer, and when a size of the received data is greater than a maximum size or a particular threshold value which is supported by the PDCP layer 1*g*-15, the new layer may configure a new header, may segment the data including segment information, may attach the new header, and may transmit the segmented data with the new header to the PDCP layer 1*g*-15. When the size of the received data is less than the maximum size or the particular threshold value which is supported by the PDCP layer 1*g*-15, the new layer may configure a new header, may include an indicator indicating non-segmentation in segmentation information, may attach the new header to the data, and thus may transmit the data with the new header to the PDCP layer 1*g*-15. Such new header may exist. However, to reduce overhead, it is possible to indicate, by defining a 1-bit indicator on the front, whether a new header exists. For example, whether a new header exists or data is segmented may be indicated by defining a new header or 1 bit of a header of a PDCP layer. When a new layer of a receiving end receives data from a lower PDCP layer, the new layer reads the new header, checks the segmentation information, performs a reassembly when the data is segmented or removes the header when the data is not segmented, and transmits an RRC message to an upper layer.

In the first embodiment of the method of segmenting and reassembling upper layer data, a new layer may be positioned between a PDCP layer 1*g*-50 and a SDAP layer 1*g*-60 with respect to DRBs transmitting and receiving user layer data, may receive data from the SDAP layer 1*g*-60 that is an upper layer or an upper layer (in a case where a SDAP layer is not configured), and when a size of the received data is greater than a maximum size or a particular threshold value which is supported by the PDCP layer 1*g*-50, the new layer may configure a new header, may segment the data including segment information, may attach the new header, and may transmit the segmented data with the new header to the PDCP layer 1*g*-50. When the size of the received data is less than the maximum size or the particular threshold value which is supported by the PDCP layer 1*g*-50, the new layer may configure a new header, may include an indicator indicating non-segmentation in segmentation information, may attach the new header to the received data, and thus may transmit the data with the new header to the PDCP layer 1*g*-50. Such new header may exist. However, to reduce overhead, it is possible to indicate, by defining a 1-bit indicator on the front, whether a new header exists. For example, whether a new header exists or data is segmented may be indicated by defining a new header or 1 bit of a header of a PDCP layer. When a new layer of a receiving end receives data from a lower PDCP layer, the new layer reads the new header, checks the segmentation information, performs a reassembly when the data is segmented or removes the header when the data is not segmented, and transmits the data to an upper layer.

FIG. 1H illustrates a detailed segmentation and reassembly method with respect to the first embodiment of the method of segmenting and reassembling upper layer data, according to an embodiment of the disclosure.

In FIG. 1H, reference numeral 1h-01 indicates a 1-1 embodiment of the method of segmenting and reassembling upper layer data.

In the 1-1 embodiment of the disclosure, a transmitting end and a receiving end may define and use a 2-bit segmentation field (S field). In the S field, four number of cases that are 00, 01, 11 and 10 may be defined to respectively indicate non-segmented complete data, a first segment, a middle segment (or a segment that is not the first one nor the last one), and a last segment. One-to-one mapping between 00, 01, 11 and 10 of the S field and the non-segmented complete data, the first segment, the middle segment (or a segment that is not the first one nor the last one), and the last segment may have 24 types, and each mapping relationship may be defined by using one of the 24 types. For example, the S field may be defined as shown in [Table 1] below.

TABLE 1

| Value | Description |
| --- | --- |
| 00 | Data field contains all bytes of an SEG SDU |
| 01 | Data field contains the first segment of an SEG SDU |
| 10 | Data field contains the last segment of an SEG SDU |
| 11 | Data field contains neither the first nor last segment of an SEG SDU |

As described with reference to FIG. 1G, a newly-defined layer (a SEG layer) is defined and used above a PDCP layer, and thus, when a reception RLC layer operates in an AM mode, lossless data transmission is supported, and a reception PDCP layer reassembles data in order according to PDCP sequence numbers and transmits the data to a reception SEG layer. Therefore, the new layer may not need sequence numbers, and with the 2-bit S field, a transmitting end may segment an RRC message or data, and a receiving end may receive the data by successfully reassembling the segmented data.

Operations of the transmitting end in the 1-1 embodiment of the method of segmenting and reassembling upper layer data are described below.

When a size of an RRC message or data received from an upper layer is greater than a maximum size or a particular threshold value which is supported by a PDCP layer, the new layer performs data segmentation, and when the size is not greater than it, the new layer does not perform data segmentation.

When the new layer performs data segmentation, the new layer configures an S field of a new header with 01 for first segmented data (segment), attaches the header to the front of the first segmented data (segment), and transmits the first segmented data to a lower layer. The new layer configures an S field of a new header with 11 for middle segmented data (segment), attaches the header to the front of the middle segmented data (segment), and transmits the middle segmented data to the lower layer. The new layer configures an S field of a new header with 10 for last segmented data (segment), attaches the header to the front of the last segmented data (segment), and transmits the last segmented data to the lower layer.

When the new layer does not perform data segmentation, the new layer configures an S field of a new header with 00 for data received from the upper layer, attaches the header to the front of the data, and transmits the data to the lower layer.

Operations of the receiving end in the 1-1 embodiment of the method of segmenting and reassembling upper layer data are described below.

In a case where a new layer or the method of segmenting and reassembling upper layer data described in the disclosure is configured with respect to a specific bearer (SRB or DRB), the new layer of the receiving end reads a new header, and checks whether received data is an RRC message or data which is segmented or an RRC message or data which is not segmented.

The new layer of the receiving end checks a new header of current received data, removes the new header when the received data is the RRC message or data which is not segmented, and transmits the RRC message or data to an upper layer. When the received data is the RRC message or data (segment) which is segmented, the new layer of the receiving end checks an S field of a new header, stores the received data in a buffer, performs a reassembly when a first segment, a middle segment and a last segment are all received, removes new headers of the first, middle and last segments, configures a complete RRC message or data, and transmits the complete RRC message or data to the upper layer. In this regard, a reassembly procedure may be performed when the S field of the new header indicates the last segment. When the received segments are reassembled to be configured as complete data and then are transmitted to the upper layer, the received segments may be discarded from the buffer.

In FIG. 1H, reference numeral 1h-11 indicates a 1-2 embodiment of the method of segmenting and reassembling upper layer data.

In the 1-2 embodiment of the disclosure, a transmitting end and a receiving end may define and use a 2-bit segmentation field (S field). In the S field, three number of cases from among four number of cases that are 00, 01, 11 and 10 may be defined to respectively indicate non-segmented complete data, a segment that is not a last segment (alternatively, indication of existence of another segment), and a last segment. One-to-one mapping between three number of cases from among 00, 01, 11 and 10 of the S field and the non-segmented complete data, the segment that is not the last segment (alternatively, indication of existence of another segment), and the last segment may have 24 types, and each mapping relationship may be defined by using one of the 24 types. One remaining case from among 00, 01, 11 and 10 may be reserved as a reservation value for another function thereafter. For example, the S field may be defined as shown in [Table 2] below.

TABLE 2

| Value | Description |
| --- | --- |
| 00 | Data field contains all bytes of an SEG SDU |
| 01 | Data field contains non-last segment of an SEG SDU |
| 10 | Data field contains the last segment of an SEG SDU |
| 11 | Reserved |

As described with reference to FIG. 1G, a newly-defined layer (a SEG layer) is defined and used above a PDCP layer, and thus, when a reception RLC layer operates in an AM mode, lossless data transmission is supported, and a reception PDCP layer reassembles data in order according to PDCP sequence numbers and transmits the data to a reception SEG layer. Therefore, the new layer may not need sequence numbers, and with the 2-bit S field, a transmitting end may segment an RRC message or data, and a receiving end may receive the data by successfully reassembling the segmented data.

Operations of the transmitting end in the 1-2 embodiment of the method of segmenting and reassembling upper layer data are described below.

When a size of an RRC message or data received from an upper layer is greater than a maximum size or a particular threshold value which is supported by a PDCP layer, the new layer performs data segmentation, and when the size is not greater than it, the new layer does not perform data segmentation.

When the new layer performs data segmentation, the new layer configures an S field of a new header with 01 for a segment that is not last segmented data (segment), attaches the header to the front of the segmented data, and transmits the segmented data to a lower layer. For the last segmented data (segment), the new layer configures an S field of a new header with 10, attaches the header to the front of the last segmented data, and transmits the last segmented data to the lower layer.

When the new layer does not perform data segmentation, the new layer configures an S field of a new header with 00 for data received from the upper layer, attaches the header to the front of the data, and transmits the data to the lower layer.

Operations of the receiving end in the 1-2 embodiment of the method of segmenting and reassembling upper layer data are described below.

In a case where a new layer or the method of segmenting and reassembling upper layer data described in the disclosure is configured with respect to a specific bearer (SRB or DRB), the new layer of the receiving end reads a new header, and checks whether received data is an RRC message or data which is segmented or an RRC message or data which is not segmented.

The new layer of the receiving end checks a new header of current received data, removes the new header when the received data is the RRC message or data which is not segmented, and transmits the RRC message or data to an upper layer. When the received data is the RRC message or data which is segmented, the new layer of the receiving end checks an S field of a new header, stores the received data in a buffer, performs a reassembly when segments that are not a last segment and the last segment are all received, removes new headers of the segments, configures a complete RRC message or data, and transmits the complete RRC message or data to the upper layer. In this regard, a reassembly procedure may be performed when the S field of the new header indicates the last segment. When the received segments are reassembled to be configured as complete data and then are transmitted to the upper layer, the received segments may be discarded from the buffer.

In FIG. 1H, reference numeral 1*h*-21 indicates a 1-3 embodiment of the method of segmenting and reassembling upper layer data.

In the 1-3 embodiment of the disclosure, a transmitting end and a receiving end may define and use a 1-bit segmentation field (S field). In the S field, two number of cases that are 0 and 1 may be defined to respectively indicate non-segmented complete data (or a last segment) and a segment that is not a last segment (alternatively, indication of existence of another segment). One-to-one mapping between two number of cases from among 0 and 1 of the S field and the non-segmented complete data (or the last segment) and the segment that is not the last segment (alternatively, indication of existence of another segment) may have 2 types, and each mapping relationship may be defined by using one of the 2 types. For example, the S field may be defined as shown in [Table 3] below.

TABLE 3

| Value | Description |
|---|---|
| 0 | The last segment of SEC SDU or complete SEG SDU or indicate that there is no more segment of this SEG SDU. |
| 1 | Non-last segment of SEG SDU or indicate that there is more segments of this SEG SDU. |

As described with reference to FIG. 1G, a newly-defined layer (a SEG layer) is defined and used above a PDCP layer, and thus, when a reception RLC layer operates in an AM mode, lossless data transmission is supported, and a reception PDCP layer reassembles data in order according to PDCP sequence numbers and transmits the data to a reception SEG layer. Therefore, the new layer may not need sequence numbers, and with the 1-bit S field, a transmitting end may segment an RRC message or data, and a receiving end may receive the data by successfully reassembling the segmented data.

Operations of the transmitting end in the 1-3 embodiment of the method of segmenting and reassembling upper layer data are described below.

When a size of an RRC message or data received from an upper layer is greater than a maximum size or a particular threshold value which is supported by a PDCP layer, the new layer performs data segmentation, and when the size is not greater than it, the new layer does not perform data segmentation.

When the new layer performs data segmentation, the new layer configures an S field of a new header with 1 for a segment that is not last segmented data (segment), attaches the header to the front of the segmented data, and transmits the segmented data to a lower layer. For the last segmented data (segment) (or the non-segmented complete data), the new layer configures an S field of a new header with 0, attaches the header to the front of the last segmented data (or the non-segmented complete data), and transmits the last segmented data to the lower layer.

When the new layer does not perform data segmentation, the new layer configures an S field of a new header with 0 for data received from the upper layer, attaches the header to the front of the data, and transmits the data to the lower layer.

Operations of the receiving end in the 1-3 embodiment of the method of segmenting and reassembling upper layer data are described below.

In a case where a new layer or the method of segmenting and reassembling upper layer data described in the disclosure is configured with respect to a specific bearer (SRB or DRB), the new layer of the receiving end reads a new header, and checks whether information indicated by the header indicates the last segmented data (segment), the non-segmented complete data or non-existence of another segment or indicates existence of segmented data (segment) or another segment.

When an S field of a new header of current received data indicates 0 (i.e., the last segmented data (segment), the non-segmented complete data or non-existence of another segment), and there are a plurality of items of data whose S field of a header is configured as 1, the data being from among a plurality of items of pre-received data and being received after the last data whose S field of a header is indicated as 0, the plurality of items of data whose S field of the header is configured as 1 and the current received data may be reassembled to configure complete data, new headers may be removed, and the complete data may be transmitted to the upper layer.

When the S field of the new header of the current received data indicates 0, and there are not a plurality of items of data whose S field of a header is configured as 1, the data being from among a plurality of items of pre-received data and being received after the last data whose S field of the header is indicated as 0, this indicates that the current received data is the non-segmented complete data, and thus, the new header may be removed and the complete data may be transmitted to the upper layer.

When the S field of the new header of the current received data indicates 1 (indication of existence of segmented data (segment) or another segment), the new header of the data is checked and removed, and the data is stored in a buffer until a reassembly is to be performed or data whose S field of a header is configured as 0 arrives. In this regard, when the received segments are reassembled to be configured as complete data and then are transmitted to the upper layer, the received segments may be discarded from the buffer.

Figure 1I:
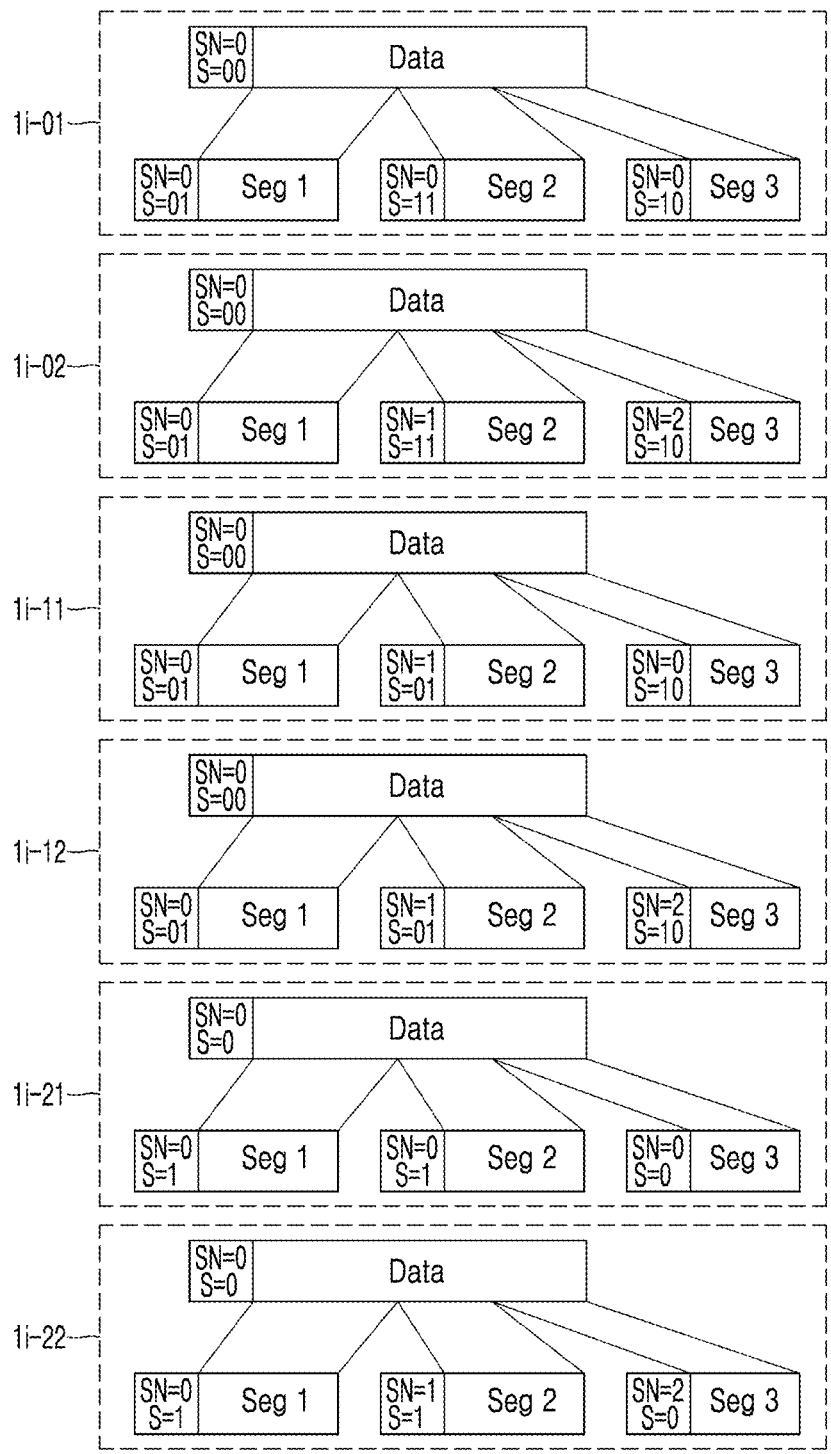
FIG. 1I illustrates a second embodiment of the method of segmenting and reassembling upper layer data, according to an embodiment of the disclosure.

FIG. 1I illustrates a second embodiment of the method of segmenting and reassembling upper layer data, according to an embodiment of the disclosure.

In FIG. 1I, reference numeral 1$i$-01 indicates a 2-1 embodiment of the method of segmenting and reassembling upper layer data.

In the 2-1 embodiment of the disclosure, a transmitting end and a receiving end may define and use a 2-bit segmentation field (S field). In the S field, four number of cases that are 00, 01, 11 and 10 may be defined to respectively indicate non-segmented complete data, a first segment, a middle segment (or a segment that is not the first one nor the last one), and a last segment. One-to-one mapping between 00, 01, 11 and 10 of the S field and the non-segmented complete data, the first segment, the middle segment (or a segment that is not the first one nor the last one), and the last segment may have 24 types, and each mapping relationship may be defined by using one of the 24 types. For example, the S field may be defined as shown in [Table 4] below.

TABLE 4

| Value | Description |
|---|---|
| 00 | Data field contains all bytes of an SEG SDU |
| 01 | Data field contains the first segment of an SEG SDU |
| 10 | Data field contains the last segment of an SEG SDU |
| 11 | Data field contains neither the first nor last segment of an SEG SDU |

As described with reference to FIG. 1G, a newly-defined layer (a SEG layer) is defined and used above a PDCP layer, and thus, when a reception RLC layer operates in an AM mode, lossless data transmission is supported, and a reception PDCP layer reassembles data in order according to PDCP sequence numbers and transmits the data to a reception SEG layer. However, when the reception RLC layer operates in a UM mode and thus allows a loss, or due to that a base station is implemented to have a CU-DU split configuration, data transfer between a RLC layer and a PDCP layer is configured in a wireless or wired manner and thus a loss of data occurs, a new layer requires a sequence number, and only when the sequence number is used together with the 2-bit S field, the transmitting end may segment an RRC message or data even when the loss occurs, and the receiving end may receive data by successfully reassembling segmented data.

Operations of the transmitting end in the 2-1 embodiment of the method of segmenting and reassembling upper layer data are described below.

When a size of an RRC message or data received from an upper layer is greater than a maximum size or a particular threshold value which is supported by a PDCP layer, the new layer performs data segmentation, and when the size is not greater than it, the new layer does not perform data segmentation.

In the 2-1 embodiment, when a sequence number is assigned, a same sequence number may be assigned to a plurality of items of data (segments) that are split from a same upper layer data (SEG SDU). Therefore, the segments having the same sequence number may indicate that they are split from same data. However, when one data is segmented to at least four segments, and $2^{nd}$ or $3^{rd}$ segment is lost, the receiving end cannot distinguish between the $2^{nd}$ segment and the $3^{rd}$ segment or cannot detect whether a loss occurred in the $2^{nd}$ or $3^{rd}$ segment, a reassembly error may occur. That is, the reassembly may not be successfully performed. Therefore, when segments are limited to be equal to or less than three segments, the receiving end may normally operate without an error.

When the new layer of the transmitting end performed data segmentation, the new layer assigns a same sequence number to segments, configures an S field of a new header with 01 for first segmented data (segment), attaches the header to the front of the first segmented data (segment), and transmits the first segmented data to a lower layer. The new layer configures an S field of a new header with 11 for middle segmented data (segment), attaches the header to the front of the middle segmented data (segment), and transmits the middle segmented data to the lower layer. The new layer configures an S field of a new header with 10 for last segmented data (segment), attaches the header to the front of the last segmented data (segment), and transmits the last segmented data to the lower layer.

When the new layer does not perform data segmentation, the new layer configures an S field of a new header with 00 for data received from the upper layer, allocates a sequence number, attaches the header to the front of the data, and transmits the data to the lower layer.

Operations of the receiving end in the 2-1 embodiment of the method of segmenting and reassembling upper layer data are described below.

In a case where a new layer or the method of segmenting and reassembling upper layer data described in the disclosure is configured with respect to a specific bearer (SRB or DRB), the new layer of the receiving end reads a new header, and checks whether received data is an RRC message or data which is segmented or an RRC message or data which is not segmented. The new layer may acknowledge that segments with a same sequence number are segmented from one data.

The new layer of the receiving end checks a new header of current received data, removes the new header when the received data is the RRC message or data which is not segmented, and transmits the RRC message or data to an upper layer. When the received data is the RRC message or data (segment) which is segmented, the new layer of the receiving end checks a sequence number and an S field of a new header, stores the received data in a buffer, performs a reassembly when a first segment, a middle segment and a last segment are all received, removes new headers of the first, middle and last segments, configures a complete RRC message or data, and transmits the complete RRC message or data to the upper layer. In this regard, a reassembly procedure may be performed when segments with respect to a particular sequence number are all received. When the received segments are reassembled to be configured as complete data and then are transmitted to the upper layer, the received segments may be discarded from the buffer.

In FIG. 1I, reference numeral 1i-02 indicates a 2-2 embodiment of the method of segmenting and reassembling upper layer data.

In the 2-2 embodiment of the disclosure, a transmitting end and a receiving end may define and use a 2-bit segmentation field (S field). In the S field, four number of cases that are 00, 01, 11 and 10 may be defined to respectively indicate non-segmented complete data, a first segment, a middle segment (or a segment that is not the first one nor the last one), and a last segment. One-to-one mapping between 00, 01, 11 and 10 of the S field and the non-segmented complete data, the first segment, the middle segment (or a segment that is not the first one nor the last one), and the last segment may have 24 types, and each mapping relationship may be defined by using one of the 24 types. For example, the S field may be defined as shown in [Table 5] below.

TABLE 5

| Value | Description |
|-------|-------------|
| 00 | Data field contains all bytes of an SEG SDU |
| 01 | Data field contains the first segment of an SEG SDU |
| 10 | Data field contains the last segment of an SEG SDU |
| 11 | Data field contains neither the first nor last segment of an SEG SDU |

As described with reference to FIG. 1G, a newly-defined layer (a SEG layer) is defined and used above a PDCP layer, and thus, when a reception RLC layer operates in an AM mode, lossless data transmission is supported, and a reception PDCP layer reassembles data in order according to PDCP sequence numbers and transmits the data to a reception SEG layer. However, when the reception RLC layer operates in a UM mode and thus allows a loss, or due to that a base station is implemented to have a CU-DU split configuration, data transfer between a RLC layer and a PDCP layer is configured in a wireless or wired manner and thus a loss of data occurs, a new layer requires a sequence number, and only when the sequence number is used together with the 2-bit S field, the transmitting end may segment an RRC message or data even when the loss occurs, and the receiving end may receive data by successfully reassembling segmented data.

Operations of the transmitting end in the 2-2 embodiment of the method of segmenting and reassembling upper layer data are described below.

When a size of an RRC message or data received from an upper layer is greater than a maximum size or a particular threshold value which is supported by a PDCP layer, the new layer performs data segmentation, and when the size is not greater than it, the new layer does not perform data segmentation.

In the 2-2 embodiment, when a sequence number is assigned, different sequence numbers may be assigned to a plurality of items of data (segments) that are split from a same upper layer data (SEG SDU). Therefore, the sequence numbers may respectively indicate orders of the segments, and the S field may indicate from which portions of data the respective segments are split. However, when one data is segmented to at least four segments, and $2^{nd}$ or $3^{rd}$ segment is lost, the receiving end can distinguish between the $2^{nd}$ segment and the $3^{rd}$ segment by using the sequence numbers or can detect whether a loss occurred.

When the new layer of the transmitting end performed data segmentation, the new layer assigns different sequence numbers to segments, configures an S field of a new header with 01 for first segmented data (segment), attaches the header to the front of the first segmented data (segment), and transmits the first segmented data to a lower layer. The new layer configures an S field of a new header with 11 for middle segmented data (segment), attaches the header to the front of the middle segmented data (segment), and transmits the middle segmented data to the lower layer. The new layer configures an S field of a new header with 10 for last segmented data (segment), attaches the header to the front of the last segmented data (segment), and transmits the last segmented data to the lower layer.

When the new layer does not perform data segmentation, the new layer configures an S field of a new header with 00 for data received from the upper layer, allocates a sequence number, attaches the header to the front of the data, and transmits the data to the lower layer.

Operations of the receiving end in the 2-2 embodiment of the method of segmenting and reassembling upper layer data are described below.

In a case where a new layer or the method of segmenting and reassembling upper layer data described in the disclosure is configured with respect to a specific bearer (SRB or DRB), the new layer of the receiving end reads a new header, and checks whether received data is an RRC message or data which is segmented or an RRC message or data which is not segmented. The new layer may acknowledge that the sequence numbers indicate orders of different segments. Therefore, when a gap occurs in the sequence numbers, the new layer may detect occurrence of a loss.

The new layer of the receiving end checks a new header of current received data, removes the new header when the received data is the RRC message or data which is not segmented, and transmits the RRC message or data to an upper layer. When the received data is the RRC message or data (segment) which is segmented, the new layer of the receiving end checks a sequence number and an S field of a new header, stores the received data in a buffer, performs a reassembly when a first segment, a middle segment and a last segment are all received, removes new headers of the first, middle and last segments, configures a complete RRC message or data, and transmits the complete RRC message or data to the upper layer. In this regard, a reassembly procedure may be performed, by checking the sequence numbers and the S fields, when all segments of one data (SEG SDU) are received. When the received segments are reassembled to be configured as complete data and then are transmitted to the upper layer, the received segments may be discarded from the buffer.

In FIG. 1I, reference numeral 1i-11 indicates a 2-3 embodiment of the method of segmenting and reassembling upper layer data.

In the 2-3 embodiment of the disclosure, a transmitting end and a receiving end may define and use a 2-bit segmentation field (S field). In the S field, three number of cases from among four number of cases that are 00, 01, 11 and 10 may be defined to respectively indicate non-segmented complete data, a segment that is not a last segment (alternatively, indication of existence of another segment), and a last segment. One-to-one mapping between three number of cases from among 00, 01, 11 and 10 of the S field and the non-segmented complete data, the segment that is not the last segment (alternatively, indication of existence of another segment), and the last segment may have 24 types, and each mapping relationship may be defined by using one of the 24 types. One remaining case from among 00, 01, 11 and 10 may be reserved as a reservation value for another function thereafter. For example, the S field may be defined as shown in [Table 6] below.

TABLE 6

| Value | Description |
|-------|-------------|
| 00 | Data field contains all bytes of an SEG SDU |
| 01 | Data field contains non-last segment of an SEG SDU |
| 10 | Data field contains the last segment of an SEG SDU |
| 11 | Reserved |

As described with reference to FIG. 1G, a newly-defined layer (a SEG layer) is defined and used above a PDCP layer, and thus, when a reception RLC layer operates in an AM mode, lossless data transmission is supported, and a reception PDCP layer reassembles data in order according to PDCP sequence numbers and transmits the data to a reception SEG layer. However, when the reception RLC layer operates in a UM mode and thus allows a loss, or due to that a base station is implemented to have a CU-DU split configuration, data transfer between a RLC layer and a PDCP layer is configured in a wireless or wired manner and thus a loss of data occurs, a new layer requires a sequence number, and only when the sequence number is used together with the 2-bit S field, the transmitting end may segment an RRC message or data even when the loss occurs, and the receiving end may receive data by successfully reassembling segmented data.

Operations of the transmitting end in the 2-3 embodiment of the method of segmenting and reassembling upper layer data are described below.

When a size of an RRC message or data received from an upper layer is greater than a maximum size or a particular threshold value which is supported by a PDCP layer, the new layer performs data segmentation, and when the size is not greater than it, the new layer does not perform data segmentation.

In the 2-3 embodiment, when a sequence number is assigned, a same sequence number may be assigned to a plurality of items of data (segments) that are split from a same upper layer data (SEG SDU). Therefore, the segments having the same sequence number may indicate that they are split from same data. However, when one data is segmented to at least four segments, and $2^{nd}$ or $3^{rd}$ segment is lost, the receiving end cannot distinguish between the $2^{nd}$ segment and the $3^{rd}$ segment or cannot detect whether a loss occurred in the $2^{nd}$ or $3^{rd}$ segment, a reassembly error may occur. That is, the reassembly may not be successfully performed. Therefore, when segments are limited to be equal to or less than three segments, the receiving end may normally operate without an error.

When the new layer of the transmitting end performed data segmentation, the new layer assigns a same sequence number to segments, configures an S field of a new header with 01 for segmented data (segment) that is not the last segmented data (segment), attaches the header to the front of the segmented data, and transmits the segmented data to a lower layer. The new layer configures an S field of a new header with 10 for the last segmented data (segment), attaches the header to the front of the last segmented data (segment), and transmits the last segmented data to the lower layer.

When the new layer does not perform data segmentation, the new layer allocates a sequence number, configures an S field of a new header with 00 for data received from the upper layer, attaches the header to the front of the data, and transmits the data to the lower layer.

Operations of the receiving end in the 2-3 embodiment of the method of segmenting and reassembling upper layer data are described below.

In a case where a new layer or the method of segmenting and reassembling upper layer data described in the disclosure is configured with respect to a specific bearer (SRB or DRB), the new layer of the receiving end reads a new header, and checks whether received data is an RRC message or data which is segmented or an RRC message or data which is not segmented. The new layer may acknowledge that segments with a same sequence number are segmented from one data.

The new layer of the receiving end checks a new header of current received data, removes the new header when the received data is the RRC message or data which is not segmented, and transmits the RRC message or data to an upper layer. When the received data is the RRC message or data (segment) which is segmented, the new layer of the receiving end checks a sequence number and an S field of a new header, stores the received data in a buffer, performs a reassembly when segments that are not the last segment and the last segment are all received, removes new headers of the segments, configures a complete RRC message or data, and transmits the complete RRC message or data to the upper layer. In this regard, a reassembly procedure may be performed when segments with respect to a particular sequence number are all received. When the received segments are reassembled to be configured as complete data and then are transmitted to the upper layer, the received segments may be discarded from the buffer.

In FIG. 1I, reference numeral 1i-12 indicates a 2-4 embodiment of the method of segmenting and reassembling upper layer data.

In the 2-4 embodiment of the disclosure, a transmitting end and a receiving end may define and use a 2-bit segmentation field (S field). In the S field, three number of cases from among four number of cases that are 00, 01, 11 and 10 may be defined to respectively indicate non-segmented complete data, a segment that is not a last segment (alternatively, indication of existence of another segment), and a last segment. One-to-one mapping between three number of cases from among 00, 01, 11 and 10 of the S field and the non-segmented complete data, the segment that is not the last segment (alternatively, indication of existence of another segment), and the last segment may have 24 types, and each mapping relationship may be defined by using one of the 24 types. One remaining case from among 00, 01, 11 and 10 may be reserved as a reservation value for another function thereafter. For example, the S field may be defined as shown in [Table 7] below.

TABLE 7

| Value | Description |
|-------|-------------|
| 00 | Data field contains all bytes of an SEG SDU |
| 01 | Data field contains non-last segment of an SEG SDU |
| 10 | Data field contains the last segment of an SEG SDU |
| 11 | Reserved |

TABLE 7-continued

| Value | Description |
| --- | --- |

As described with reference to FIG. 1G, a newly-defined layer (a SEG layer) is defined and used above a PDCP layer, and thus, when a reception RLC layer operates in an AM mode, lossless data transmission is supported, and a reception PDCP layer reassembles data in order according to PDCP sequence numbers and transmits the data to a reception SEG layer. However, when the reception RLC layer operates in a UM mode and thus allows a loss, or due to that a base station is implemented to have a CU-DU split configuration, data transfer between a RLC layer and a PDCP layer is configured in a wireless or wired manner and thus a loss of data occurs, a new layer requires a sequence number, and only when the sequence number is used together with the 2-bit S field, the transmitting end may segment an RRC message or data even when the loss occurs, and the receiving end may receive data by successfully reassembling segmented data.

Operations of the transmitting end in the 2-4 embodiment of the method of segmenting and reassembling upper layer data are described below.

When a size of an RRC message or data received from an upper layer is greater than a maximum size or a particular threshold value which is supported by a PDCP layer, the new layer performs data segmentation, and when the size is not greater than it, the new layer does not perform data segmentation.

In the 2-4 embodiment, when a sequence number is assigned, different sequence numbers may be assigned to a plurality of items of data (segments) that are split from a same upper layer data (SEG SDU). Therefore, the sequence numbers may respectively indicate orders of the segments, and the S field may indicate from which portions of data the respective segments are split. Accordingly, even when one data is segmented to at least four segments, and $2^{nd}$ or $3^{rd}$ segment is lost, the receiving end can distinguish between the $2^{nd}$ segment and the $3^{rd}$ segment by using the sequence numbers or can detect whether a loss occurred.

When the new layer of the transmitting end performed data segmentation, the new layer assigns a same sequence number to segments, configures an S field of a new header with 01 for segmented data (segment) that is not the last segmented data (segment), attaches the header to the front of the segmented data, and transmits the segmented data to a lower layer. The new layer configures an S field of a new header with 10 for the last segmented data (segment), attaches the header to the front of the last segmented data (segment), and transmits the last segmented data to the lower layer.

When the new layer does not perform data segmentation, the new layer allocates a sequence number, configures an S field of a new header with 00 for data received from the upper layer, attaches the header to the front of the data, and transmits the data to the lower layer.

Operations of the receiving end in the 2-4 embodiment of the method of segmenting and reassembling upper layer data are described below.

In a case where a new layer or the method of segmenting and reassembling upper layer data described in the disclosure is configured with respect to a specific bearer (SRB or DRB), the new layer of the receiving end reads a new header, and checks whether received data is an RRC message or data which is segmented or an RRC message or data which is not segmented. The new layer may acknowledge that the sequence numbers indicate orders of different segments. Therefore, when a gap occurs in the sequence numbers, the new layer may detect occurrence of a loss.

The new layer of the receiving end checks a new header of current received data, removes the new header when the received data is the RRC message or data which is not segmented, and transmits the RRC message or data to an upper layer. When the received data is the RRC message or data (segment) which is segmented, the new layer of the receiving end checks a sequence number and an S field of a new header, stores the received data in a buffer, performs a reassembly when segments that are not the last segment and the last segment are all received, removes new headers of the segments, configures a complete RRC message or data, and transmits the complete RRC message or data to the upper layer. In this regard, a reassembly procedure may be performed, by checking the sequence numbers and the S fields, when all segments of one data (SEG SDU) are received. When the received segments are reassembled to be configured as complete data and then are transmitted to the upper layer, the received segments may be discarded from the buffer.

In FIG. 1I, reference numeral 1i-21 indicates a 2-5 embodiment of the method of segmenting and reassembling upper layer data.

In the 2-5 embodiment of the disclosure, a transmitting end and a receiving end may define and use a 1-bit segmentation field (S field). In the S field, two number of cases that are 0 and 1 may be defined to respectively indicate non-segmented complete data (or a last segment) and a segment that is not a last segment (alternatively, indication of existence of another segment). One-to-one mapping between two number of cases from among 0 and 1 of the S field and the non-segmented complete data (or the last segment) and the segment that is not the last segment (alternatively, indication of existence of another segment) may have 2 types, and each mapping relationship may be defined by using one of the 2 types. For example, the S field may be defined as shown in [Table 8] below.

TABLE 8

| Value | Description |
| --- | --- |
| 0 | The last segment of SEG SDU or complete SEG SDU or indicate that there is no more segment of this SEG SDU. |
| 1 | Non-last segment of SEG SDU or indicate that there is more segments of this SEG SDU. |

As described with reference to FIG. 1G, a newly-defined layer (a SEG layer) is defined and used above a PDCP layer, and thus, when a reception RLC layer operates in an AM mode, lossless data transmission is supported, and a reception PDCP layer reassembles data in order according to PDCP sequence numbers and transmits the data to a reception SEG layer. However, when the reception RLC layer operates in a UM mode and thus allows a loss, or due to that a base station is implemented to have a CU-DU split configuration, data transfer between a RLC layer and a PDCP layer is configured in a wireless or wired manner and thus a loss of data occurs, a new layer requires a sequence number, and only when the sequence number is used together with the 2-bit S field, the transmitting end may segment an RRC message or data even when the loss occurs, and the receiving end may receive data by successfully reassembling segmented data.

Operations of the transmitting end in the 2-5 embodiment of the method of segmenting and reassembling upper layer data are described below.

When a size of an RRC message or data received from an upper layer is greater than a maximum size or a particular threshold value which is supported by a PDCP layer, the new layer performs data segmentation, and when the size is not greater than it, the new layer does not perform data segmentation.

In the 2-5 embodiment, when a sequence number is assigned, a same sequence number may be assigned to a plurality of items of data (segments) that are split from a same upper layer data (SEG SDU). Therefore, the segments having the same sequence number may indicate that they are split from same data. However, when one data is segmented to at least three segments, and $1^{st}$ or $2^{nd}$ segment is lost, the receiving end cannot distinguish between the $1^{st}$ segment and the $2^{nd}$ segment or cannot detect whether a loss occurred in the $1^{st}$ or $2^{nd}$ segment, a reassembly error may occur. That is, the reassembly may not be successfully performed. Therefore, when segments are limited to be equal to or less than two segments, the receiving end may normally operate without an error. However, because the S field has only a 1-bit indicator, when a last segment is lost, a reassembly cannot be performed on data whose last segment is lost and data thereafter. Therefore, the 1-bit indicator is useful in a lossless case in which the RLC layer operates in a RLC AM mode.

When the new layer of the transmitting end performs data segmentation, the new layer assigns a same sequence number to segments, configures an S field of a new header with 1 for a segment that is not last segmented data (segment), attaches the header to the front of the segmented data, and transmits the segmented data to a lower layer. For the last segmented data (segment) (or the non-segmented complete data), the new layer configures an S field of a new header with 0, attaches the header to the front of the last segmented data (or the non-segmented complete data), and transmits the last segmented data to the lower layer.

When the new layer does not perform data segmentation, the new layer assigns a sequence number, configures an S field of a new header with 0 for data received from the upper layer, attaches the header to the front of the data, and transmits the data to the lower layer.

Operations of the receiving end in the 2-5 embodiment of the method of segmenting and reassembling upper layer data are described below.

In a case where a new layer or the method of segmenting and reassembling upper layer data described in the disclosure is configured with respect to a specific bearer (SRB or DRB), the new layer of the receiving end reads a new header, and checks whether information indicated by the header indicates the last segmented data (segment), the non-segmented complete data or non-existence of another segment or indicates existence of segmented data (segment) or another segment. The new layer may acknowledge that segments with a same sequence number are segmented from one data.

When an S field of a new header of current received data indicates 0 (i.e., the last segmented data (segment), the non-segmented complete data or non-existence of another segment), and data whose sequence number is equal to a current received sequence number and whose S field of a header is indicated as 1 is received, the new layer of the receiving end may reassemble the data with the current received data so as to configure complete data, may remove the new headers, and may transmit the complete data to the upper layer.

When the S field of the new header of the current received data indicates 0, and there is not data whose sequence number is equal to the current received sequence number and whose S field of the header is indicated as 1, the data being from among a plurality of items of data, i.e., when an S field of a header of data that is received immediately before is indicated as 0, this indicates that the current received data is complete data that is not segmented, and thus the new layer of the receiving end may remove the new header and may transmit the complete data to the upper layer.

When the S field of the new header of the current received data indicates 1 (indication of existence of segmented data (segment) or another segment), the new layer of the receiving end checks and removes the new header of the data, and stores, in a buffer, the data until a reassembly is to be performed or data having a same sequence number and whose S field of a header is configured as 0 arrives. When the received segments are reassembled to be configured as complete data and then are transmitted to the upper layer, the received segments may be discarded from the buffer.

In FIG. 1I, reference numeral 1i-22 indicates a 2-6 embodiment of the method of segmenting and reassembling upper layer data.

In the 2-6 embodiment of the disclosure, a transmitting end and a receiving end may define and use a 1-bit segmentation field (S field). In the S field, two number of cases that are 0 and 1 may be defined to respectively indicate non-segmented complete data (or a last segment) and a segment that is not a last segment (alternatively, indication of existence of another segment). One-to-one mapping between two number of cases from among 0 and 1 of the S field and the non-segmented complete data (or the last segment) and the segment that is not the last segment (alternatively, indication of existence of another segment) may have 2 types, and each mapping relationship may be defined by using one of the 2 types. For example, the S field may be defined as shown in [Table 9] below.

TABLE 9

| Value | Description |
|---|---|
| 0 | The last segment of SEG SDU or complete SEG SDU or indicate that there is no more segment of this SEG SDU. |
| 1 | Non-last segment of SEG SDU or indicate that there is more segments of this SEG SDU. |

As described with reference to FIG. 1G, a newly-defined layer (a SEG layer) is defined and used above a PDCP layer, and thus, when a reception RLC layer operates in an AM mode, lossless data transmission is supported, and a reception PDCP layer reassembles data in order according to PDCP sequence numbers and transmits the data to a reception SEG layer. However, when the reception RLC layer operates in a UM mode and thus allows a loss, or due to that a base station is implemented to have a CU-DU split configuration, data transfer between a RLC layer and a PDCP layer is configured in a wireless or wired manner and thus a loss of data occurs, a new layer requires a sequence number, and only when the sequence number is used together with the 2-bit S field, the transmitting end may segment an RRC message or data even when the loss occurs, and the receiving end may receive data by successfully reassembling segmented data.

Operations of the transmitting end in the 2-6 embodiment of the method of segmenting and reassembling upper layer data are described below.

When a size of an RRC message or data received from an upper layer is greater than a maximum size or a particular threshold value which is supported by a PDCP layer, the new layer performs data segmentation, and when the size is not greater than it, the new layer does not perform data segmentation.

In the 2-5 embodiment, when a sequence number is assigned, different sequence numbers may be assigned to a plurality of items of data (segments) that are split from a same upper layer data (SEG SDU). Therefore, the sequence numbers may respectively indicate orders of the segments, and the S field may indicate from which portions of data the respective segments are split. Accordingly, even when one data is segmented to at least three segments, and $1^{st}$ or $2^{nd}$ segment is lost, the receiving end can distinguish between the $2^{nd}$ segment and the $3^{rd}$ segment by using the sequence numbers or can detect whether a loss occurred. However, because the S field has only a 1-bit indicator, when a last segment is lost, a reassembly cannot be performed on data whose last segment is lost and data thereafter. Therefore, the 1-bit indicator is useful in a lossless case in which the RLC layer operates in a RLC AM mode.

When the new layer of the transmitting end performs data segmentation, the new layer assigns different sequence numbers to segments, configures an S field of a new header with 1 for a segment that is not last segmented data (segment), attaches the header to the front of the segmented data, and transmits the segmented data to a lower layer. For the last segmented data (segment) (or the non-segmented complete data), the new layer configures an S field of a new header with 0, attaches the header to the front of the last segmented data (or the non-segmented complete data), and transmits the last segmented data to the lower layer.

When the new layer does not perform data segmentation, the new layer assigns a sequence number, configures an S field of a new header with 0 for data received from the upper layer, attaches the header to the front of the data, and transmits the data to the lower layer.

Operations of the receiving end in the 2-6 embodiment of the method of segmenting and reassembling upper layer data are described below.

In a case where a new layer or the method of segmenting and reassembling upper layer data described in the disclosure is configured with respect to a specific bearer (SRB or DRB), the new layer of the receiving end reads a new header, and checks whether information indicated by the header indicates the last segmented data (segment), the non-segmented complete data or non-existence of another segment or indicates existence of segmented data (segment) or another segment. The new layer may acknowledge that the sequence numbers indicate orders of different segments. Therefore, when a gap occurs in the sequence numbers, the new layer may detect occurrence of a loss.

When an S field of a new header of current received data indicates 0 (i.e., the last segmented data (segment), the non-segmented complete data or non-existence of another segment), there is not a sequence number gap between a current received sequence number and a greatest sequence number of a plurality of items of data whose S field of a header is configured as 0, whose sequence numbers are smaller than the current received sequence number, and which have been received so far, and there are a plurality of items of data (segments) between the greatest sequence number and the current received sequence number, wherein an S field of a header of the plurality of items of data (segments) is configured as 1, the new layer of the receiving end may reassemble the plurality of items of data with the current received data so as to configure complete data, may remove the new headers, and may transmit the complete data to the upper layer.

When an S field of a new header of current received data indicates 0 (i.e., the last segmented data (segment), the non-segmented complete data or non-existence of another segment), there is not a sequence number gap between a current received sequence number and a greatest sequence number of a plurality of items of data whose S field of a header is configured as 0, whose sequence numbers are smaller than the current received sequence number, and which have been received so far, and there are not a plurality of items of data (segments) between the greatest sequence number and the current received sequence number, wherein an S field of a header of the plurality of items of data (segments) is configured as 1, the new layer of the receiving end may delete the new header of the current received data, and may transmit the current received data to the upper layer.

When the S field of the new header of the current received data indicates 1 (indication of existence of segmented data (segment) or another segment), the new layer of the receiving end checks and removes the new header of the data, and stores, in a buffer, the data until a reassembly is to be performed or, by checking the sequence numbers and the S fields, when all segments of one data (SEG SDU) are received. In this regard, a reassembly procedure may be performed, by checking the sequence numbers and the S fields, when all segments of one data (SEG SDU) are received. When the received segments are reassembled to be configured as complete data and then are transmitted to the upper layer, the received segments may be discarded from the buffer.

According to an embodiment of the disclosure, when the UE or the BS performs the method of segmenting and reassembling upper layer data, the UE or the BS may perform data segmentation in a byte unit and thus may facilitate a reassembly by the receiving end. Also, when a size of data received from the upper layer is greater than a particular threshold value and thus the transmitting end performs a segmentation procedure, the transmitting end may split data to segments each having a fixed size or a same size and thus may facilitate processing by the receiving end. As another method, when a size of data received from the upper layer is greater than a particular threshold value and thus the transmitting end performs a segmentation procedure, the transmitting end may split data to segments each having a variable size and thus may decrease an overhead of a header. As another method, when a size of data received from the upper layer is greater than a particular threshold value and thus the transmitting end performs a segmentation procedure, a size of split segments may be dependent on implementation of the UE or implementation of a network. In this regard, the particular threshold value may be configured via an RRC message by the BS.

According to an embodiment of the disclosure, when the UE or the BS performs the method of segmenting and reassembling upper layer data, the UE or the BS may define an indicator in a header so as to indicate segments to be all discarded, the segments being from among pre-received segments and not being reassembled.

According to an embodiment of the disclosure, when a new layer uses the method of segmenting and reassembling upper layer data, the new layer may generate a new header and may transmit, to a lower PDCP layer, the new header and data received from an upper layer.

In this regard, when the lower PDCP layer performs a ciphering procedure or an integrity protection procedure on the data of the upper layer, the lower PDCP layer may apply one of methods below thereto.

Method 1: For convenience of implementation of the UE, the lower PDCP layer performs ciphering on the new header of the new layer for segmentation and reassembly of the data of the upper layer with respect to a SRB and a DRB. In addition, the lower PDCP layer performs the integrity protection procedure on the new header.

Method 2: With respect to the SRB and the DRB, the lower PDCP layer does not perform ciphering on the new header of the new layer for segmentation and reassembly of the data of the upper layer so as to allow the receiving end to fast read information of the new header. In addition, the lower PDCP layer performs the integrity protection procedure on the new header.

Method 3: For convenience of implementation of the UE, the lower PDCP layer performs ciphering on the new header of the new layer for segmentation and reassembly of the data of the upper layer with respect to the SRB. However, with respect to the DRB, when a SDAP header is configured, the SDAP header should not be ciphered, such that the new header is positioned between a PDCP header and the SDAP header and thus ciphering may be unnecessarily performed twice and a ciphering procedure may become complicated. Therefore, with respect to the DRB, the lower PDCP layer does not perform ciphering on the new header of the new layer for segmentation and reassembly of the data of the upper layer. In addition, the lower PDCP layer performs the integrity protection procedure on the new header.

Method 4: For convenience of implementation of the UE, the lower PDCP layer performs ciphering on the new header of the new layer for segmentation and reassembly of the data of the upper layer with respect to the DRB. However, with respect to the SRB, the lower PDCP layer does not perform ciphering on the new header of the new layer for segmentation and reassembly of the data of the upper layer so as to allow the receiving end to fast read information of the new header. In addition, the lower PDCP layer performs the integrity protection procedure on the new header.

The 1-1 embodiment, the 1-2 embodiment, the 1-3 embodiment, the 2-1 embodiment, the 2-2 embodiment, the 2-3 embodiment, the 2-4 embodiment, the 2-5 embodiment, and the 2-6 embodiment about the method of segmenting and reassembling upper layer data may be adapted and then may be introduced to and used by other layers including an RRC layer, a SDAP layer, a PDCP layer, a RLC layer, or the like. When the embodiments of the disclosure are applied to other layers, the new layer in the aforementioned descriptions may be interpreted as another layer. That is, a 2-bit indicator or a 1-bit indicator may be defined in a header of the other layer and the aforementioned embodiments of the disclosure may be applied to the other layer, and when a sequence number is already present, the aforementioned embodiments of the disclosure may be performed by using the sequence number. When a sequence number does not exist, a new sequence number may be defined in the header of the other layer, the 2-bit indicator or the 1-bit indicator may be defined therein, and the embodiments of the disclosure may be applied thereto. Also, when it is required to indicate a length, an L field indicating a length may be defined and used. Also, when the embodiments of the disclosure are applied to the other layer, newly-defined header fields (a sequence number, the 2-bit indicator or the 1-bit indicator) are allowed to be used only when the method of segmenting and reassembling upper layer data is used, and a new indicator indicating existence or non-existence of the newly-defined header fields is defined in a header and is used, such that an overhead may be decreased.

Figure 1J:
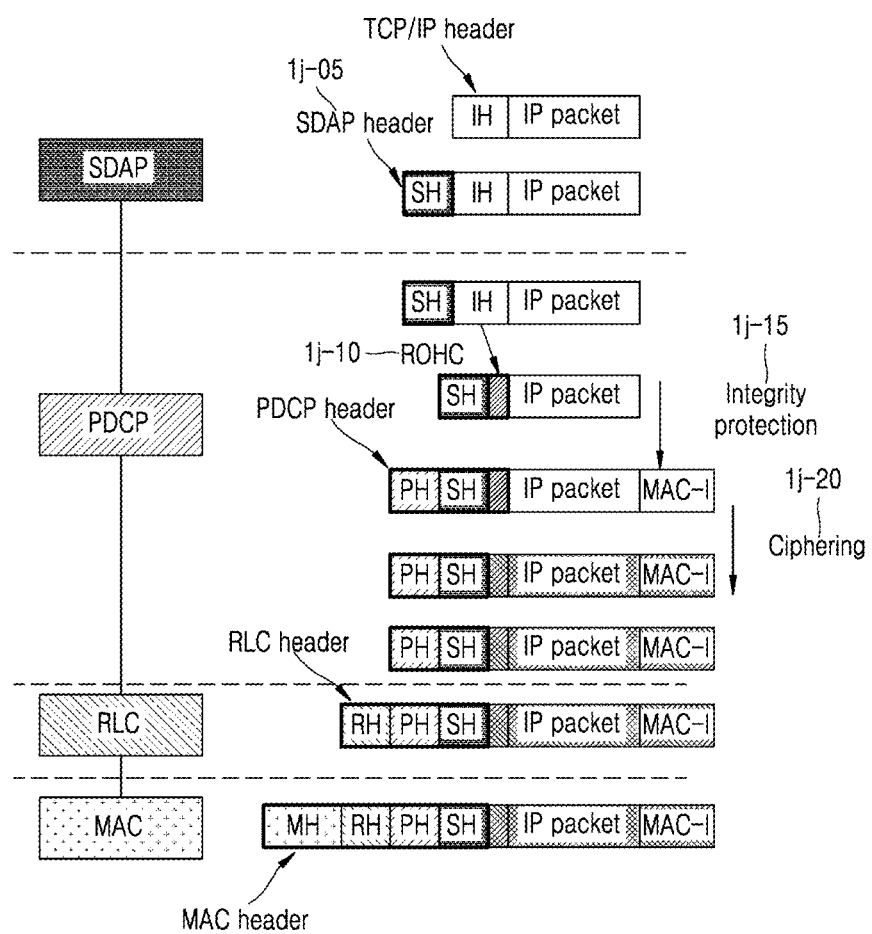
FIG. 1J illustrates a data processing procedure performed when an upper layer header compression procedure or integrity protection is configured, according to an embodiment of the disclosure.

FIG. 1J illustrates a data processing procedure performed when an upper layer header compression procedure or integrity protection is configured, according to an embodiment of the disclosure.

In FIG. 1J, each bearer in a UE or a BS may configure a PDCP layer and may perform data processing. As described with reference to FIG. 1E, an integrity protection and verification procedure or a header compression procedure is configured in a bearer, a logical channel or the PDCP layer via an RRC message, or a SDAP layer is configured, the data processing procedure may be performed as shown in FIG. 1J.

Referring to FIG. 1J, when the SDAP layer receives data from an upper layer, the SDAP layer may check a QoS flow, may generate and concatenate a SDAP header with the data, and may transmit the data to a bearer or a PDCP layer mapped thereto. In a case where a header compression procedure (Robust Header Compression (ROHC)) is configured, when the PDCP layer receives the data, the PDCP layer may perform the header compression procedure on a header of a layer upper than the SDAP layer in the data received from the upper layer, except for the SDAP header, may generate a PDCP header, and thus may configure data (PDCP PDU) (1$j$-10). When an integrity protection and verification procedure is configured, the PDCP layer may perform an integrity protection procedure on data and a compressed header including the PDCP header and the SDAP header (1$j$-15), may calculate MAC-I having a preset length and concatenate MAC-I to the rear of the data, may perform a ciphering procedure (1$j$-20), and thus may complete processing of the data of the PDCP layer. Then, the PDCP layer may transmit the data to a lower layer.

In the disclosure, a procedure based on the header compression procedure (ROHC) may be extensively applied to a user data compression procedure (uplink data compression (UDC)), or a new header or a data compression procedure of the PDCP layer.

Hereinafter, according to an embodiment of the disclosure, methods for efficiently processing data according to which protocol layer performs the method of segmenting and reassembling upper layer data (e.g., the 1-1 embodiment, the 1-2 embodiment, the 1-3 embodiment, the 2-1 embodiment, the 2-2 embodiment, the 2-3 embodiment, the 2-4 embodiment, the 2-5 embodiment, and the 2-6 embodiment) will now be described.

Figure 1K:
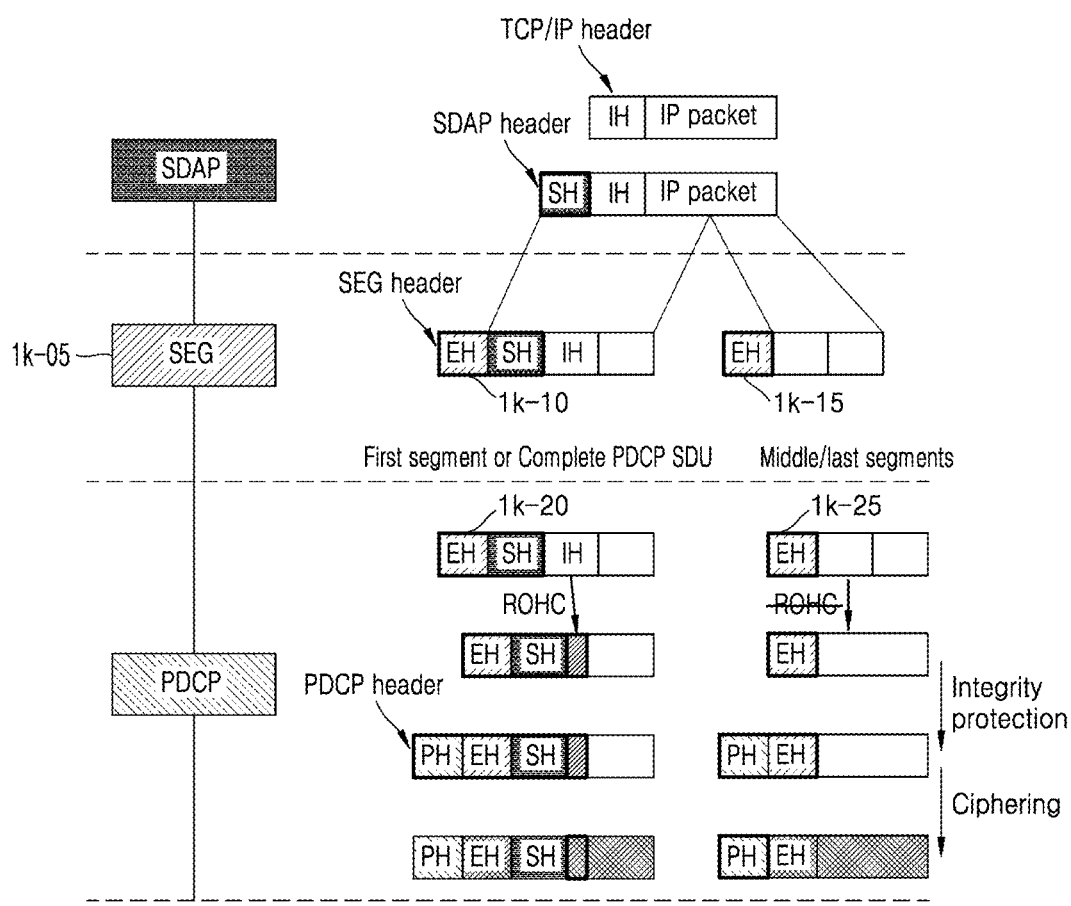
FIG. 1K illustrates a third embodiment in which a Packet Data Convergence Protocol (PDCP) layer efficiently processes data when the first embodiment or the second embodiment is applied to a new layer positioned above the PDCP layer, according to an embodiment of the disclosure.

FIG. 1K illustrates a third embodiment in which a PDCP layer efficiently processes data when the first embodiment or the second embodiment is applied to a new layer positioned above the PDCP layer, according to an embodiment of the disclosure.

According to the third embodiment of the disclosure, a header compression and decompression procedure, an integrity protection and verification procedure or a ciphering and deciphering procedure of a case where the aforementioned method of segmenting and reassembling upper layer data (the 1-1 embodiment, the 1-2 embodiment, the 1-3 embodiment, the 2-1 embodiment, the 2-2 embodiment, the 2-3 embodiment, the 2-4 embodiment, the 2-5 embodiment, and the 2-6 embodiment) is applied to a new layer 1$k$-05 positioned above the PDCP layer will now be described.

A PDCP layer of a transmitter: When the PDCP layer of the transmitter receives data from an upper layer that performs a segmentation operation, the PDCP layer of the transmitter may identify whether the data is not segmented or the data is first segmented data, middle segmented data or last segmented data by checking a header of the upper layer, and thus may differently perform data processing as below.

When the data is not segmented or the data is first segmented data (or a front segment) (1k-10 and 1k-20):

When a SDAP layer is configured and a header compression procedure is configured, for convenience of implementation of a UE, the PDCP layer may apply and perform the header compression procedure on the header of the upper layer (e.g., a header of a TCP/IP layer, a header of a UDP layer or a header of another upper layer), except for a SDAP header of the data. As another method, to allow a receiving end to read segmentation information before deciphering, the PDCP layer may apply and perform the header compression procedure on the header of the upper layer (e.g., the header of the TCP/IP layer, the UDP header or a header of another upper layer), except for the SDAP header and a header of a SEG layer including the segmentation information of the upper layer. When integrity protection is configured, the PDCP layer may apply the integrity protection to headers and the data. After the header compression procedure is applied, for convenience of implementation of the UE with respect to the headers and the data, a ciphering procedure may be performed on other headers and the data, except for the SDAP header. As another method, to allow the receiving end to read the segmentation information before deciphering, the PDCP layer may perform the ciphering procedure only on other compressed headers and the data, except for the SDAP header and the header of the SEG layer including the segmentation information of the upper layer.

When the data is middle segmented data or last segmented data (1k-15 and 1k-25):

When the SDAP layer is configured and the header compression procedure is configured, the data does not include the SDAP header or headers of upper layers such as the TCP/IP layer or the UDP layer, and thus the PDCP layer does not apply the header compression procedure. When integrity protection is configured, the PDCP layer may apply the integrity protection to the headers and the data. Also, for convenience of implementation of the UE, the ciphering procedure may be performed on all of the headers and the data. As another method, to allow the receiving end to read the segmentation information before deciphering, the PDCP layer may perform the ciphering procedure only on other data, except for the header of the SEG layer including the segmentation information of the upper layer.

A PDCP layer of a receiver: When the PDCP layer of the receiver receives data a lower layer, the PDCP layer of the receiver may identify whether the data is not segmented or the data is first segmented data, middle segmented data or last segmented data by checking a header of a upper layer, and thus may differently perform data processing as below. When a header including segmentation information is ciphered, the PDCP layer may perform a deciphering procedure and then may perform a header decompression procedure by identifying the data that is not segmented, the first segmented data, the middle segmented data or the last segmented data.

When the data is not segmented or the data is first segmented data (or a front segment) (1k-10 and 1k-20):

The PDCP layer may perform the deciphering procedure on other headers and the data, except for a SDAP header of the data. As another method, the PDCP layer may perform the deciphering procedure only on other compressed headers and the data, except for the SDAP header and a header of a SEG layer including the segmentation information of the upper layer. When integrity protection is configured, the PDCP layer may apply the integrity protection to headers and the data. In this regard, after the deciphering procedure is performed, when a SDAP layer is configured and a header compression procedure is configured, the PDCP layer may apply and perform a header decompression procedure on the header of the upper layer (e.g., a header of a TCP/IP layer, a header of a UDP layer or a header of another upper layer), except for the SDAP header, in the data. As another method, the PDCP layer may apply and perform the header decompression procedure on the header of the upper layer (e.g., the header of the TCP/IP layer, the header of the UDP layer or a header of another upper layer), except for the SDAP header and the header of the SEG layer including the segmentation information of the upper layer.

When the data is middle segmented data or last segmented data (1k-15 and 1k-25):

When the SDAP layer is configured and the header compression procedure is configured, the data does not include the SDAP header or headers of upper layers such as the TCP/IP layer or the UDP layer, and thus the PDCP layer may perform the deciphering procedure on both the header and the data, and when integrity protection is configured, the PDCP layer may apply the integrity protection to the headers and the data. As another method, the receiver may perform the deciphering procedure only on other data except for the header of the SEG layer including the segmentation information of the upper layer.

The third embodiment of the disclosure is characterized in that non-segmented data, first segmented data, middle segmented data or last segmented data is identified and then different data processing procedures are performed accordingly. That is, for the non-segmented data or the first segmented data, a header compression and decompression procedure may be applied, and a ciphering and deciphering procedure may be performed, in consideration of a SDAP header or a header of a new layer, and for the middle segmented data or the last segmented data, the header compression and decompression procedure may not be applied, and the ciphering and deciphering procedure may be performed, without consideration of the SDAP header or the header of the new layer.

Figure 1L:
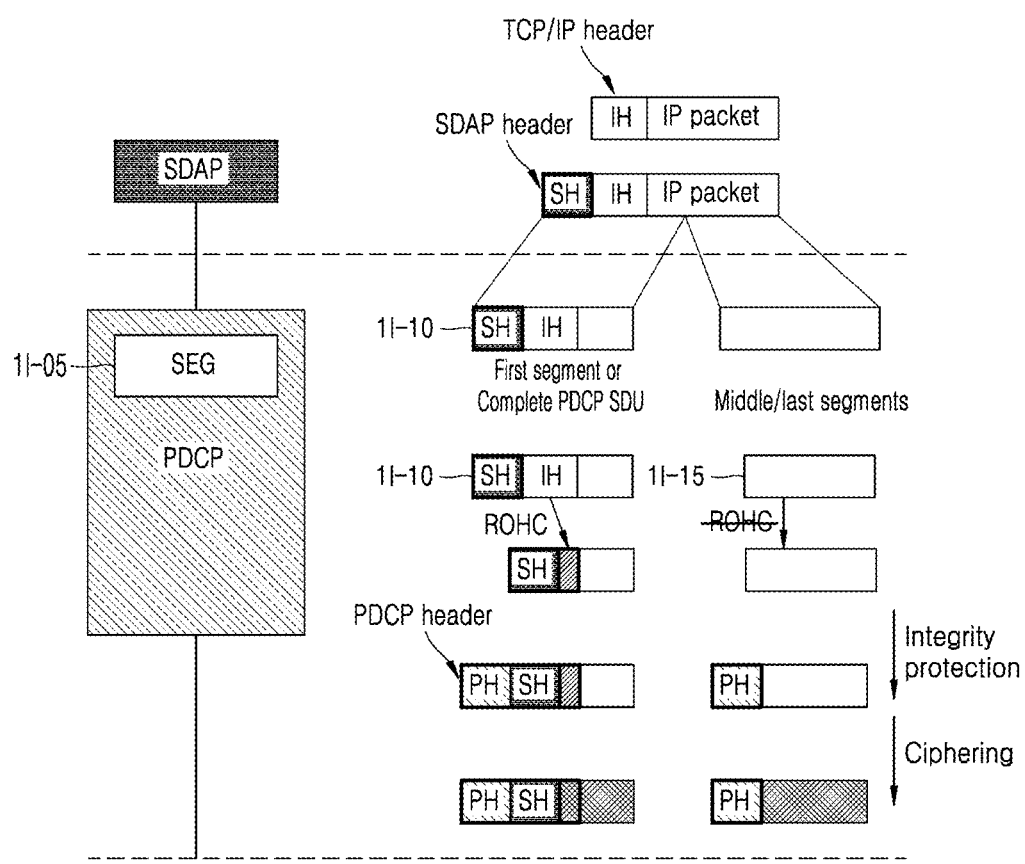
FIG. 1L illustrates a fourth embodiment in which a PDCP layer efficiently processes data when the first embodiment or the second embodiment is applied to the PDCP layer, and the segmenting method is performed before a header compression procedure, integrity protection, or a ciphering procedure is performed, according to an embodiment of the disclosure.

FIG. 1L illustrates a fourth embodiment in which a PDCP layer efficiently processes data when the first embodiment or the second embodiment is applied to the PDCP layer, and the segmenting method is performed before a header compression procedure, integrity protection, or a ciphering procedure is performed, according to an embodiment of the disclosure.

According to the fourth embodiment of the disclosure, a header compression and decompression procedure, an integrity protection and verification procedure or a ciphering and deciphering procedure of a case where the aforementioned method of segmenting and reassembling upper layer data (the 1-1 embodiment, the 1-2 embodiment, the 1-3 embodiment, the 2-1 embodiment, the 2-2 embodiment, the 2-3 embodiment, the 2-4 embodiment, the 2-5 embodiment, and the 2-6 embodiment) is applied to the PDCP layer and the segmenting method is performed before the header compression procedure, the integrity protection, or the ciphering procedure is performed will now be described.

A PDCP layer of a transmitter: When the PDCP layer of the transmitter receives data from an upper layer, the PDCP layer may perform a segmentation procedure on data whose size is greater than a size supportable by the PDCP layer, and may not perform the segmentation procedure on data whose size is smaller than the size supportable by the PDCP layer. After the PDCP layer performs the segmentation procedure, the PDCP layer may indicate segmentation information about each data in a PDCP header and may differently perform data processing as below by identifying whether the data is not segmented or the data is first segmented data, middle segmented data or last segmented data.

When the data is not segmented or the data is first segmented data (or a front segment) (1/-10):

When a SDAP layer is configured and a header compression procedure is configured, for convenience of implementation of a UE, the PDCP layer may apply and perform the header compression procedure on the header of the upper layer (e.g., a header of a TCP/IP layer, a header of a UDP layer or a header of another upper layer), except for a SDAP header of the data. When integrity protection is configured, the PDCP layer may apply the integrity protection to headers and the data. In this regard, for convenience of implementation of the UE with respect to headers and data (because the implementation is equal to an existing implementation technique), after the header compression procedure is performed, the ciphering procedure may be performed on the data and other headers (headers of upper layers) except for the SDAP header.

When the data is middle segmented data or last segmented data (1/-15):

When the SDAP layer is configured and the header compression procedure is configured, the data does not include the SDAP header or headers of upper layers such as the TCP/IP layer or the UDP layer, and thus the PDCP layer does not apply the header compression procedure. When integrity protection is configured, the PDCP layer may apply the integrity protection to the headers and the data. Also, for convenience of implementation of the UE, the ciphering procedure may be performed on all of the headers and the data.

A PDCP layer of a receiver: When the PDCP layer of the receiver receives data a lower layer, the PDCP layer of the receiver may identify whether the data is not segmented or the data is first segmented data, middle segmented data or last segmented data by checking a header of the PDCP layer, and thus may differently perform data processing as below.

When the data is not segmented or the data is first segmented data (or a front segment) (1/-10):

When a SDAP layer is configured and a header compression procedure is configured, the PDCP layer may apply and perform a deciphering procedure on the data, except for a SDAP header of the data. When integrity protection is configured, the PDCP layer may perform integrity verification after the deciphering procedure is performed, and the integrity verification is successful, the PDCP layer may perform a header decompression procedure on headers of upper layers (e.g., a header of a TCP/IP layer, a header of a UDP layer or a header of another upper layer), except for the SDAP header. In this regard, when the PDCP layer fails in integrity verification, the PDCP layer may discard the data. Alternatively, the PDCP layer may discard the data and may request retransmission.

When the data is middle segmented data or last segmented data (1/-15):

When the SDAP layer is configured and the header compression procedure is configured, the data does not include the SDAP header or headers of upper layers such as the TCP/IP layer or the UDP layer, and thus the PDCP layer may perform the deciphering procedure on both the header and the data, and when integrity protection is configured, the PDCP layer may apply the integrity protection to the header and the data. Then, the PDCP layer does not apply a header decompression procedure.

As another method, the PDCP layer of the receiver may identify whether a plurality of items of received data are non-segmented data, or first segmented data, middle segmented data or last segmented data and then may perform different deciphering procedures. With respect to a header decompression procedure, the PDCP layer may perform the header decompression procedure only when the PDCP layer generates complete data by performing a reassembly procedure on a plurality of pieces of segmented data. That is, when segments split from data are not completely received, the data may be discarded, and in this regard, because the PDCP layer performs the header decompression procedure only on complete data, the PDCP layer may not unnecessarily perform the header decompression procedure. On the other hand, when the header decompression procedure is performed on each of the segments of the data before a reassembly is performed, data processing time may be preferably decreased.

The fourth embodiment of the disclosure is characterized in that different data processing procedures are performed by identifying non-segmented data, or first segmented data, middle segmented data or last segmented data. That is, for the non-segmented data or the first segmented data, a header compression and decompression procedure may be applied, and a ciphering and deciphering procedure may be performed, in consideration of a SDAP header, and for the middle segmented data or the last segmented data, the header compression and decompression procedure may not be applied, and the ciphering and deciphering procedure may be performed, without consideration of the SDAP header.

Figure 1M:
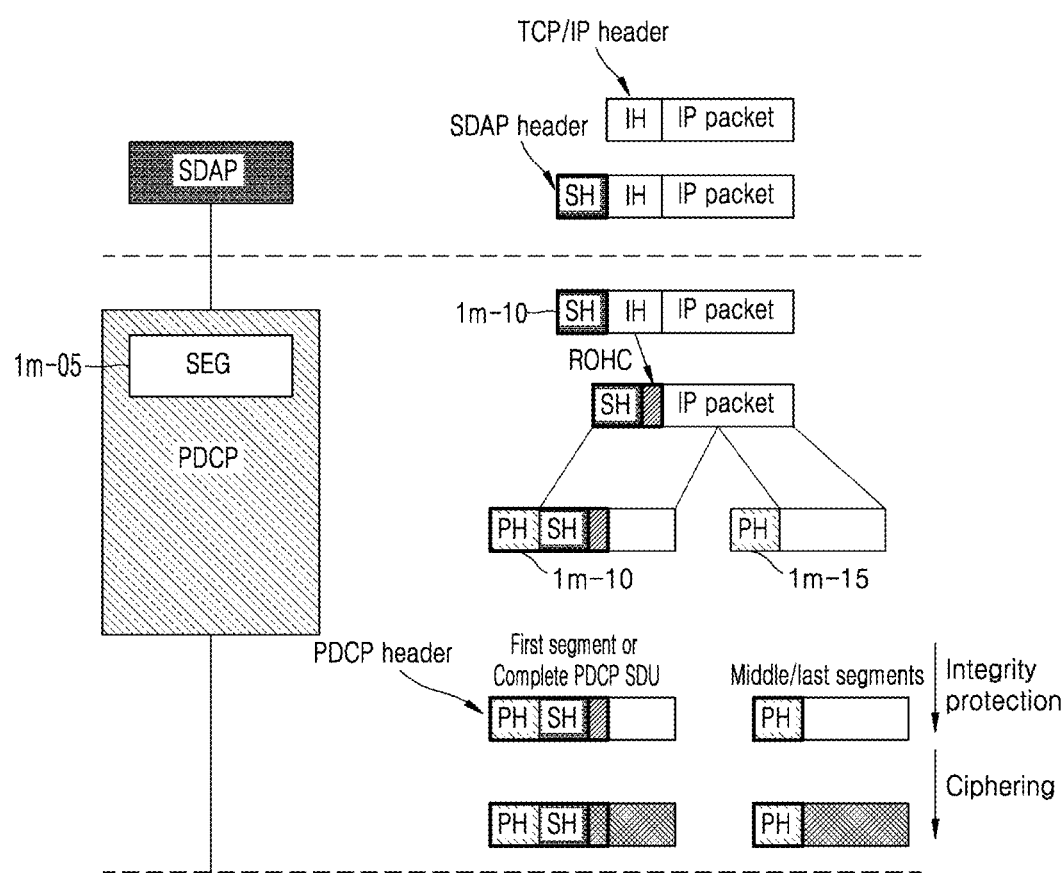
FIG. 1M illustrates a fifth embodiment in which a PDCP layer efficiently processes data when the first embodiment or the second embodiment is applied to the PDCP layer, and the segmenting method is performed after a header compression procedure is performed and before integrity protection or a ciphering procedure is performed, according to an embodiment of the disclosure.

FIG. 1M illustrates a fifth embodiment in which a PDCP layer efficiently processes data when the first embodiment or the second embodiment is applied to the PDCP layer, and the segmenting method is performed after a header compression procedure is performed and before integrity protection or a ciphering procedure is performed, according to an embodiment of the disclosure.

According to the fifth embodiment of the disclosure, a header compression and decompression procedure, an integrity protection and verification procedure or a ciphering and deciphering procedure of a case where the aforementioned method of segmenting and reassembling upper layer data (the 1-1 embodiment, the 1-2 embodiment, the 1-3 embodiment, the 2-1 embodiment, the 2-2 embodiment, the 2-3 embodiment, the 2-4 embodiment, the 2-5 embodiment, and the 2-6 embodiment) is applied to the PDCP layer and the segmenting method is performed after the header compression procedure is performed and before the integrity protection or the ciphering procedure is performed will now be described.

A PDCP layer of a transmitter: When the PDCP layer of the transmitter receives data from an upper layer and a SDAP layer or a header compression procedure is configured, the PDCP layer may perform a segmentation procedure on data whose size is greater than a size supportable by the PDCP layer, and may not perform the segmentation procedure on data whose size is smaller than the size supportable by the PDCP layer, wherein the data is compressed by having the header compression procedure performed on a header of the upper layer, except for a SDAP layer. After the PDCP layer performs the segmentation procedure, the PDCP layer may indicate segmentation information about each data in a PDCP header and may differently perform data processing as below by identifying whether the data is not segmented or the data is first segmented data, middle segmented data or last segmented data.

When the data is not segmented or the data is first segmented data (or a front segment) (1m-10):

When the SDAP layer is configured, the header compression procedure is configured, and integrity protection is configured, the integrity protection may be performed on the header and the data. In this regard, for convenience of implementation of a UE with respect to headers and data (because the implementation is equal to an existing implementation technique), after the header compression procedure or the integrity protection procedure is performed, the ciphering procedure may be performed on the data and other headers (headers of upper layers or compressed headers) except for the SDAP header.

When the data is middle segmented data or last segmented data (1m-15):

When the SDAP layer is configured, the header compression procedure is configured, and integrity protection is configured, the integrity protection may be performed on the header and the data. Because the SDAP header or headers of upper layers such as the TCP/IP layer or the UDP layer are not included in the data, the PDCP layer may not consider the SDAP header and may perform a ciphering procedure on both the header and the data for convenience of implementation of the UE.

A PDCP layer of a receiver: When the PDCP layer of the receiver receives data a lower layer, the PDCP layer of the receiver may identify whether the data is not segmented or the data is first segmented data, middle segmented data or last segmented data by checking a header of the PDCP layer, and thus may differently perform data processing as below.

When the data is not segmented or the data is first segmented data (or a front segment) (1m-10):

When a SDAP layer is configured and a header compression procedure is configured, the PDCP layer may apply and perform a deciphering procedure on the data, except for a SDAP header of the data. When integrity protection is configured, the PDCP layer may perform integrity verification after the deciphering procedure is performed, and the integrity verification is successful, the PDCP layer may perform a header decompression procedure on headers of upper layers (e.g., a header of a TCP/IP layer, a header of a UDP layer or a header of another upper layer), except for the SDAP header. In this regard, when the PDCP layer fails in integrity verification, the PDCP layer may discard the data. Alternatively, the PDCP layer may discard the data and may request retransmission.

When the data is middle segmented data or last segmented data (1m-15):

When the SDAP layer is configured and the header compression procedure is configured, the data does not include the SDAP header or headers of upper layers such as the TCP/IP layer or the UDP layer, and thus the PDCP layer may perform the deciphering procedure on both the header and the data, and when integrity protection is configured, the PDCP layer may apply the integrity protection to the header and the data. Then, the PDCP layer does not apply a header decompression procedure.

As another method, the PDCP layer of the receiver may identify whether a plurality of items of received data are non-segmented data, or first segmented data, middle segmented data or last segmented data and then may perform different deciphering procedures. With respect to a header decompression procedure, the PDCP layer may perform the header decompression procedure only when the PDCP layer generates complete data by performing a reassembly procedure on a plurality of pieces of segmented data. That is, when segments split from data are not completely received, the data may be discarded, and in this regard, because the PDCP layer performs the header decompression procedure only on complete data, the PDCP layer may not unnecessarily perform the header decompression procedure. On the other hand, when the header decompression procedure is performed on each of the segments of the data before a reassembly is performed, data processing time may be preferably decreased.

The fifth embodiment of the disclosure is characterized in that different data processing procedures are performed by identifying non-segmented data, or first segmented data, middle segmented data or last segmented data. That is, for the non-segmented data or the first segmented data, a header compression and decompression procedure may be applied, and a ciphering and deciphering procedure may be performed, in consideration of a SDAP header, and for the middle segmented data or the last segmented data, the header compression and decompression procedure may not be applied, and the ciphering and deciphering procedure may be performed, without consideration of the SDAP header.

Figure 1N:
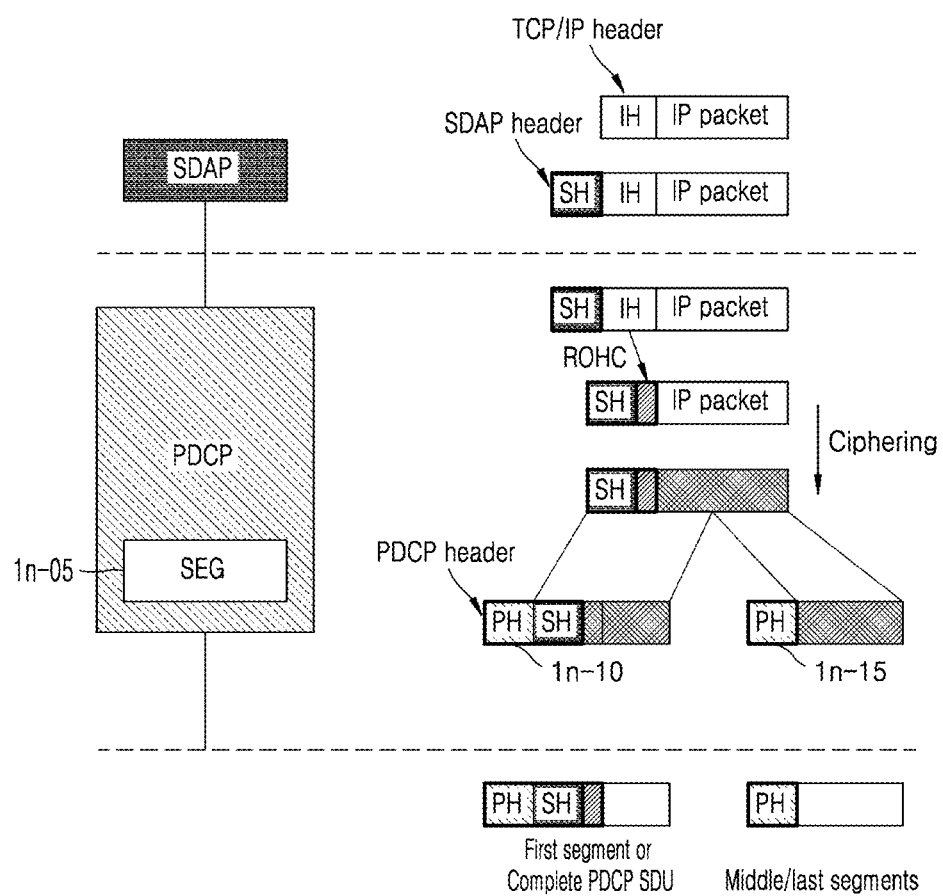
FIG. 1N illustrates a sixth embodiment in which a PDCP layer efficiently processes data when the first embodiment or the second embodiment is applied to the PDCP layer, and the segmenting method is performed after a header compression procedure, integrity protection, or a ciphering procedure is performed, according to an embodiment of the disclosure.
Figure 10:
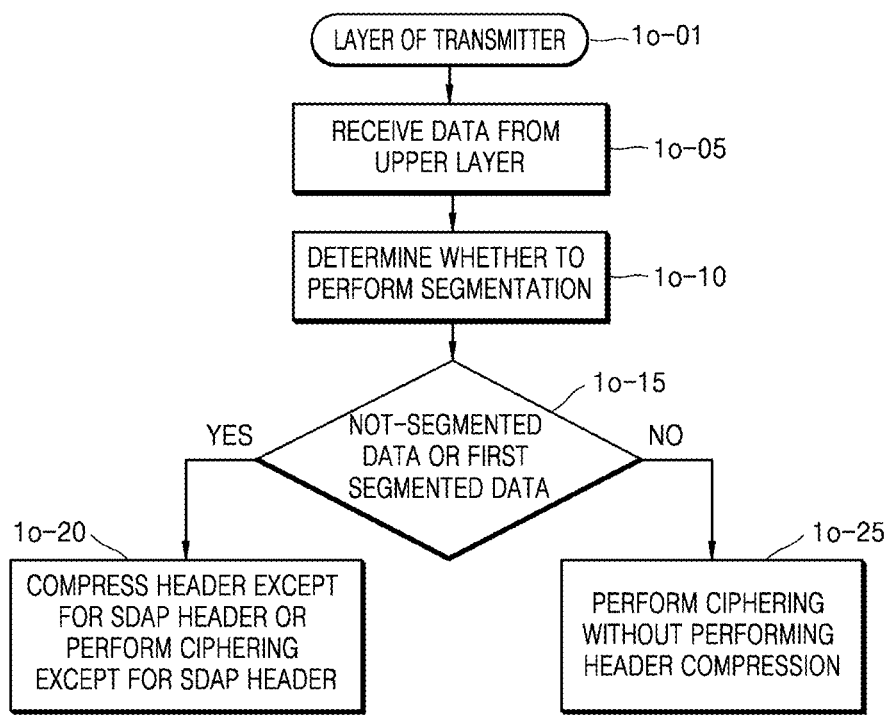

FIG. 1N illustrates a sixth embodiment in which a PDCP layer efficiently processes data when the first embodiment or the second embodiment is applied to the PDCP layer, and the segmenting method is performed after a header compression procedure, integrity protection, or a ciphering procedure is performed, according to an embodiment of the disclosure.

According to the sixth embodiment of the disclosure, a header compression and decompression procedure, an integrity protection and verification procedure or a ciphering and deciphering procedure of a case where the aforementioned method of segmenting and reassembling upper layer data (the 1-1 embodiment, the 1-2 embodiment, the 1-3 embodiment, the 2-1 embodiment, the 2-2 embodiment, the 2-3 embodiment, the 2-4 embodiment, the 2-5 embodiment, and the 2-6 embodiment) is applied to the PDCP layer and the segmenting method is performed after the header compression procedure, the integrity protection, or the ciphering procedure is performed will now be described.

A PDCP layer of a transmitter: When the PDCP layer of the transmitter receives data from an upper layer and a SDAP layer or a header compression procedure is configured, the PDCP layer may perform a segmentation procedure on data whose size is greater than a size supportable by the PDCP layer and may not perform the segmentation procedure on data whose size is smaller than the size supportable by the PDCP layer, wherein the data is achieved in a manner that the header compression procedure is performed on a header of the upper layer, except for a SDAP layer, integrity protection is applied to the data when the integrity protection is configured, and ciphering is applied to the data, except for the SDAP layer. After the PDCP layer performs the segmentation procedure, the PDCP layer may indicate segmentation information about each data in a PDCP header, may identify whether the data is not segmented or the data is first segmented data, middle segmented data or last segmented data, may generate respective PDCP headers thereof, and may deliver the segments of the data to a lower layer. Then, the transmitter may transmit the segments of the data.

A PDCP layer of a receiver: When the PDCP layer of the receiver receives data a lower layer, the PDCP layer of the receiver may identify whether the data is not segmented or the data is first segmented data, middle segmented data or last segmented data by checking a header of the PDCP layer, and may reassemble a plurality of pieces of segmented data to complete data, based on PDCP sequence numbers and a segmentation information indicator in the PDCP header. In this regard, a deciphering procedure may be performed on the plurality of pieces of data reassembled to the complete data, except for the SDAP header, and may perform a header decompression procedure on the data, except for the SDAP header. As another method, to accelerate data processing, deciphering may be performed on each of the plurality of pieces of segmented data before being reassembled (segment-level deciphering), and in a case where corresponding data is non-segmented data or first segmented data (or a front segment) (1n-10), when a SDAP layer is configured and a header compression procedure is configured, the PDCP layer may perform the header decompression procedure on a header of the upper layer (e.g., a header of a TCP/IP layer, a header of a UDP layer or a header of another upper layer), except for the SDAP header. In a case where the corresponding data is middle segmented data or last segmented data (1n-15), when the SDAP layer is configured and the header compression procedure is configured, the data does not include the SDAP header or headers of upper layers such as the TCP/IP layer or the UDP layer, and thus the PDCP layer does not apply the header decompression procedure.

That is, the PDCP layer of the receiver may differently perform deciphering on the corresponding data by identifying whether the corresponding data is non-segmented data, or first segmented data, middle segmented data or last segmented data. With respect to the header decompression procedure, the PDCP layer may perform the header decompression procedure only when the PDCP layer generates complete data by performing a reassembly procedure on a plurality of pieces of segmented data. That is, when segments split from data are not completely received, the data may be discarded, and in this regard, because the PDCP layer performs the header decompression procedure only on complete data, the PDCP layer may not unnecessarily perform the header decompression procedure. On the other hand, when the header decompression procedure is performed on each of the segments of the data before a reassembly is performed, data processing time may be preferably decreased.

The sixth embodiment of the disclosure is characterized in that non-segmented data, or first segmented data, middle segmented data or last segmented data is not identified, and the PDCP layer of the transmitter performs a data processing procedure before segmentation and the PDCP layer of the receiver performs the same data processing procedure after a reassembly. When another method is applied to the sixth embodiment of the disclosure, different data processing procedures may be performed by identifying non-segmented data, or first segmented data, middle segmented data or last segmented data.

In the aforementioned embodiments of the disclosure, a procedure based on the header compression procedure (ROHC) may be extensively applied to a user data compression procedure (uplink data compression (UDC)), or a new header or a data compression procedure of the PDCP layer. However, even when the data compression procedure is applicable not only to a header but also to data, a compression procedure of the PDCP layer may be applied to non-segmented data, first segmented data, middle segmented data and last segmented data without identifying the non-segmented data, the first segmented data, the middle segmented data or the last segmented data. The ciphering and deciphering procedure may be applied by identifying data as in the third embodiment, the fourth embodiment, the fifth embodiment or the sixth embodiment of the disclosure. Also, in the aforementioned embodiments of the disclosure, the new layer or the PDCP layer may discard a plurality of pieces of segmented data when the plurality of pieces of segmented data are not reassembled until a timer defined and configured in the new layer or a reassembly timer of the PDCP layer is expired.

FIG. 1O illustrates operations of a transmitting end of a UE with respect to the method of segmenting and reassembling upper layer data, according to an embodiment of the disclosure.

A layer of transmitter 1o-01 may determine whether segmentation is requested, by checking whether a size of an RRC message or data received from an upper layer (1o-05) is greater or smaller than a maximum size or a particular threshold value (that is configurable using an RRC message) which is supported by a PDCP layer (1o-10). When the size of the RRC message or the data received from the upper layer is greater than the particular threshold value, the layer of transmitter 1o-01 performs data segmentation, and when the size is not greater than it, the layer of transmitter 1o-01 does not perform data segmentation. When the layer of transmitter 1o-01 performs data segmentation, the layer of transmitter 1o-01 may assign sequence numbers to segments and may configure segmentation information indicators respectively mapped to the segments. When the layer of transmitter 1o-01 does not perform data segmentation, the layer of transmitter 1o-01 may assign a sequence number to complete data and may configure a segmentation information indicator therefore. Then, as in the third embodiment, the fourth embodiment, the fifth embodiment or the sixth embodiment of the disclosure, a plurality of pieces of data may be differently processed. That is, data processing (1o-20) for non-segmented data or first segmented data may be distinguished from data processing (1o-25) for middle segmented data or last segmented data, and different data processing procedures may be performed as described in the third embodiment, the fourth embodiment, the fifth embodiment or the sixth embodiment of the disclosure.

Figure 1P:
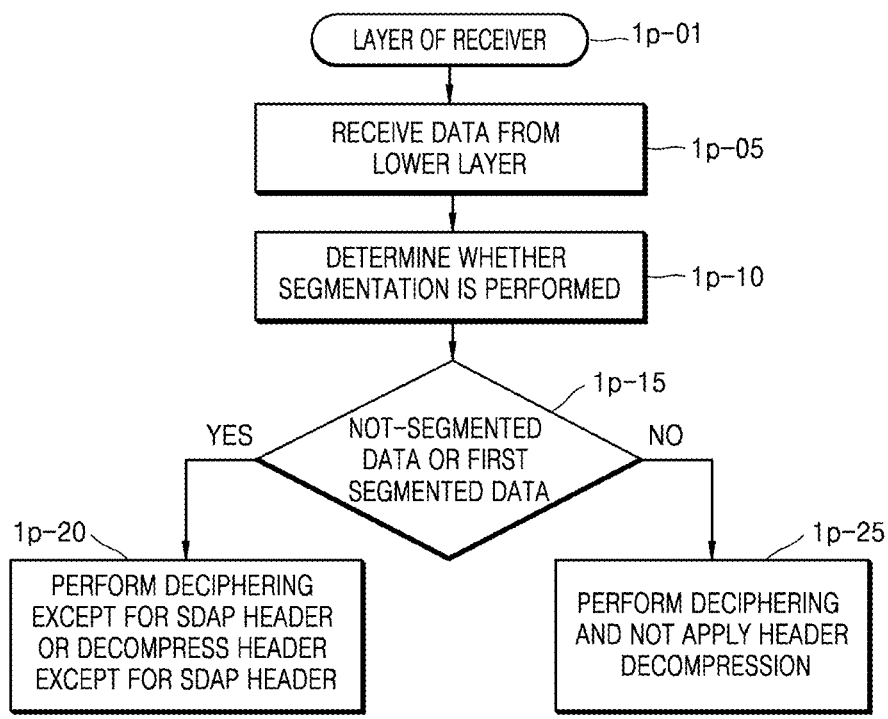
FIG. 1P illustrates operations of a receiving end of a UE with respect to the method of segmenting and reassembling upper layer data, according to an embodiment of the disclosure.

FIG. 1P illustrates operations of a receiving end of a UE with respect to the method of segmenting and reassembling upper layer data, according to an embodiment of the disclosure.

A layer of receiver 1p-01 may check whether data is segmented, by checking an RRC message or a header of data received from a lower layer (1p-05). Then, via a procedure of checking segmentation, the layer of receiver 1p-01 may identify whether the received data is non-segmented data, first segmented data, middle segmented data or last segmented data. Then, as in the third embodiment, the fourth embodiment, the fifth embodiment or the sixth embodiment of the disclosure, a plurality of pieces of data may be differently processed. That is, data processing (1p-20) for non-segmented data or first segmented data may be distinguished from data processing (1p-25) for middle segmented data or last segmented data, and different data processing procedures may be performed as described in the third embodiment, the fourth embodiment, the fifth embodiment or the sixth embodiment of the disclosure.

Figure 1Q:
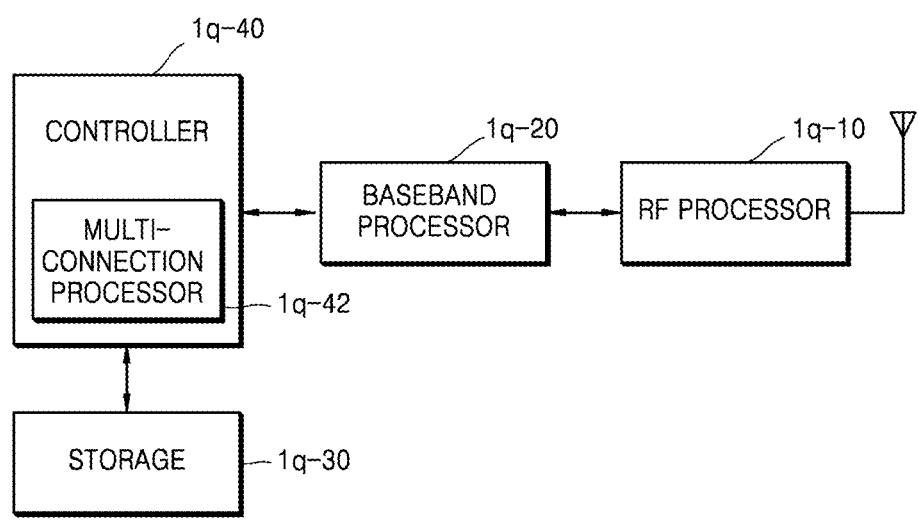
FIG. 1Q illustrates a block diagram of a configuration of a UE or a radio node, according to an embodiment of the disclosure.

FIG. 1Q illustrates a block diagram of a configuration of a UE or a radio node, according to an embodiment of the disclosure.

Referring to FIG. 1Q, the UE includes a radio frequency (RF) processor 1q-10, a baseband processor 1q-20, a storage 1q-30, and a controller 1q-40.

The RF processor 1q-10 may perform functions for transmitting and receiving signals through wireless channels, e.g., band conversion and amplification of the signals. That is, the RF processor 1q-10 may up-convert a baseband signal provided from the baseband processor 1q-20, into an RF band signal and then may transmit the RF band signal through an antenna, and may down-convert an RF band signal received through the antenna, into a baseband signal. For example, the RF processor 1q-10 may include a transmit filter, a receive filter, an amplifier, a mixer, an oscillator, a digital-to-analog convertor (DAC), an analog-to-digital convertor (ADC), or the like. Although only one antenna is illustrated in FIG. 1Q, the UE may include a plurality of antennas. The RF processor 1q-10 may include a plurality of RF chains. In addition, the RF processor 1q-10 may perform beamforming. For beamforming, the RF processor 1q-10 may adjust phases and powers of signals to be transmitted or received through a plurality of antennas or antenna elements. The RF processor 1q-10 may perform a multiple-input multiple-output (MIMO) operation and may receive a plurality of layers in the MIMO operation. The RF processor 1q-10 may perform receiving beam sweeping by appropriately configuring a plurality of antennas or antenna elements, or may adjust a direction and a beam width of a received beam to coordinate with a transmit beam, by the control of the controller 1q-40.

The baseband processor 1q-20 may convert between a baseband signal and a bitstream based on physical layer specifications of a system. For example, for data transmission, the baseband processor 1q-20 may generate complex symbols by encoding and modulating a transmit bitstream. For data reception, the baseband processor 1q-20 may reconstruct a received bitstream by demodulating and decoding a baseband signal provided from the RF processor 1q-10. For example, according to an OFDM scheme, for data transmission, the baseband processor 1q-20 may generate complex symbols by encoding and modulating a transmit bitstream, may map the complex symbols to subcarriers, and then may configure OFDM symbols by performing an inverse fast Fourier transform (IFFT) operation and cyclic prefix (CP) insertion. For data reception, the baseband processor 1q-20 may segment a baseband signal provided from the RF processor 1q-10, into OFDM symbol units, may reconstruct signals mapped to subcarriers by performing a fast Fourier transform (FFT) operation, and then may reconstruct a received bitstream by demodulating and decoding the signals.

The baseband processor 1q-20 and the RF processor 1q-10 transmit and receive signals as described above. The baseband processor 1q-20 and the RF processor 1q-10 may also be called a transmitter, a receiver, a transceiver, or a communicator. At least one of the baseband processor 1q-20 or the RF processor 1q-10 may include a plurality of communication modules to support a plurality of different radio access technologies. At least one of the baseband processor 1q-20 or the RF processor 1q-10 may include different communication modules to process signals of different frequency bands. For example, the different radio access technologies may include an LTE network, an NR network, or the like. The different frequency bands may include a super-high frequency (SHF) (e.g., 2.2 GHz, 2 GHz) band and a millimeter wave (mmWave) (e.g., 60 GHz) band. The UE may transmit and receive signals to and from a base station by using the baseband processor 1q-20 and the RF processor 1q-10. In this regard, the signals may include control information and data.

The storage 1q-30 may store basic programs, application programs, and data, e.g., configuration information, for operations of the UE. The storage 1q-30 may provide the stored data upon request by the controller 1q-40. The storage 1q-30 may include any or a combination of storage media such as read-only memory (ROM), random access memory (RAM), a hard disk, a compact disc (CD)-ROM, and a digital versatile disc (DVD). The storage 1q-30 may include a plurality of memories. In an embodiment of the disclosure, the storage 1q-30 may store a program for supporting beam-based cooperative communication.

The controller 1q-40 controls overall operations of the UE. For example, the controller 1q-40 may transmit and receive signals through the baseband processor 1q-20 and the RF processor 1q-10. The controller 1q-40 may record and read data on or from the storage 1q-30. To this end, the controller 1q-40 may include at least one processor. For example, the controller 1q-40 may include a communication processor (CP) for controlling communications and an application processor (AP) for controlling an upper layer such as an application program. According to an embodiment of the disclosure, the controller 1q-40 may include a multi-connection processor 1q-42 configured to process a process operating in a multi-connection mode.

Figure 1R:
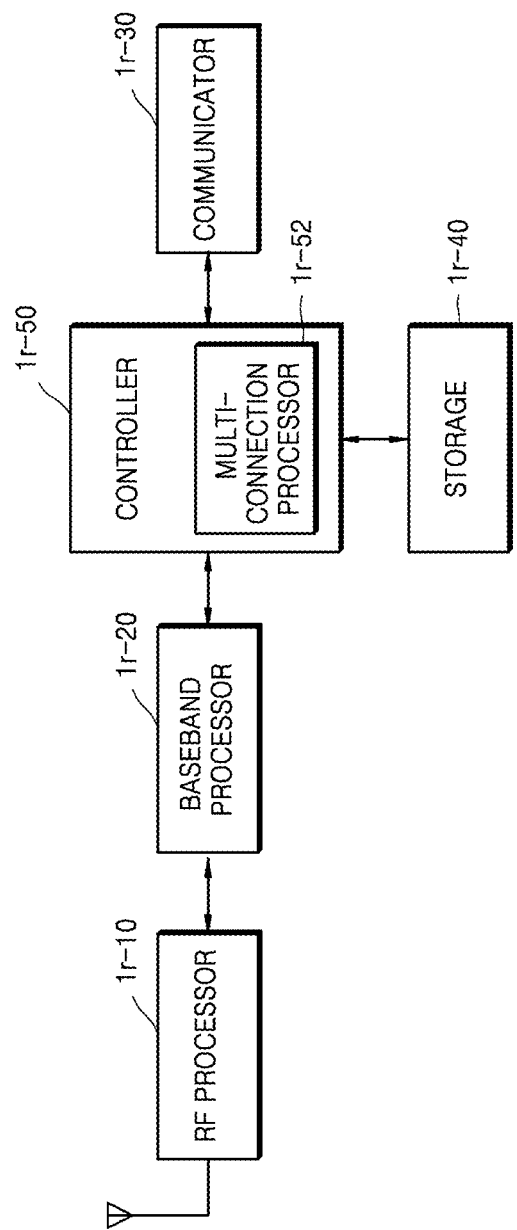
FIG. 1R illustrates a block diagram of a configuration of a transmission/reception point (TRP) device or a radio node in a wireless communication system, according to an embodiment of the disclosure.

FIG. 1R illustrates a block diagram of a configuration of a transmission/reception point (TRP) device or a radio node in a wireless communication system, according to an embodiment of the disclosure.

Referring to FIG. 1R, the TRP device may include an RF processor 1r-10, a baseband processor 1r-20, a backhaul communicator 1r-30 (also referred to as the communicator 1r-30), a storage 1r-40, and a controller 1r-50.

The RF processor 1r-10 may perform functions for transmitting and receiving signals through wireless channels, e.g., band conversion and amplification of the signals. That is, the RF processor 1r-10 may up-convert a baseband signal provided from the baseband processor 1r-20, into an RF band signal and then may transmit the RF band signal through an antenna, and may down-convert an RF band signal received through the antenna, into a baseband signal. For example, the RF processor 1r-10 may include a transmit filter, a receive filter, an amplifier, a mixer, an oscillator, a DAC, an ADC, or the like. Although only one antenna is illustrated in FIG. 1R, the TRP device may include a plurality of antennas. The RF processor 1r-10 may include a plurality of RF chains. In addition, the RF processor 1r-10 may perform beamforming. For beamforming, the RF processor 1r-10 may adjust phases and powers of signals to be transmitted or received through a plurality of antennas or antenna elements. The RF processor 1r-10 may perform a DL MIMO operation by transmitting one or more layers.

The baseband processor 1r-20 may convert between a baseband signal and a bitstream based on physical layer specifications of a first wireless access technology. For example, for data transmission, the baseband processor 1r-20 may generate complex symbols by encoding and modulating a transmit bitstream. For data reception, the baseband processor 1r-20 may reconstruct a received bitstream by demodulating and decoding a baseband signal provided from the RF processor 1r-10. For example, according to an OFDM scheme, for data transmission, the baseband processor 1r-20 may generate complex symbols by encoding and modulating a transmit bitstream, may map the complex symbols to subcarriers, and then may configure OFDM symbols by performing an IFFT operation and CP insertion. For data reception, the baseband processor 1r-20 may segment a baseband signal provided from the RF processor 1r-10, into OFDM symbol units, may reconstruct signals mapped to subcarriers by performing a FFT operation, and then may reconstruct a received bitstream by demodulating and decoding the signals. The baseband processor 1r-20 and the RF processor 1r-10 may transmit and receive signals as described above. The baseband processor 1r-20 and the RF processor 1r-10 may also be called a transmitter, a receiver, a transceiver, a communicator or a wireless communicator.

The communicator 1r-30 may provide an interface for communicating with other nodes within a network. The TRP device may transmit and receive signals to and from a UE by using the baseband processor 1r-20 and the RF processor 1r-10. In this regard, the signals may include control information and data.

The storage 1r-40 may store basic programs, application programs, and data, e.g., configuration information, for operations of the TRP device. In particular, the storage 1r-40 may store, for example, information about bearers assigned for a connected UE and measurement results reported from the connected UE. The storage 1r-40 may store criteria information used to determine whether to provide or release dual connectivity to or from the UE. The storage 1r-40 may provide the stored data upon request by the controller 1r-50. The storage 1r-40 may include any or a combination of storage media such as ROM, RAM, a hard disk, a CD-ROM, and a DVD. The storage 1r-40 may include a plurality of memories. In an embodiment of the disclosure, the storage 1r-40 may store a program for supporting beam-based cooperative communication.

The controller 1r-50 may control overall operations of the TRP device. For example, the controller 1r-50 may transmit and receive signals through the baseband processor 1r-20 and the RF processor 1r-10, or the backhaul communicator 1r-30. The controller 1r-50 may record and read data on or from the storage 1r-40. To this end, the controller 1r-50 may include at least one processor. According to an embodiment of the disclosure, the controller 1r-50 may include a multi-connection processor 1r-52 configured to process a process operating in a multi-connection mode.

In the NR or 5G communication system, it is possible to implement base stations of different configurations, and various types of wireless access technologies may coexist. In this circumstance, there is a need for a method of detecting an error and verifying integrity or enhancing security, wherein the error may occur in a wireless transmission section when data is transmitted from each radio node (an integrated access backhaul (IAB) node, an IAB donor or a UE) in a network architecture supporting wireless backhaul or IAB.

In an embodiment of the disclosure, a method, performed by radio nodes, of managing bearers and processing data in the NR or 5G communication system supporting wireless backhaul will now be described. Also, a method of preventing a data error occurrable in a wireless link or defending against an unexpected attack, and enhancing integrity verification or security will now be described. More particularly, to enhance security in a wireless transmission section between an uppermost radio node (e.g., an IAB donor) of a wireless backhaul network and a radio node to which a UE accesses, provided are descriptions about a procedure of configuring a PDCP layer for enhancement of security in each of the uppermost radio node and the radio node to which the UE accesses, and configuring and performing a ciphering and deciphering procedure or an integrity protection or verification procedure.

According to the presented embodiment of the disclosure, it is possible to detect an error during data transmission and enhance security in the wireless backhaul network (i.e., integrated access backhaul).

Figure 2A:
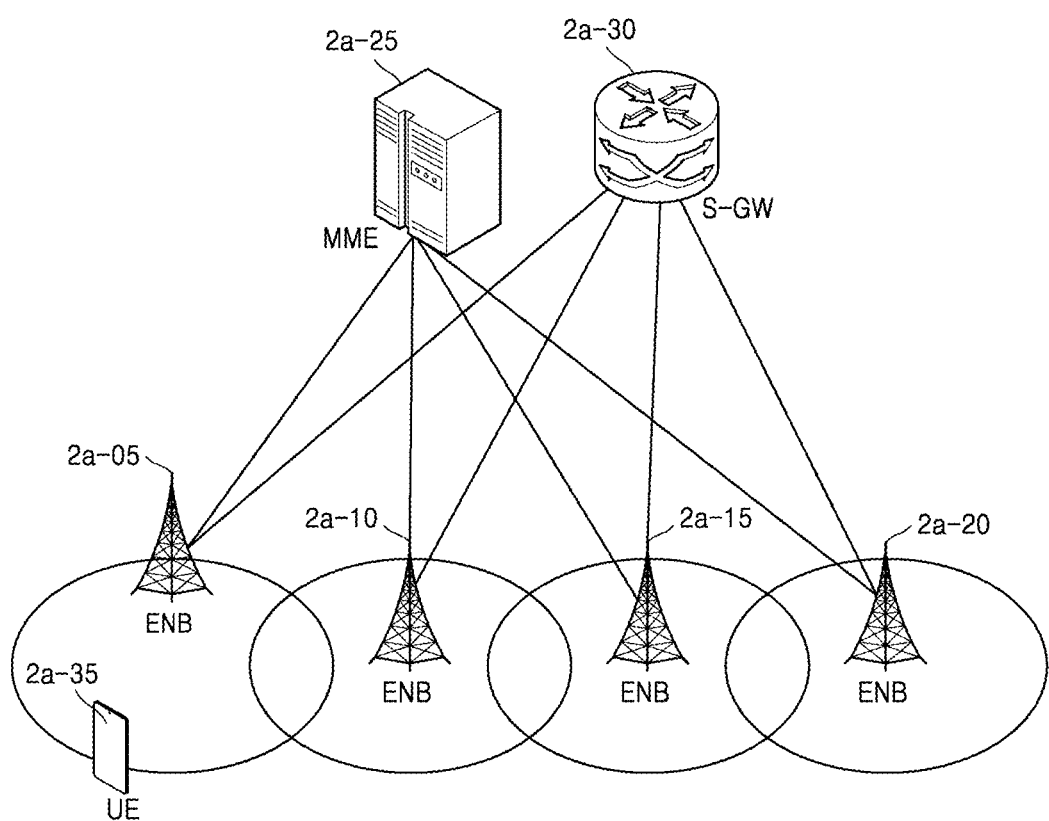
FIG. 2A illustrates a diagram of a configuration of an LTE system to which an embodiment of the disclosure is applied.

FIG. 2A illustrates a diagram of a configuration of an LTE system to which an embodiment of the disclosure is applied.

Referring to FIG. 2A, a RAN of the LTE system may include a plurality of eNBs (or nodes B or base stations) 2a-05, 2a-10, 2a-15, and 2a-20, a MME 2a-25, and a S-GW 2a-30. A UE (or a terminal) 2a-35 may access an external network via the eNB 2a-05, 2a-10, 2a-15, or 2a-20 and the S-GW 2a-30.

In FIG. 2A, the eNB 2a-05, 2a-10, 2a-15, or 2a-20 may correspond to an existing node B of a UMTS. The eNB 2a-05, 2a-10, 2a-15, or 2a-20 is connected to the UE 2a-35 through wireless channels and performs complex functions compared to the existing node B. All user traffic data including real-time services such as VoIP may be serviced through shared channels in the LTE system, and thus an entity for collating status information, e.g., buffer status information, available transmission power status information, and channel state information, of UEs and performing scheduling may be required and the eNB 2a-05, 2a-10, 2a-15, or 2a-20 may operate as such an entity. One eNB generally may control a plurality of cells. For example, the LTE system may use radio access technology such as OFDM at a bandwidth of 20 MHz to achieve a data rate of 100 Mbps. The eNB may also use AMC to determine a modulation scheme and a channel coding rate in accordance with a channel state of the UE 2a-35. The S-GW 2a-30 is an entity for providing data bearers and may establish and release the data bearers by the control of the MME 2a-25. The MME 2a-25 is an entity for performing a mobility management function and various control functions on the UE 2a-35 and is connected to the plurality of eNBs 2a-05, 2a-10, 2a-15, and 2a-20.

Figure 2B:
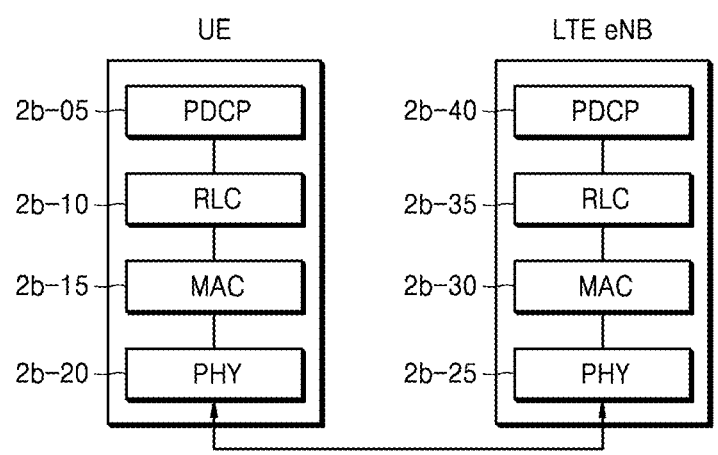
FIG. 2B illustrates a diagram of a radio protocol architecture of an LTE system to which an embodiment of the disclosure is applied.

FIG. 2B illustrates a diagram of a radio protocol architecture of an LTE system to which an embodiment of the disclosure is applied.

Referring to FIG. 2B, the radio protocol architecture of the LTE system may include PDCP layers 2b-05 and 2b-40, RLC layers 2b-10 and 2b-35, and MAC layers 2b-15 and 2b-30 respectively for a UE and an eNB. The PDCP layer 2b-05 or 2b-40 may perform, for example, IP header compression/decompression. Main functions of the PDCP layer 2b-05 or 2b-40 may be summarized as shown below.

- Header compression and decompression: robust header compression (ROHC) only
- Transfer of user data
- In-sequence delivery of upper layer PDUs at PDCP re-establishment procedure for RLC AM
- For split bearers in DC (only support for RLC AM): PDCP PDU routing for transmission and PDCP PDU reordering for reception
- Duplicate detection of lower layer service data units (SDUs) at PDCP re-establishment procedure for RLC AM
- Retransmission of PDCP SDUs at handover and, for split bearers in DC, of PDCP PDUs at PDCP data-recovery procedure, for RLC AM
- Ciphering and deciphering
- Timer-based SDU discard in uplink The RLC layer 2b-10 or 2b-35 may perform an ARQ operation by reconfiguring PDCP PDUs to appropriate sizes. Main functions of the RLC layer 2b-10 or 2b-35 may be summarized as shown below.

- Transfer of upper layer PDUs

Error correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment The MAC layer 2b-15 or 2b-30 may be connected to a plurality of RLC layers configured for one UE and may multiplex RLC PDUs into a MAC PDU and may demultiplex the RLC PDUs from the MAC PDU. Main functions of the MAC layer 2b-15 or 2b-30 may be summarized as shown below.

Mapping between logical channels and transport channels
Multiplexing/demultiplexing of MAC SDUs belonging to one or different logical channels into/from TBs delivered to/from the physical layer on transport channels
Scheduling information reporting
Error correction through HARQ
Priority handling between logical channels of one UE
Priority handling between UEs by means of dynamic scheduling
Multimedia broadcast/multicast service (MBMS) service identification
Transport format selection
Padding A PHY layer 2b-20 or 2b-25 may channel-code and modulate upper layer data into OFDM symbols and transmit the OFDM symbols through a wireless channel, or may demodulate OFDM symbols received through a wireless channel and channel-decode and deliver the OFDM symbols to an upper layer.

Figure 2C:
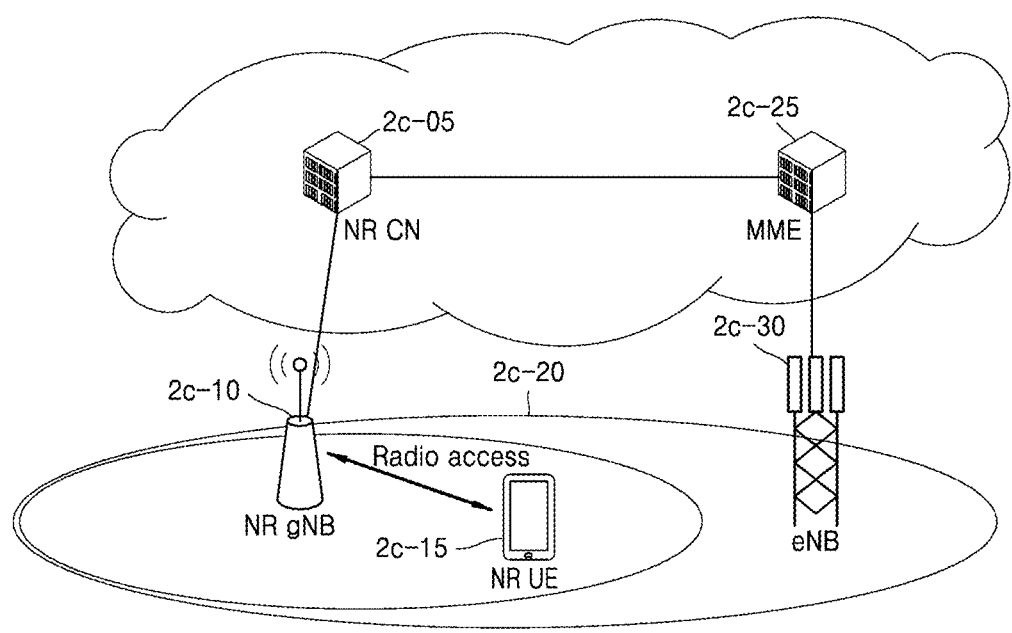
FIG. 2C illustrates a diagram of a next-generation mobile communication system to which an embodiment of the disclosure is applied.

FIG. 2C illustrates a diagram of a next-generation mobile communication system to which an embodiment of the disclosure is applied.

Referring to FIG. 2C, a radio access network of the next-generation mobile communication system (hereinafter, referred to as the NR or 5G communication system) includes a new radio node B (NR gNB, NR NB, or gNB) 2c-10 and a new radio core network (NR CN) 2c-05. A NR UE (or terminal) 2c-15 may access an external network via the NR gNB 2c-10 and the NR CN 2c-05.

In FIG. 2C, the NR gNB 2c-10 may correspond to an existing eNB of an LTE system. The NR gNB 2c-10 may be connected to the NR UE 2c-15 through wireless channels and may provide superior services compared to an existing node B. All user traffic data may be serviced through shared channels in the NR or 5G mobile communication system, and thus, an entity for collating buffer status information of UEs, available transmission power status information, and channel state information and performing scheduling may be required and the NR gNB 2c-10 may operate as such an entity. The NR gNB 2c-10 generally controls a plurality of cells. The NR or 5G communication system may have a bandwidth greater than the maximum bandwidth of the existing LTE system so as to achieve an ultrahigh data rate, compared to the existing LTE system, and may use OFDM as a radio access technology and may additionally use a beamforming technology. The NR gNB 2c-10 may use AMC to determine a modulation scheme and a channel coding rate in accordance with a channel state of the NR UE 2c-15. The NR CN 2c-05 may perform functions such as mobility support, bearer configuration, and QoS configuration. The NR CN 2c-05 may be an entity for performing a mobility management function and various control functions on the NR UE 2c-15 and may be connected to a plurality of base stations. The NR or 5G mobile communication system may cooperate with the existing LTE system, and the NR CN 2c-05 may be connected to an MME 2c-25 through a network interface. The MME 2c-25 may be connected to an existing eNB 2c-30.

Figure 2D:
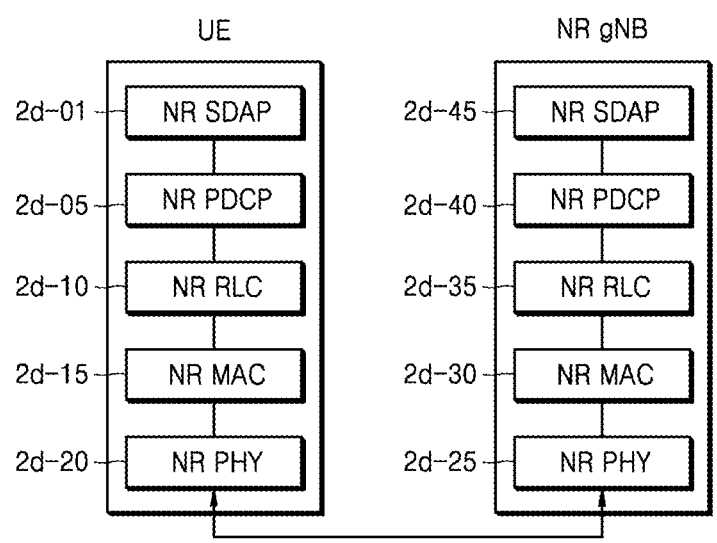
FIG. 2D illustrates a diagram of a radio protocol architecture of the NR or 5G mobile communication system to which an embodiment of the disclosure is applied.

FIG. 2D illustrates a diagram of a radio protocol architecture of the NR or 5G mobile communication system to which an embodiment of the disclosure is applied.

Referring to FIG. 2D, the radio protocol architecture of the NR or 5G mobile communication system may include NR SDAP layers 2d-01 and 2d-45, NR PDCP layers 2d-05 and 2d-40, NR RLC layers 2d-10 and 2d-35, and NR MAC layers 2d-15 and 2d-30 respectively for a UE and an NR gNB. Main functions of the NR SDAP entity 2d-01 or 2d-45 may include some of the following functions.

Transfer of user plane data
Mapping between a QoS flow and a DRB for both DL and UL
Marking QoS flow ID in both DL and UL packets
Reflective QoS flow to DRB mapping for the UL SDAP PDUs With regard to a SDAP layer, information about whether to use a header of the SDAP layer or to use functions of the SDAP layer may be configured for the UE by using an RRC message per PDCP layer, per bearer, or per logical channel. When the SDAP header of the SDAP layer is configured, the UE may direct to update or reconfigure UL and DL QoS flow and data bearer mapping information by using a 1-bit NAS reflective QoS indicator and a 1-bit AS reflective QoS indicator of the SDAP header. The SDAP header may include QoS flow ID information indicating QoS. The QoS information may be used as data processing priority information or scheduling information for appropriately supporting a service.

Main functions of the NR PDCP layer 2d-05 or 2d-40 may include some of the following functions.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink The reordering function of the NR PDCP layer 2d-05 or 2d-40 may include a function of reordering PDCP PDUs based on PDCP SNs, the PDCP PDUs being received from a lower layer, and a function of delivering the reordered data to an upper layer in order. Alternatively, the reordering function of the NR PDCP layer 2d-05 or 2d-40 may include at least one of a function of immediately delivering the received PDCP PDUs without consideration of their orders, a function of recording missing PDCP PDUs by reordering the received PDCP PDUs, a function of reporting status information of the missing PDCP PDUs to a transmitter, or a function of requesting retransmission of the missing PDCP PDUs.

Main functions of the NR RLC layer 2d-10 or 2d-35 may include some of the following functions.

Transfer of upper layer PDUs
In-sequence delivery of upper layer PDUs
Out-of-sequence delivery of upper layer PDUs
Error correction through ARQ Concatenation, segmentation and reassembly of RLC SDUs
Re-segmentation of RLC data PDUs
Reordering of RLC data PDUs
Duplicate detection
Protocol error detection
RLC SDU discard
RLC re-establishment In this regard, the in-sequence delivery function of the NR RLC layer 2d-10 or 2d-35 indicates a function of delivering RLC SDUs received from a lower layer to an upper layer in order. The in-sequence delivery function of the NR RLC layer 2d-10 or 2d-35a may include at least one of a function of reassembling the RLC SDUs and delivering the reassembled RLC SDU when a plurality of RLC SDUs segmented from one RLC SDU are received, a function of reordering received RLC PDUs based on RLC SNs or PDCP SNs, a function of recording missing RLC PDUs by reordering the received RLC PDUs, a function of reporting status information of the missing RLC PDUs to a transmitter, a function of requesting retransmission of the missing RLC PDUs, a function of delivering only RLC SDUs prior to a missing RLC SDU, to an upper layer in order when the missing RLC SDU exists, or a function of delivering all RLC SDUs received before a timer starts, to an upper layer in order although a missing RLC SDU exists when a preset timer stops.

The in-sequence delivery function of the NR RLC layer 2d-10 or 2d-35a may process the RLC PDUs in order of reception and deliver the RLC PDUs to the NR PDCP layer 2d-05 or 2d-40 regardless of SNs (out-of-sequence delivery), and when a segment is received, the in-sequence delivery function of the NR RLC layer 2d-10 or 2d-35 may reassemble the segment with other segments stored in a buffer or subsequently received, into a whole RLC PDU and deliver the RLC PDU to the NR PDCP layer 2d-05 or 2d-40. The NR RLC layer 2d-10 or 2d-35 may not have a concatenation function, and the concatenation function may be performed by the NR MAC layer 2d-15 or 2d-30 or be replaced with a multiplexing function of the NR MAC layer 2d-15 or 2d-30.

The out-of-sequence delivery function of the NR RLC layer 2d-10 or 2d-35 may include a function of directly delivering RLC SDUs received from a lower layer, to an upper layer out of order. The out-of-sequence delivery function of the NR RLC layer 2d-10 or 2d-35 may include at least one of a function of reassembling a plurality of RLC SDUs segmented from one RLC SDU and delivering the reassembled RLC SDU when the segmented RLC SDUs are received, or a function of recording missing RLC PDUs by storing RLC SNs or PDCP SNs of received RLC PDUs and reordering the received RLC PDUs.

The NR MAC layer 2d-15 or 2d-30 may be connected to a plurality of NR RLC layers configured for one UE, and main functions of the NR MAC layer 2d-15 or 2d-30 may include some of the following functions.
Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding An NR PHY layer 2d-20 or 2d-25 may channel-code and modulate upper layer data into OFDM symbols and may transmit the OFDM symbols through a wireless channel, or may demodulate OFDM symbols received through a wireless channel and channel-decode and may deliver the OFDM symbols to an upper layer.

Figure 2E:
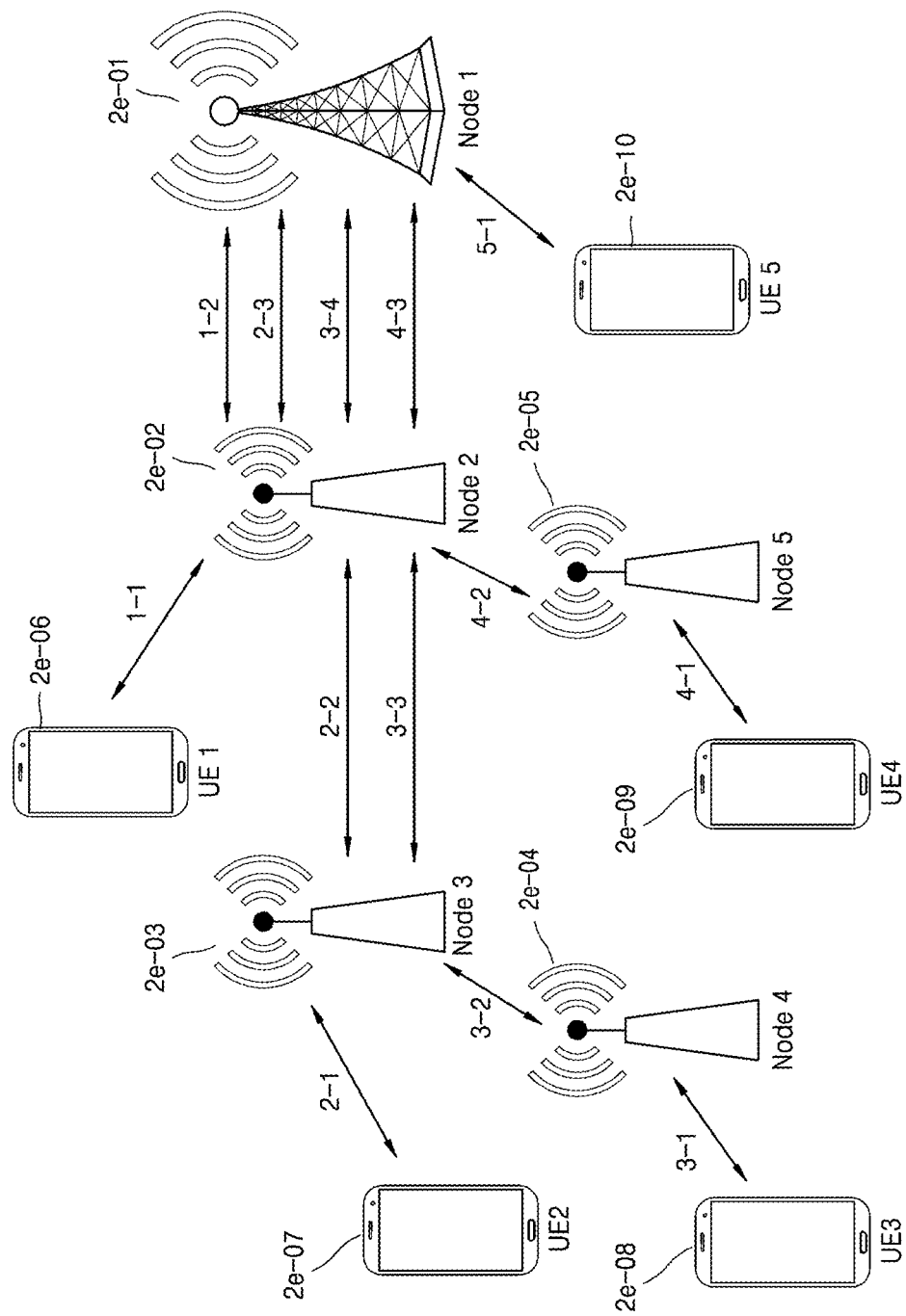
FIG. 2E illustrates a diagram of a network architecture supporting wireless backhauls, the network architecture being considered in the NR or 5G communication system, according to an embodiment of the disclosure.

FIG. 2E illustrates a diagram of a network architecture supporting wireless backhauls, the network architecture being considered in the NR or 5G communication system, according to an embodiment of the disclosure.

As illustrated in FIG. 2E, a wireless backhaul network (also referred to as an IAB network) may consist of a plurality of radio nodes (e.g., IAB nodes or IAB donors). A UE in the IAB network may establish RRC connection by accessing a random radio node and may transmit and receive data. Each radio node, as a child IAB node, may consider another radio node as a parent IAB node, may establish RRC connection with the parent IAB node, and may transmit and receive data. In an embodiment of the disclosure, the child IAB node may indicate the UE or an IAB node, may receive, from the parent IAB node or the IAB donor, radio link access configuration, RRC configuration information, bearer configuration information, and configuration information of a PDCP layer, a RLC layer, a MAC layer, or a PHY layer, and may indicate a radio node to which the information is applied.

In an embodiment of the disclosure, the parent IAB node may indicate an IAB node or the IAB donor. The parent IAB node may indicate a radio node for configuring the radio link access configuration, the RRC configuration information, the bearer configuration information, and the configuration information of a PDCP layer, a RLC layer, a MAC layer, or a PHY layer to the child IAB node.

Referring to FIG. 2E, the IAB donor may indicate a radio node (e.g., a Node1 2e-01) that is connected to a core network so as to transfer data to an upper layer. An AB node may indicate each of radio nodes (e.g., a Node 2 2e-02, a Node 3 2e-03, a Node 4 2e-04, and a Node 5 2e-05) that each perform as an entity for relaying data so as to support data transmission and reception between the UE and an end of the IAB donor.

Also, UEs 2e-06, 2e-07, 2e-08, and 2e-09 may establish RRC connection by accessing radio nodes (e.g. the IAB nodes or the IAB donor), and may transmit and receive data. For example, the UE 2 2e-07 may establish RRC connection by accessing the Node 3 2e-03 and may transmit and receive data. The Node 3 2e-03 may receive data from the UE 2 2e-07 and may transmit the data to the Node 2 2e-02 that is a parent IAB node, or may receive, from the Node 2 2e-02, data to be transmitted to the UE 2 2e-07, and may transmit the data to the UE 2 2e-07. Alternatively, the Node 2 2e-02 may receive data from the Node 3 2e-03 and may transmit the data to the Node1 2e-01 that is a parent IAB node (the IAB donor), or may receive, from the Node1 2e-01, data to be transmitted to the Node 3 2e-03, and may transmit the data to the Node 3 2e-03.

The UE 1 2e-06 may establish RRC connection by connecting to the Node 2 2e-02 and may transmit and receive data. The Node 2 2e-02 may receive data from the UE 1 2e-06 and may transmit the data to the Node 1 2e-01 that is a parent IAB node, or may receive, from the Node 1 2e-01, data to be transmitted to the UE 1 2e-06, and may transmit the data to the UE 1 2e-06.

As described above, a UE may establish RRC connection by accessing a radio node having strongest signal power and may transmit and receive data. Also, according to an embodiment of the disclosure, the IAB network may support multi-hop data transmission through intermediate radio nodes so as to allow the UE to transmit data to a radio node connected to a core network and to receive data from the radio node connected to the core network.

Figure 2F:
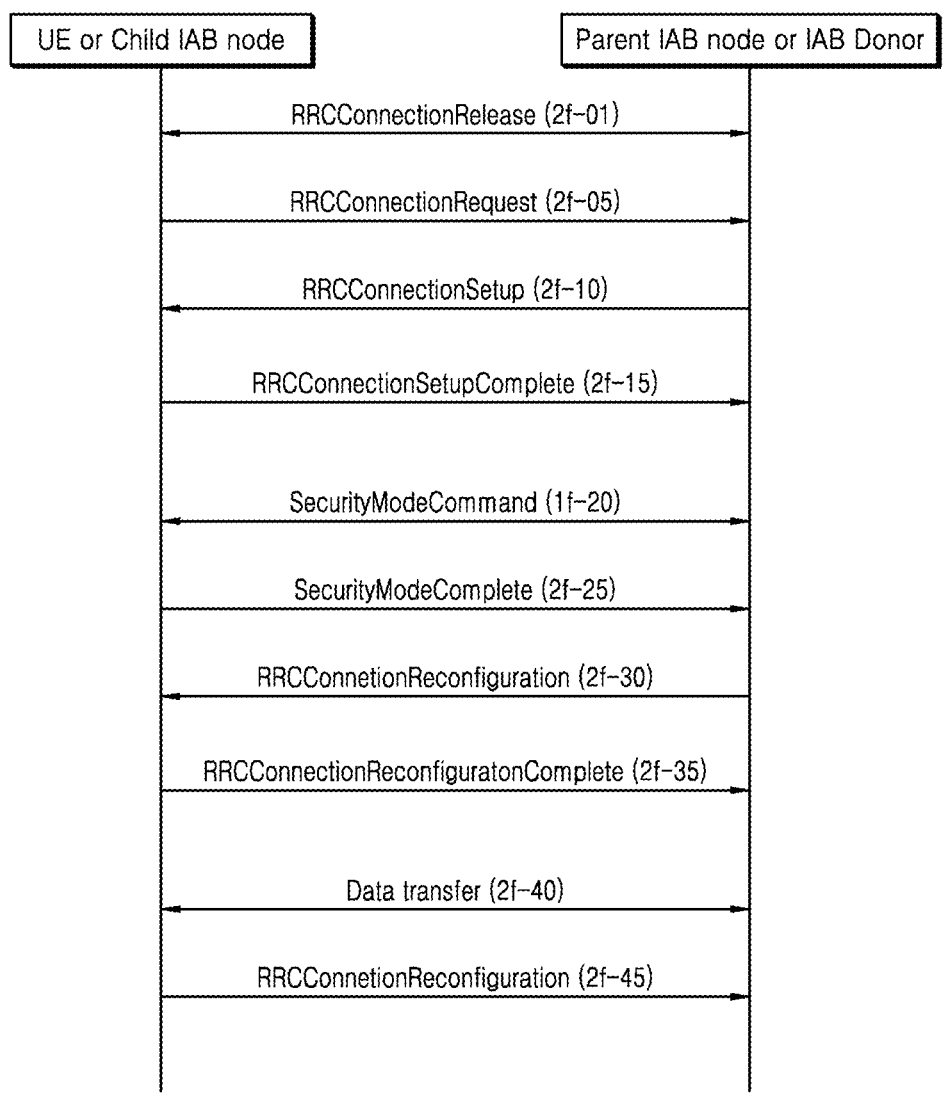
FIG. 2F illustrates a procedure in which radio resource control (RRC) connection configuration is performed when a UE establishes connection with a radio node (an integrated access backhaul (IAB) node or an IAB donor) or a child IAB node establishes connection with a parent IAB node (an IAB node or the IAB donor, in the IAB network in the NR or 5G communication system, according to an embodiment of the disclosure.

FIG. 2F illustrates a procedure in which RRC connection configuration is performed when a UE establishes connection with a radio node (an IAB node or an IAB donor) or a child IAB node establishes connection with a parent IAB node (an IAB node or the IAB donor, in the IAB network in the NR or 5G communication system, according to an embodiment of the disclosure.

Referring to FIG. 2F, when the UE or the child IAB node which transmits and receives data in an RRC connected mode does not transmit nor receive data due to a predefined cause or for a predefined time, the parent IAB node may transmit an RRCConnectionRelease message to the UE or the child IAB node so as to control the UE or the child IAB node to transit to an RRC idle mode or an RRC inactive mode (2f-01). In an embodiment of the disclosure, afterward, when the UE or the child IAB node which is not currently configured for connection (hereinafter, also referred to as the idle-mode UE) has data to be transmitted, the UE or the child IAB node may perform an RRC connection establishment process on the parent IAB node, and in a case of the RRC inactive mode, the UE or the child IAB node may perform an RRC connection resume process on the parent IAB node.

The UE or the child IAB node may establish inverse direction transmission synchronization with the parent IAB node via a random access process, and may transmit a newly-defined RRC message or an RRC Connection Request message (or an RRC Resume Request) to the parent IAB node (2f-05). The newly-defined RRC message or the RRC Connection Request message (or the RRC Resume Request) may include an identifier of the UE or the child IAB node, and an establishment cause, or the like.

The parent IAB node may transmit a newly-defined RRC message or an RRCConnectionSetup message (or an RRCResume message) to allow the UE or the child IAB node to establish RRC connection (2f-10). The newly-defined RRC message or the RRCConnectionSetup message (or the RRCResume message) may include at least one of configuration information of each logical channel, configuration information of each bearer, configuration information of a RLC layer, or configuration information of a MAC layer.

The newly-defined RRC message or the RRCConnectionSetup message (or the RRCResume message) may include an indicator indicating whether to retransmit pre-configured RRC messages to a target parent IAB node or a target cell, when the UE or the child IAB node performs handover. For example, the parent IAB node may indicate the UE or the child IAB node to retransmit RRC messages transmitted few seconds ago, before the UE or the child IAB node receives a handover indication message, performs handover, or receives an RRC message. Also, the parent IAB node may indicate respective indicators with respect to the pre-configured RRC messages. That is, the plurality of indicators may indicate whether to retransmit respective RRC messages. Alternatively, the parent IAB node may indicate whether to perform retransmission, in the form of a bitmap indicating each RRC message.

The newly-defined RRC message or the RRCConnectionSetup message (or the RRCResume message) may include PDCP configuration information including an indicator indicating to perform a PDCP data recovery process. Also, the newly-defined RRC message or the RRCConnectionSetup message may include bearer configuration information including an indicator indicating whether to perform a PDCP data recovery process on a SRB or a DRB. Also, the newly-defined RRC message or the RRCConnectionSetup message may include bearer configuration information including an indicator indicating, with respect to the SRB or the DRB, whether to discard residual data in the PDCP layer.

The newly-defined RRC message or the RRCConnectionSetup message (or the RRCResume message) may include bearer configuration information including an indicator indicating whether to perform accumulated retransmission or selective retransmission on an AM DRB when a PDCP re-establishment process is performed.

The newly-defined RRC message or the RRCConnectionSetup message (or the RRCResume message) may include an indicator indicating which ARQ function is to be used in the child IAB node. The parent IAB node may indicate, by using the indicator, whether the parent IAB node is to use a hop-by-hop ARQ function or an end-to-end ARQ function. When the end-to-end ARQ function is configured, the parent IAB node may indicate whether the parent IAB node is to perform a function of segmenting or changelessly transferring received RLC layer data or whether the child IAB node, as an end, is to perform an ARQ function. Also, the parent IAB node may indicate which ARC function, as a default function, is to be used by the parent IAB node. In addition, when the newly-defined RRC message or the RRCConnectionSetup message does not configure an ARQ function, it may be predefined that the hop-by-hop ARQ function or the end-to-end ARQ function is to be used as the default function. Also, the parent IAB node may indicate, by using the newly-defined RRC message or the RRCConnectionSetup message, whether the child IAB node is to use a data segmentation function, and may indicate whether respective functions of RLC layers are to be activated (or to be used), the functions being described with reference to FIG. 2B or 2D.

The newly-defined RRC message or the RRCConnectionSetup message (or the RRCResume message) may include an indicator indicating whether an adaptation layer is to use a data concatenation function. Also, the newly-defined RRC message or the RRCConnectionSetup message (or the RRCResume message) may include an indicator indicating whether a header of the adaptation layer is to be configured, and may indicate a type of the header. For example, the parent IAB node may indicate, by using the newly-defined RRC message or the RRCConnectionSetup message, which information is to be included in the header, the information including a UE identifier, a UE bearer identifier, a QoS identifier, a radio node identifier, a radio node address, or QoS information. In an embodiment of the disclosure, the parent IAB node may configure to omit the header so as to decrease overhead.

The parent IAB node may indicate, by using the newly-defined RRC message or the RRCConnectionSetup message, may configure a RLC channel to be used between an adaptation (ADAP) layer of a transmitter and an ADAP layer of a receiver, between the child IAB node and the parent IAB node, or between the UE and an IAB node. In detail, the RRCConnectionSetup message may include an available number of RLC channels, identifiers of available RLC channels, or mapping information (e.g., a UE identifier, a UE bearer identifier, QoS information, or QoS identifier mapping information) about a plurality of items of data mapped to the RLC channels. A RLC channel may be defined as a channel for delivering data according to QoS by grouping, based on QoS information, a plurality of items of data of several UEs, or may be defined as a channel for delivering data by grouping data of each UE.

The newly-defined RRC message or the RRCConnectionSetup message (or the RRCResume message) may include an indicator indicating whether configuration information (pdcp-config) of a PDCP layer is to perform PDCP status report-based retransmission. The parent IAB node may indicate, by using the indicator, that the PDCP layer is to perform the PDCP status report-based retransmission. When a value of the indicator is configured as 0, even when the PDCP layer receives a PDCP status report, the PDCP layer may check data corresponding to NACK information of the PDCP status report and may discard only data corresponding to ACK information. However, when a value of the indicator is configured as 1, and the PDCP layer receives a PDCP status report, the PDCP layer may discard data corresponding to ACK information of the PDCP status report and may retransmit data corresponding to NACK information. Alternatively, the parent IAB node may indicate whether the ADAP layer is to define an ADAP status report and to perform ADAP status report-based retransmission, as described above. An ADAP status report may indicate a COUNT value that is first lost, as in the PDCP status report, and may indicate a COUNT value thereafter as a bitmap. Alternatively, the ADAP status report may indicate a highest COUNT value with respect to a plurality of items of data that are sequentially and successfully received.

To indicate to perform the PDCP status report-based retransmission, the newly-defined RRC message or the RRCConnectionSetup message (or the RRCResume message) may configure a PDCP data recovery indicator (recoverPDCP) in the configuration information (pdcp-config) of the PDCP layer. The parent IAB node may configure, by using the indicator, the UE or the child IAB node to trigger a PDCP data recovery processing procedure and transmit the PDCP status report. When retransmission is performed during the PDCP data recovery process, the parent IAB node may perform selective retransmission based on the PDCP status report, not based on whether transmission is successful from a lower layer (e.g., a RLC layer). That is, the parent IAB node may retransmit only data indicated, in the PDCP status report, as NACK data for which successful transmission is not acknowledged. Alternatively, the parent IAB node may indicate whether the ADAP layer is to define the ADAP status report and an ADAP data recovery processing procedure and to perform the ADAP status report-based retransmission, as described above. The ADAP status report may indicate a COUNT value that is first lost, as in the PDCP status report, and may indicate a COUNT value thereafter as a bitmap. Alternatively, the ADAP status report may indicate a highest COUNT value with respect to a plurality of items of data that are sequentially and successfully received.

The newly-defined RRC message or the RRCConnectionSetup message (or the RRCResume message) may include an indicator and information for configuring a period or a timer value, the indicator indicating periodic transmission of the PDCP status report so as to allow the configuration information (pdcp-config) of the PDCP layer to periodically transmit the PDCP status report. When the indicator and the configuration are received, the UE or the child IAB node may transmit the PDCP status report by triggering the PDCP status report according to the period or whenever the timer value is expired. Alternatively, the parent IAB node may indicate that the ADAP layer is to define the ADAP status report and to periodically perform the ADAP status report. In this regard, the ADAP status report may indicate a COUNT value that is first lost, as in the PDCP status report, and may indicate a COUNT value thereafter as a bitmap. Alternatively, the ADAP status report may indicate a highest COUNT value with respect to a plurality of items of data that are sequentially and successfully received.

The newly-defined RRC message or the RRCConnectionSetup message (or the RRCResume message) may configure an indicator and a timer value, the indicator indicating transmission of the PDCP status report so as to allow the configuration information (pdcp-config) of the PDCP layer to transmit the PDCP status report. When the indicator and the configuration are received, the PDCP layer of the UE or the child IAB node may trigger a timer having a timer value whenever a gap of a PDCP SN occurs, and when, until the timer stops, the gap of the PDCP SN is not filled nor data corresponding to the PDCP SN assumed to be lost is not received, the PDCP layer may trigger, configure, and transmit the PDCP status report when the timer is expired. When, before the timer stops, the gap of the PDCP SN is filled or the data corresponding to the PDCP SN assumed to be lost is received, the PDCP layer may stop and reset the timer. A PDCP reordering timer may be used as the timer, and a new timer having a smaller or greater value than the PDCP reordering timer may be defined. The aforementioned timer may be defined and configured in the ADAP layer.

The parent IAB node may configure, by using the newly-defined RRC message or the RRCConnectionSetup message (or the RRCResume message), a PDCP status report prohibit timer to prevent the configuration information (pdcp-config) of the PDCP layer from frequently triggering the PDCP status report. When the PDCP status report prohibit timer is configured, the UE or the child IAB node may trigger or configure and transmit the PDCP status report, and may trigger the PDCP status report prohibit timer. The UE or the child IAB node may prevent an additional PDCP status report from being transmitted while the PDCP status report prohibit timer operates, and after the PDCP status report prohibit timer stops, the UE or the child IAB node may allow transmission of a PDCP status report. The aforementioned timer may also be defined and configured in the ADAP layer.

The parent IAB node may deliver, by using the newly-defined RRC message or the RRCConnectionSetup message (or a separate newly-defined RRC message or the RRCResume message), information about the parent IAB node or the child IAB node, the information being useful for an IAB node and including a congestion level, a queuing delay, a one-hop air latency, or the like, and information about each hop. Also, the parent IAB node may indicate a radio hop number from an IAB node receiving the newly-defined RRC message or the RRCConnectionSetup message to an uppermost IAB node (the IAB donor). The IAB node that has received the radio hop number via the RRC message may notify, to a next child IAB node, a hop number that is increased by 1 from the indicated hop number.

The newly-defined RRC message or the RRCConnectionSetup message (or the separate newly-defined RRC message or the RRCResume message) may include an indicator indicating to perform an in-sequence delivery function, instead of an out-of-order delivery function of an NR RLC layer. That is, the NR RLC layer performs the out-of-order delivery function as a default, and may perform the in-sequence delivery function according to the indicator of the newly-defined RRC message or the RRCConnectionSetup message. The in-sequence delivery function indicates that RLC SNs of RLC PDUs or RLC SDUs received by the RLC layer are sequentially ordered and data is transferred to the PDCP layer in ascending order of the RLC SNs. According to the in-sequence delivery function, when a RLC SN gap occurs such that a RLC SN is lost, the RLC layer configures and transmits a RLC status report about the lost RLC SN so as to request retransmission, and even when a RLC SDU or a RLC PDU whose SN is greater than the lost RLC SN is received, the RLC SDU or the RLC PDU is not transferred to the PDCP layer but is stored in a buffer, and when the lost RLC SN is received, data is transferred to the PDCP layer in ascending order of the RLC SNs.

To enhance security in a wireless link between a radio node (or a radio node to which a UE accesses or the UE) and an uppermost radio node (or a radio node), the newly-defined RRC message or the RRCConnectionSetup message (or the separate newly-defined RRC message or the RRCResume message) may configure separate PDCP layers in the radio node (or the radio node to which the UE accesses or the UE) and the uppermost radio node (or the radio node), the separate PDCP layers being for respective bearers or RLC channels, and may configure the separate PDCP layers to configure and use a ciphering and deciphering procedure and/or to configure and use an integrity protection and verification procedure. Here, default configuration may be in a manner that the separate PDCP layers are not configured for respective bearers or RLC channels, the separate PDCP layers being for the wireless link between the radio node (or the radio node to which the UE accesses or the UE) and the uppermost radio node (or the radio node). That is, only when the separate PDCP layers are configured for the bearers or the RLC channels, respectively, the separate PDCP layers may be used for enhancement of security. As another method, because data ciphering is already performed by a PDCP layer, the separate PDCP layer may be configured for only integrity protection and verification, and an interface between nodes of wireless backhauls may be configured not to have a limit in a data transmission rate with respect to integrity protection and verification and may be configured with the integrity protection and verification when necessary.

The UE or the child IAB node which established the RRC connection transmits an RRCConnetionSetupComplete message (or an RRCResumeComplete message) to the parent IAB node (2f-15).

The RRCConnetionSetupComplete message may include a control message of SERVICE REQUEST by which the UE or the child IAB node requests an Access and Mobility Management Function (AMF) or an MME for bearer configuration. The parent IAB node may transmit the SERVICE REQUEST message included in the RRCConnetionSetupComplete message to the AMF or the MME. The AMF or the MME may determine whether to provide a service requested by the UE or the child IAB node.

As a result of the determination, when the AMF or the MME determines to provide the service requested by the UE or the child IAB node, the AMF or the MME may transmit an INITIAL CONTEXT SETUP REQUEST message to the parent IAB node. The INITIAL CONTEXT SETUP REQUEST message may include information such as QoS information to be applied to DRB configuration, security-related information (e.g., a security key, a security algorithm, etc.) to be applied to a DRB, or the like.

The parent IAB node and the UE or the child IAB node may exchange a SecurityModeCommand message (2f-20) and a SecurityModeComplete message (2f-25) so as to configure security. When the configuration of security is completed, the parent IAB node transmits an RRCConnectionReconfiguration message to the UE or the child IAB node (2f-30).

The parent IAB node may configure, by using the RRCConnectionReconfiguration message, an indicator indicating whether to retransmit pre-configured RRC messages to a target parent IAB node or a target cell, when the UE or the child IAB node performs handover. For example, the parent IAB node may indicate the UE or the child IAB node to retransmit RRC messages transmitted few seconds ago, before the UE or the child IAB node receives a handover indication message, performs handover, or receives an RRC message. The indicator may indicate retransmission with respect to each of the pre-configured RRC messages. That is, a plurality of indicators may indicate whether to retransmit respective RRC messages. Alternatively, indication of retransmission may be performed in the form of a bitmap indicating each RRC message.

A newly-defined RRC message or the RRCConnectionReconfiguration message may include PDCP configuration information including an indicator indicating to perform a PDCP data recovery process. Also, the RRCConnectionReconfiguration message may include bearer configuration information including an indicator indicating whether to perform a PDCP data recovery process on a SRB or a DRB. Also, the RRCConnectionReconfiguration message may include bearer configuration information including an indicator indicating, with respect to the SRB or the DRB, whether to discard a plurality of items of residual data in the PDCP layer.

The newly-defined RRC message or the RRCConnectionReconfiguration message may include bearer configuration information including an indicator indicating whether to perform accumulated retransmission or selective retransmission on an AM DRB when a PDCP re-establishment process is performed.

The newly-defined RRC message or the RRCConnectionReconfiguration message may include an indicator indicating which ARQ function is to be used in the child IAB node, and whether a hop-by-hop ARQ function is to be used or an end-to-end ARQ function is to be used may be indicated by using the indicator. When the end-to-end ARQ function is configured, the parent IAB node may indicate whether the parent IAB node is to perform a function of segmenting or changelessly transferring received RLC layer data or whether the child IAB node, as an end, is to perform an ARQ function. Also, the parent IAB node may indicate which ARC function, as a default function, is to be used by the parent IAB node. In addition, when the newly-defined RRC message or the RRCConnectionReconfiguration message does not configure an ARQ function, the parent IAB node may pre-configure to use one of the hop-by-hop ARQ function or the end-to-end ARQ function, as the default function. Also, the parent IAB node may indicate, by using the newly-defined RRC message or the RRCConnectionReconfiguration message, whether the child IAB node is to use a data segmentation function, and may indicate whether respective functions of RLC layers are to be activated (or to be used), the functions being described with reference to FIG. 2B or 2D.

The newly-defined RRC message or the RRCConnectionReconfiguration message may include an indicator indicating whether an adaptation layer is to use a data concatenation function. Also, the newly-defined RRC message or the RRCConnectionReconfiguration message may include an indicator indicating whether a header of the adaptation layer is to be configured, and may indicate a type of the header. For example, the parent IAB node may configure which information is to be included in the header, the information including a UE identifier, a UE bearer identifier, a QoS identifier, a radio node identifier, a radio node address, or QoS information. The parent IAB node may configure to omit the header so as to decrease overhead.

The parent IAB node may indicate, by using the newly-defined RRC message or the RRCConnectionReconfiguration message, may configure a RLC channel to be used between an adaptation layer of a transmitter and an adaptation layer of a receiver, between the child IAB node and the parent IAB node, or between the UE and an IAB node. In detail, the newly-defined RRC message or the RRCConnectionReconfiguration message may include an available number of RLC channels, identifiers of available RLC channels, or mapping information (e.g., a UE identifier, a UE bearer identifier, QoS information, or QoS identifier mapping information) about a plurality of items of data mapped to the RLC channels. A RLC channel may be defined as a channel for delivering data according to QoS by grouping, based on QoS information, a plurality of items of data of several UEs, or may be defined as a channel for delivering data by grouping data of each UE.

The newly-defined RRC message or the RRCConnectionReconfiguration message may include an indicator indicating whether configuration information (pdcp-config) of a PDCP layer is to perform PDCP status report-based retransmission. The parent IAB node may indicate, by using the indicator of the newly-defined RRC message or the RRCConnectionReconfiguration message, that the PDCP layer is to perform the PDCP status report-based retransmission. When a value of the indicator is configured as 0, even when the PDCP layer receives a PDCP status report, the PDCP layer may check data corresponding to NACK information of the PDCP status report and may discard only data corresponding to ACK information. However, when a value of the indicator is configured as 1, and the PDCP layer receives a PDCP status report, the PDCP layer may discard data corresponding to ACK information of the PDCP status report and may retransmit data corresponding to NACK information. Alternatively, the parent IAB node may indicate whether the ADAP layer is to define an ADAP status report and to perform ADAP status report-based retransmission, as described above. An ADAP status report may indicate a COUNT value that is first lost, as in the PDCP status report, and may indicate a COUNT value thereafter as a bitmap. Alternatively, the ADAP status report may indicate a highest COUNT value with respect to a plurality of items of data that are sequentially and successfully received.

To indicate to perform the PDCP status report-based retransmission, the newly-defined RRC message or the RRCConnectionReconfiguration message may include a PDCP data recovery indicator (recoverPDCP) in the configuration information (pdcp-config) of the PDCP layer. The parent IAB node may configure, by using the indicator, the UE or the child IAB node to trigger a PDCP data recovery processing procedure and transmit the PDCP status report. When retransmission is performed during the PDCP data recovery process, the parent IAB node may perform selective retransmission based on the PDCP status report, not based on whether transmission is successful from a lower layer (e.g., a RLC layer). That is, the parent IAB node may retransmit only data indicated, in the PDCP status report, as NACK data for which successful transmission is not acknowledged. Alternatively, the parent IAB node may indicate whether the ADAP layer is to define the ADAP status report and an ADAP data recovery processing procedure and to perform the ADAP status report-based retransmission, as described above. The ADAP status report may indicate a COUNT value that is first lost, as in the PDCP status report, and may indicate a COUNT value thereafter as a bitmap. Alternatively, the ADAP status report may indicate a highest COUNT value with respect to a plurality of items of data that are sequentially and successfully received.

The newly-defined RRC message or the RRCConnectionReconfiguration message may include an indicator and information for configuring a period or a timer value, the indicator indicating periodic transmission of the PDCP status report so as to allow the configuration information (pdcp-config) of the PDCP layer to periodically transmit the PDCP status report. When the indicator and the configuration are received, the UE or the child IAB node may transmit the PDCP status report by triggering the PDCP status report according to the period or whenever the timer value is expired. Alternatively, the parent IAB node may indicate that the ADAP layer is to define the ADAP status report and to periodically perform the ADAP status report. In this regard, the ADAP status report may indicate a COUNT value that is first lost, as in the PDCP status report, and may indicate a COUNT value thereafter as a bitmap. Alternatively, the ADAP status report may indicate a highest COUNT value with respect to a plurality of items of data that are sequentially and successfully received.

The newly-defined RRC message or the RRCConnectionReconfiguration message may configure an indicator and a timer value, the indicator indicating transmission of the PDCP status report so as to allow the configuration information (pdcp-config) of the PDCP layer to transmit the PDCP status report. When the indicator and the configuration are received, the PDCP layer of the UE or the child IAB node may trigger a timer having a timer value whenever a gap of a PDCP SN occurs, and when, until the timer stops, the gap of the PDCP SN is not filled nor data corresponding to the PDCP SN assumed to be lost is not received, the PDCP layer may trigger, configure, and transmit the PDCP status report when the timer is expired. When, before the timer stops, the gap of the PDCP SN is filled or the data corresponding to the PDCP SN assumed to be lost is received, the PDCP layer may stop and reset the timer. A PDCP reordering timer may be used as the timer, and a new timer having a smaller or greater value than the PDCP reordering timer may be defined. The aforementioned timer may be defined and configured in the ADAP layer.

The parent IAB node may configure, by using the newly-defined RRC message or the RRCConnectionReconfiguration message, a PDCP status report prohibit timer to prevent the configuration information (pdcp-config) of the PDCP layer from frequently triggering the PDCP status report. When the PDCP status report prohibit timer is configured, the UE or the child IAB node may trigger or configure and transmit the PDCP status report, and may trigger the PDCP status report prohibit timer. The UE or the child IAB node may prevent an additional PDCP status report from being transmitted while the PDCP status report prohibit timer operates, and after the PDCP status report prohibit timer stops, the UE or the child IAB node may allow transmission of a PDCP status report. The aforementioned timer may also be defined and configured in the ADAP layer.

The parent IAB node may deliver, by using the newly-defined RRC message or the RRCConnectionReconfiguration message (or a separate newly-defined RRC message), information about the parent IAB node or the child IAB node, the information being useful for an IAB node and including a congestion level, a queuing delay, a one-hop air latency, or the like, and information about each hop. Also, the parent IAB node may indicate a radio hop number from an IAB node receiving the newly-defined RRC message or the RRCConnectionReconfiguration message to an uppermost IAB node (the IAB donor). The IAB node that has received the radio hop number via the RRC message may notify, to a next child IAB node, a hop number that is increased by 1 from the indicated hop number.

The newly-defined RRC message or the RRCConnectionReconfiguration message (or the separate newly-defined RRC message or an RRCResume message) may include an indicator indicating to perform an in-sequence delivery function, instead of an out-of-order delivery function of an NR RLC layer. That is, the NR RLC layer performs the out-of-order delivery function as a default, and may perform the in-sequence delivery function according to the indicator of the newly-defined RRC message or the RRCConnectionReconfiguration message. The in-sequence delivery function indicates that RLC SNs of RLC PDUs or RLC SDUs received by the RLC layer are sequentially ordered and data is transferred to the PDCP layer in ascending order of the RLC SNs. According to the in-sequence delivery function, when a RLC SN gap occurs such that a RLC SN is lost, the RLC layer configures and transmits a RLC status report about the lost RLC SN so as to request retransmission, and even when a RLC SDU or a RLC PDU whose SN is greater than the lost RLC SN is received, the RLC SDU or the RLC PDU is not transferred to the PDCP layer but is stored in a buffer, and when the lost RLC SN is received, data is transferred to the PDCP layer in ascending order of the RLC SNs.

To enhance security in a wireless link between a radio node (or a radio node to which a UE accesses or the UE) and an uppermost radio node (or a radio node), the newly-defined RRC message or the RRCConnectionReconfiguration message (or the separate newly-defined RRC message or the RRCResume message) may configure separate PDCP layers in the radio node (or the radio node to which the UE accesses or the UE) and the uppermost radio node (or the radio node), the separate PDCP layers being for respective bearers or RLC channels, and may configure the separate PDCP layers to configure and use a ciphering and deciphering procedure and/or to configure and use an integrity protection and verification procedure. Here, default configuration may be in a manner that the separate PDCP layers are not configured for respective bearers or RLC channels, the separate PDCP layers being for the wireless link between the radio node (or the radio node to which the UE accesses or the UE) and the uppermost radio node (or the radio node). That is, only when the separate PDCP layers are configured for the bearers or the RLC channels, respectively, the separate PDCP layers may be used for enhancement of security. As another method, because data ciphering is already performed by a PDCP layer, the separate PDCP layer may be configured for only integrity protection and verification, and an interface between nodes of wireless backhauls may be configured not to have a limit in a data transmission rate with respect to integrity protection and verification and may be configured with the integrity protection and verification when necessary.

The newly-defined RRC message or the RRCConnectionReconfiguration message may include configuration information of a DRB to process user data. The UE or the child IAB node may configure the DRB by applying the configuration information, and may transmit a newly-defined RRC message or an RRCConnectionReconfigurationComplete message to the parent IAB node (2f-35). After the parent IAB node completes DRB configuration with respect to the UE or the child IAB node, the parent IAB node may transmit an INITIAL CONTEXT SETUP COMPLETE message to the AMF or the MME and may complete connection.

When the aforementioned procedure is completed, the UE or the child IAB node transmits and receives data to and from the parent IAB node through the core network (2f-40). According to an embodiment of the disclosure, a data transmission procedure broadly may consist of 3 steps that are RRC connection configuration, security configuration, and DRB configuration. Also, the parent IAB node may transmit an RRCConnectionReconfiguration message to newly assign, add, or change configuration with respect to the UE or the child IAB node (2f-45).

In the disclosure, a bearer may include a SRB and a DRB. A UM DRB indicates a DRB configured to use a RLC layer operating in an Unacknowledged Mode, and an AM DRB indicates a DRB configured to use a RLC layer operating in an Acknowledged Mode.

Figure 2G:
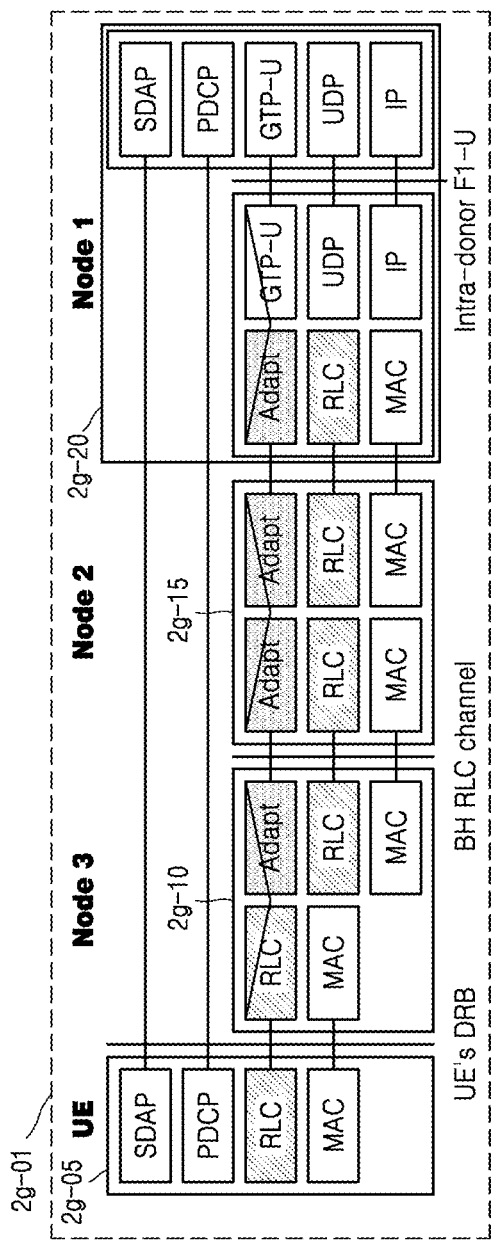
FIG. 2G illustrates a diagram of a protocol layer that each radio node may have in the NR or 5G communication system supporting wireless backhaul, according to an embodiment of the disclosure.

FIG. 2G illustrates a diagram of a protocol layer that each radio node may have in the NR or 5G communication system supporting wireless backhaul, according to an embodiment of the disclosure.

Referring to FIG. 2G, protocol layer architectures of radio nodes supporting wireless backhaul may be broadly divided to two types. The two types may be based on positions of an ADAP layer. A protocol layer architecture may have a protocol layer architecture 2g-01 in which the ADAP layer operates above a RLC layer and a protocol layer architecture 2g-02 (not shown) in which the ADAP layer operates below the RLC layer.

Referring to FIG. 2G, a UE 2g-05 may drive, as the protocol layer, all of a PHY layer, a MAC layer, a RLC layer, a PDCP layer, and a SDAP layer. The radio nodes (e.g., radio nodes, Node3 2g-10 or Node2 2g-15 that perform a wireless backhaul function by receiving and transmitting data between the UE 2g-05 and an IAB donor) may each drive a PHY layer, a MAC layer, a RLC layer, and an ADAP layer. An uppermost radio node (e.g., an uppermost node that is the IAB donor (Node1 2g-20)) that is connected to a core network and thus supports wireless backhaul transmitting data) may drive all of a PHY layer, a MAC layer, a RLC layer, a PDCP layer, and a SDAP layer. The uppermost radio node may be configured of a central unit (CU) and a distributed unit (DU) that are connected in a wired manner. In an embodiment of the disclosure, the CU may drive the SDAP layer and the PDCP layer, and the DU may drive the RLC layer, the MAC layer, and the PHY layer.

The ADAP layer may identify a plurality of bearers of a plurality of UEs and may map the bearers to RLC channels. Also, when the ADAP layer identifies the plurality of bearers of the plurality of UEs, the ADAP layer may group a plurality of items of data according to a UE or a QoS, may map the grouped data to one RLC channel, and may allow the grouped data to be processed. The ADAP layer may decrease overhead by grouping the plurality of items of data to be mapped to one RLC channel, by using a data concatenation function. The data concatenation function may involve configuring one header or a small number of headers for the plurality of items of data, making each data identified by indicating a header field indicating concatenated data, and preventing a header from being unnecessarily configured in each data, thereby decreasing overhead. Also, the ADAP layer may read PDCP SNs of a plurality of items of received data and may calculate COUNT values. Therefore, the ADAP layer may request retransmission based on a COUNT value of lost data and may report a highest COUNT value with respect to a plurality of items of data that are sequentially and successfully received so far. For example, the ADAP layer may indicate the retransmission request or the successfully received COUNT value through an ADAP status report, an ADAP control PDU, or an RRC message.

In the protocol layer architecture 2g-01 as shown in FIG. 2G, the Node3 2g-10 may drive first RLC layers equal to first RLC layers corresponding to data bearers of the UE 2g-05 so as to process data received from the UE 2g-05. Also, an ADAP layer of the Node3 2g-10 may process a plurality of items of data received from a plurality of RLC layers, and thus the Node3 2g-10 may map the plurality of items of data to a new RLC channel and second RLC layers corresponding thereto. Then, the ADAP layer of the Node3 2g-10 may identify a plurality of bearers of a plurality of UEs and may map the bearers to RLC channels. When the ADAP layer identifies the plurality of bearers of the plurality of UEs, the ADAP layer may group a plurality of items of data according to a UE or a QoS, may map the grouped data to one RLC channel, and may allow the second RLC layers to process the grouped data. The RLC channel may be defined as a channel to transfer a plurality of items of data of UEs grouped based on QoS information or may be defined as a channel to transfer data grouped based on each UE.

The Node3 2g-10 may perform a procedure of distributing a UL transmission resource received from a parent IAB node. The Node3 2g-10 may perform a procedure of distributing the UL transmission resource, according to QoS information, a priority order, or a transmittable data amount (e.g., a data amount or tokens, which is allowed for this UL transmission resource) of the RLC channel (or the second RLC layer), or an amount of data with respect to the RLC channel (or the second RLC layer), the data being stored in a buffer. Then, the Node3 2g-10 may perform data transmission on the parent IAB node by using a segmentation function or a concatenation function, the data transmission being with respect to data of each RLC channel.

The first RLC layer indicates a RLC layer that processes a plurality of items of data corresponding to bearers, equally to a RLC layer corresponding to each bearer of the UE 2g-05, and the second RLC layer indicates a RLC layer processing a plurality of items of data that are mapped, by the ADAP layer, based on the UE 2g-05, QoS, or mapping information configured by the parent IAB node.

In the protocol layer architecture 2g-01 as shown in FIG. 2G, the Node2 2g-15 may drive second RLC layers corresponding to second RLC layers of a child IAB node (the Node3 2g-10), and may process data according to a RLC channel.

In the protocol layer architecture 2g-01 as shown in FIG. 2G, the Node1 2g-20 that is the uppermost radio node may drive second RLC layers corresponding to the second RLC layers of a child IAB node (the Node2 2g-15), and may process data according to a RLC channel. Then, the ADAP layer of the Node1 2g-20 that is the uppermost radio node may map a plurality of items of data, which are processed with respect to each RLC channel, to PDCP layers matched with respective bearers of UEs. Then, a PDCP layer of an uppermost radio node corresponding to each bearer of each UE may process a plurality of items of received data, and may transfer the processed data to a SDAP layer, and the SDAP layer may process and transmit the data to the core network.

FIG. 2H-A illustrates a diagram of a method of managing and processing bearers of radio nodes, the method being performed in the NR or 5G mobile communication system supporting wireless backhaul, according to an embodiment of the disclosure.

Referring to FIG. 2H-A, a radio node (e.g., a UE 2h-04) may transmit and receive data to and from an uppermost radio node (e.g., an IAB donor 2h-01) through a Node3 (e.g., an intermediate radio node or an IAB node 2h-03) and a Node2 (e.g., a radio node or an IAB node 2h-02), the IAB donor 2h-01 being connected to a core network.

According to an embodiment of the disclosure, each radio node in a wireless backhaul network may configure a first SRB (an SRB 2h-31, 2h-21, or 2h-11) to establish RRC connection with a parent IAB node. In the intermediate radio node, the first SRB may be connected with a PHY layer, a MAC layer, and an RLC layer, and may be directly connected with a PDCP layer without being connected with an ADAP layer. Also, the first SRB may be used in exchanging an RRC message between two radio nodes connected to one radio link, and the connected PDCP layer may separately perform ciphering and deciphering or integrity protection and integrity verification.

Also, according to an embodiment of the disclosure, the Node3 (e.g., a UE accessed IAB node, the Node 3, or the IAB node 2h-03) to which the UE 2h-04 accesses may configure a second SRB (an SRB 2h-34, 2h-22, or 2h-11) to transmit and receive, via the uppermost radio node (e.g., the Node1 2h-01), a NAS message, data of a F1 interface or an upper layer, or a control message of the upper layer for network configuration with respect to the UE 2h-04. The Node3 2h-03 to which the UE 2h-04 accesses may check an RRC message received via the first SRB, data that should be transmitted to the uppermost radio node (e.g., the Node1 2h-01) or the core network, as the NAS message, the data of the F1 interface or the upper layer, or the control message of the upper, may be transmitted to the Node2 2h-02 via the second SRB, a first RLC bearer or a first RLC channel, and the Node2 2h-02 may transmit the data to the uppermost radio node (e.g., the Node1 2h-01) via the second SRB, the first RLC bearer or the first RLC channel. The uppermost radio node (e.g., the Node1 2h-01) that received the data may transmit the data to the core network, when the uppermost radio node (e.g., the Node1 2h-01) receives response data from the core network, the uppermost radio node (e.g., the Node1 2h-01) may transmit the response data to the Node3 2h-03 via the second SRB, the first RLC bearer or the first RLC channel, and the Node3 2h-03 may transmit the response data to the UE 2h-04 via the first SRB or the second SRB. In intermediate radio nodes (e.g., the Node2 2h-02 or the Node3 2h-03), the second SRB, the first RLC bearer or the first RLC channel may be connected with the PHY layer, the MAC layer, the RLC layer, and the ADAP layer. That is, unlike the first SRB, the second SRB, the first RLC bearer or the first RLC channel may be mapped to a new RLC layer through the ADAP layer and thus may be transferred to a next radio node.

According to an embodiment of the disclosure, the Node3 (e.g., the UE accessed IAB node, the Node 3, or the IAB node 2h-03) to which the UE 2h-04 accesses may generate and manage DRBs to process data received from the UE 2h-04, and DRBs 2h-13, 2h-14, 2h-23, 2h-24, 2h-32, and 2h-3 may be connected with the PHY layer, the MAC layer, the RLC layer, and the ADAP layer. Therefore, the Node3 2h-03 to which the UE 2h-04 accesses may map a plurality of items of data corresponding to a DRB to a new RLC layer through the ADAP layer and may transmit the data to a next radio node. In this regard, to process the plurality of items of data received through the RLC channel from the Node3 2h-03 that is a child IAB node, the intermediate radio node that is the Node2 2h-02 may be connected with the PHY layer, the MAC layer, the RLC layer, and the ADAP layer, thereby transmitting and receiving data.

According to the method of managing and processing bearers of radio nodes according to an embodiment of the disclosure, each radio node performs, by the ADAP layer, a data concatenation function on a plurality of items of data corresponding to DRBs of a UE, and because first SRBs are not connected with the ADAP layer, each radio node does not perform the data concatenation function on data corresponding to the first SRBs.

According to the method of managing and processing bearers of radio nodes according to an embodiment of the disclosure, a security key used in performing a ciphering and integrity protection process on data with respect to the first SRBs may be determined by a parent IAB node or an uppermost radio node of each radio link. That is, the SRBs $2h$-11, $2h$-21, and $2h$-31 may share a same security key, but to enhance security, parent IAB nodes may respectively configure security keys (e.g., the Node3 $2h$-03 may determine a security key for the SRB $2h$-31, and the Node2 $2h$-02 may determine a security key for the SRB $2h$-21). Also, each intermediate radio node does not separately perform ciphering and integrity protection on the second SRB, except for ciphering and integrity protection applied to a NAS message. Also, each intermediate radio node performs ciphering and integrity protection on the first SRB, as described above, but does not separately perform ciphering and integrity protection on DRBs other than the first SRB.

The method of managing and processing bearers of radio nodes according to an embodiment of the disclosure may also define and use a third SRB. The third SRB, a second RLC bearer or a second RLC channel may be used as a control bearer to transmit and receive a control message between each radio node and an uppermost radio node. That is, the bearer for transmitting and receiving a message (e.g., an RRC message or an interface message of an upper layer) may be defined and used, the message being used by the uppermost radio node to directly control each radio node. For example, the uppermost radio node (e.g., the Node1 $2h$-01) and the Node2 $2h$-02 may configure a third SRB and thus may exchange a control message, and the uppermost radio node (e.g., the Node1 $2h$-01) and the Node3 $2h$-03 may configure a third SRB and thus may exchange a control message, wherein the Node2 $2h$-02 may transmit data between the uppermost radio node (e.g., the Node1 $2h$-01) and the Node3 $2h$-03, the data corresponding to the third SRB. The third SRB may perform the same procedure as the first SRB or may have the same protocol layers as the first SRB.

In the disclosure, one radio node has all of an integrated access backhaul-mobile terminal (IAB-MT) and an integrated access backhaul-distributed unit (IAB-DU). That is, according to whether one radio node transmits, receives or processes a certain message, one radio node may be called the IAB-MT or the IAB-DU. Also, a backhaul adaptation protocol (BAP) layer of one radio node may have a unique BAP address of the BAP layer and may have a path identifier that can be used when transmitting data to or receiving data from another radio node. Also, one radio node may be connected with other radio nodes via a plurality of wireless links and thus may receive data at a plurality of ingress links or may transmit data at a plurality of egress links. Also, when the BAP layer transmits data (e.g., a BAP SDU or a BAP PDU) via each wireless link, the BAP layer may perform transmission by transferring the data to a lower layer via one RLC channel from among a plurality of RLC channels. In this regard, routing configuration information of the plurality of ingress links and the plurality of egress links or information about mapping between a plurality of reception RLC channels and a plurality of transmission RCL channels may be configured by a parent IAB node or an uppermost radio node using an RRC message. Also, a BAP header may include a BAP address, the path identifier, a UE bearer identifier, or the like.

In an embodiment of the disclosure, the IAB-MT is not a UE but a radio node. However, as a radio node device, the IAB-MT is a device configured to configure connection to a BS or an upper (parent) radio node (IAB node) and to transmit or receive UL or DL data, like the UE. That is, the IAB-MT is a device for communication among radio nodes. While the IAB-MT operates like the UE, but types of data to be actually processed by the IAB-MT are 2 types. First data may be traffic that forwards data received from a lower IAB node or a UE, and second data may include traffic such as an RRC message a radio node transmits to a parent IAB node so as to configure a radio link, like a UE, and data traffic by which an IAB node configures network configuration or basic configuration information in an implementation manner for operation and management (OAM), the data traffic being generated by a TCP/IP layer or configured based on application layer data or including control messages for an F1 interface. Therefore, for the IAB-MT, a BAP-RLC-MAC bearer (or an RLC channel) for the first data and a RRC-PDCP-RLC-MAC control bearer (or an SRB), an upper layer-PDCP-RLC-MAC data bearer or a F1AP-BAP-RLC-MAC for the second data may be configured and used.

In an embodiment of the disclosure, the IAB-DU is not a UE but a radio node. However, as a radio node device, the IAB-DU is a device configured to configure connection to a UE or a lower (child) IAB node and to transmit or receive UL or DL data, like a BS. However, the IAB-DU does not have a function of generating an RRC message, as the BS having an RRC layer generates an RRC message. In a wireless backhaul network environment, an RRC layer is included only in a CU of an IAB donor. Therefore, when the CU of the IAB donor receives all of the second data, generates an RRC message for connection with the UE or IAB nodes, the second data or a response message with respect to the second data, and transmits the generation result to the IAB-DU, the IAB-DU functions to transmit, like a BS, the RRC message or data or the second data for the OAM. Therefore, the IAB-DU receives the first traffic via a reception BAP-RLC-MAC bearer (or an RLC channel) and forwards it from a reception BAP layer to a transmission BAP layer, and when the IAB-DU transmits or receives the second traffic, the IAB-DU functions to transfer traffic or to receive and transmit a response message corresponding to traffic. The IAB-DU may function as a BS to a UE or a child IAB node, but actually, the IAB-DU functions to transmit data to the CU or receive and transmit data of the CU. Even when a plurality of IAB-MTs establish connection to the IAB-DU, the IAB-DU, as the BS configures connection with a plurality of UEs, may receive respective messages from the IAB-MTs, may transmit the messages to the CU, and may transmit respective response messages corresponding to the messages to the IAB-MTs, such that the IAB-DU may configure connection as the BS does.

In a wireless backhaul (IAB) network described in the disclosure, a UE may include a normal UE such as a Rel-16 UE, a Rel-15 UE or the like, and it is not required for the UE to know whether a wireless backhaul (IAB) network function is used or implemented in a network.

FIG. 2H-B and FIG. 2H-C illustrate a detailed embodiment of FIG. 2H-A, in which different types of data are differently processed or data is processed by different protocol layers and is transmitted, received or transferred in a wireless backhaul (IAB) network environment, according to an embodiment of the disclosure.

In FIG. 2H-B and FIG. 2H-C, a procedure of processing first data or UL data in a wireless backhaul network when a UE transmits the first data or the UL data (data for a service of an application layer) is as shown in 2h-2-01. When a SDAP header for the first data is indicated in a SDAP layer, the UE configures the SDAP header, and when the SDAP header is not indicated, the UE does not configure the SDAP header, and transfers the first data to a PDCP layer. The PDCP layer of the UE applies an integrity verification or ciphering procedure to the first data, configures a PDCP header, transmits the first data with the PDCP header to an RLC layer, and configures an RLC header. A MAC layer of the UE may transmit, to an IAB-node 1 2h-2-10, the first data including a logical channel identifier corresponding to the RLC layer or data length information. A MAC layer or a RLC layer of an IAB-DU in the IAB-node 1 2h-2-10 receives the first data, the MAC layer or the RLC layer of the IAB-DU corresponding to the MAC layer or the RLC layer of the UE. The IAB-node 1 2h-2-10 processes the first data by using a plurality of upper layers (General Packet Radio Service Tunneling Protocol (GTP-U), UDP, IP, Differentiated Service Code Point (DSCP) or the like) so as to transmit the first data to the wireless backhaul network, and transfers the first data to a BAP layer. In this regard, when a transmission link is present in wireless backhaul routing configuration information configured via an RRC message, the transmission link having a destination address or a path identifier which is the same as a BAP address or a BAP path identifier which corresponds to the first data (or a BAP PDU or a BAP SDU), a BAP layer of an IAB-MT may select the transmission link and may determine transmission via the transmission link. However, when the transmission link having the same information is not present in the wireless backhaul routing configuration information, the BAP layer may select a random transmission link. In a case where the BAP layer receives data from an upper layer, when wireless backhaul RLC channel mapping configuration information for a BAP SDU that receives the first data of UL does not exist, the BAP layer may select a default RLC channel. When the wireless backhaul RLC channel mapping configuration information for the BAP SDU exists, the BAP layer may select a RLC channel based on the mapping information. Also, when UL backhaul configuration information or routing information does not exist, the BAP layer may select a default BAP address or a default BAP path identifier which is configured based on an RRC message, may transmit the BAP PDU, and thus may transmit the first data to a IAB-node 2 2h-2-20 via the default RLC channel, a selected RLC channel, or an RLC layer corresponding to the default RLC channel or the selected RCL channel, and a MAC layer. An IAB-DU of the IAB-node 2 2h-2-20 may receive the first data via a MAC layer, an RLC layer (or a RLC channel) or a BAP layer. The IAB-DU may receive the first data (e.g., the BAP PDU) and may identify a BAP address of a BAP header or a BAP path identifier. When the BAP address of the BAP header is a BAP address of the IAB-node 2 2h-2-20, the first data is to be received and processed by the IAB-node 2 2h-2-20, such that the IAB-node 2 2h-2-20 may process the data as the BAP SDU and may transfer the data to an upper layer. When the BAP address of the BAP header is not the BAP address of the IAB-node 2 2h-2-20, the IAB-node 2 2h-2-20 may transfer the first data (or the BAP SDU) to a transmission part of the IAB-node 2 2h-2-20 or the BAP layer of the IAB-MT.

In FIG. 2H-B and FIG. 2H-C, a procedure of processing first data or DL data in a wireless backhaul network when an uppermost radio node transmits the first data or the DL data (data for a service of an application layer) is as shown in 2h-2-01. When a SDAP header for the first data is indicated in a SDAP layer, the uppermost radio node configures the SDAP header, and when the SDAP header is not indicated, the uppermost radio node does not configure the SDAP header, and transfers the first data to a PDCP layer. The PDCP layer applies an integrity verification or ciphering procedure to the first data, configures a PDCP header, processes the first data by using a plurality of upper layers (GTP-U, UDP, IP, DSCP or the like), and transfers the first data to a BAP layer of an IAB-DU. In a case where the BAP layer of the IAB-DU receives the first data from an upper layer, when a transmission link is present in wireless backhaul routing configuration information configured via an RRC message, the transmission link having a destination address, a path identifier or a transmission link (or identifier) which is the same as a BAP address, a BAP path identifier or a transmission link (or identifier) which corresponds to the first data (or a BAP PDU or a BAP SDU), the BAP layer of the IAB-DU may select the transmission link and may determine transmission via the transmission link. However, when the transmission link having the same information is not present in the wireless backhaul routing configuration information, the BAP layer may select a random transmission link. Also, wireless backhaul RLC channel mapping configuration information for a BAP SDU that receives the first data of the UL does not exist in the received BAP SDU, the BAP layer may select a default RLC channel configured due to an RRC message. When the wireless backhaul RLC channel mapping configuration information including a destination address, a path identifier or a transmission link (or identifier) which is the same as the BAP address, the BAP path identifier or the transmission link (or identifier) which corresponds to the first data (or the BAP PDU or the BAP SDU) is configured for the BAP SDU, the BAP layer may select a RLC channel based on the mapping information. Also, when UL backhaul configuration information or routing information is not present, the BAP layer may select a default BAP address or a default BAP path identifier which is configured based on an RRC message, may transmit the BAP PDU and thus may transmit the first data to the IAB-node 2 2h-2-20 via the default RLC channel, the selected RLC channel, or the RLC layer corresponding to the default RLC channel or the selected RLC channel, and the MAC layer. The IAB-MT of the IAB-node 2 2h-2-20 may receive the first data via the MAC layer, the RLC layer (or the RLC channel) or the BAP layer. The IAB-DU may receive the first data (e.g., the BAP PDU) and may identify the BAP address of the BAP header or the BAP path identifier. When the BAP address of the BAP header is the BAP address of the IAB-node 2 2h-2-20, the first data is to be received and processed by the IAB-node 2 2h-2-20, such that the IAB-node 2 2h-2-20 may process the data as the BAP SDU and may transfer the data to an upper layer. When the BAP address of the BAP header is not the BAP address of the IAB-node 2 2h-2-20, the IAB-node 2 2h-2-20 may transfer the first data (or the BAP SDU) to a transmission part of the IAB-node 2 2h-2-20 or the BAP layer of the IAB-MT. When a transmission link is present in wireless backhaul routing configuration information configured via an RRC message, the transmission link having a destination address or a path identifier which is the same as a BAP address or a BAP path identifier which corresponds to the first data (or a BAP PDU or a BAP SDU), the BAP layer of the IAB-MT may select the transmission link and may determine transmission via the transmission link. However, when the transmission link having the same information is not present in the wireless backhaul routing configuration information, the BAP layer may select a random transmission link. When the BAP layer selects the transmission link for the first data, the BAP layer checks a transmission RLC channel in wireless backhaul RLC channel mapping information configured based on an RRC message, the transmission RLC channel having a same value as a reception RLC channel of a reception link via which the first data is received, and selects the transmission RLC channel checked with respect to the transmission link. Afterward, the BAP layer may transmit the first data to the IAB-node 1 2h-2-10 via the RLC layer or the MAC layer corresponding to the transmission RLC channel. According to the aforementioned method, the IAB-node 1 2h-2-10 may transmit the first data of a DL to the UE.

In FIG. 2H-B and FIG. 2H-C, a UE (2h-2-02) or an IAB-node 1 (2h-2-03 or 2h-2-03) transmits second data (e.g., an RRC message) or F1 interface message data, a procedure of processing the second data or the F1 interface message data in a wireless backhaul network is as shown in 2h-2-02, 2h-2-03 or 2h-2-04. In an embodiment of the disclosure, an RRC layer of the UE or a radio node configures an RRC message as the second data and transfers the second data to a PDCP layer. The PDCP layer applies an integrity verification or ciphering procedure to the second data, configures a PDCP header, transmits the second data with the PDCP header to a RLC layer, and configures a RLC header, and a MAC layer may transmit, to the IAB-node 1 2h-2-10 or the IAB-node 2 2h-2-20, the second data including a logical channel identifier corresponding to the RLC layer or data length information.

A MAC layer or a RLC layer of an IAB-DU in the IAB-node 1 2h-2-10 or the IAB-node 2 2h-2-20 receives the second data, the MAC layer or the RLC layer of the IAB-DU corresponding to the MAC layer or the RLC layer of the UE. The IAB-node 1 2h-2-10 or the IAB-node 2 2h-2-20 processes the second data by using a plurality of upper layers (GTP-U, UDP, IP, DSCP or the like) so as to transmit the second data to the wireless backhaul network, and transfers the second data to a BAP layer. When a transmission link is present in wireless backhaul routing configuration information configured via an RRC message, the transmission link having a destination address or a path identifier which is the same as a BAP address or a BAP path identifier which corresponds to the second data (or a BAP PDU or a BAP SDU), a BAP layer of an IAB-MT may select the transmission link and may determine transmission via the transmission link. However, when the transmission link having the same information is not present in the wireless backhaul routing configuration information, the BAP layer may select a random transmission link. In a case where the BAP layer of the IAB-MT receives data from an upper layer, when wireless backhaul RLC channel mapping configuration information for a BAP SDU that receives the second data of UL does not exist, the BAP layer may select a default RLC channel configured based on an RRC message. When the wireless backhaul RLC channel mapping configuration information for the BAP SDU exists, the BAP layer may select a RLC channel based on the mapping information. Also, when UL backhaul configuration information or routing information does not exist, the BAP layer may select a default BAP address or a default BAP path identifier which is configured based on an RRC message, may transmit the BAP PDU, and thus may transmit the second data to the IAB-node 2 2h-2-20 via the default RLC channel, a selected RLC channel, or a RLC layer corresponding to the default RLC channel or the selected RCL channel, and a MAC layer. The IAB-DU of the IAB-node 2 2h-2-20 may receive the second data via the MAC layer, the RLC layer (or the RLC channel) or the BAP layer. The IAB-DU may receive the first data (e.g., the BAP PDU) and may identify a BAP address of a BAP header or a BAP path identifier. When the BAP address of the BAP header is a BAP address of the IAB-node 2 2h-2-20, the second data is to be received and processed by the IAB-node 2 2h-2-20, such that the IAB-node 2 2h-2-20 may process the data as the BAP SDU and may transfer the data to an upper layer. When the BAP address of the BAP header is not the BAP address of the IAB-node 2 2h-2-20, the IAB-node 2 2h-2-20 may transfer the second data (or the BAP SDU) to the transmission part of the IAB-node 2 2h-2-20 or the BAP layer of the IAB-MT.

When a transmission link is present in wireless backhaul routing configuration information configured via an RRC message, the transmission link having a destination address, a path identifier or a transmission link (or identifier) which is the same as a BAP address, a BAP path identifier or a selected transmission link (or identifier) which corresponds to the second data (or a BAP PDU or a BAP SDU), the BAP layer of the IAB-MT may select the transmission link and may determine transmission via the transmission link. However, when the transmission link having the same information is not present in the wireless backhaul routing configuration information, the BAP layer may select a random transmission link. When the BAP layer selects the transmission link for the second data, the BAP layer checks a transmission RLC channel, which has a same value as a reception RLC channel of a reception link via which the second data is received, in wireless backhaul RLC channel mapping information that is configured based on an RRC message and includes a destination address, a path identifier or a transmission link (or identifier) which is the same as a BAP address, a BAP path identifier or a selected transmission link (or identifier) which corresponds to the second data (or a BAP PDU or a BAP SDU). The BAP layer may select the transmission RLC channel checked above with respect to the transmission link, and may transmit the second data to an uppermost IAB node 2h-2-30 via a RLC layer or a MAC layer corresponding to the transmission RLC channel. A BAP layer may receive the second data via a MAC layer, a reception RLC channel or a reception RLC layer of an IAB-DU of the uppermost IAB node 2h-2-30. When the BAP address of the BAP header of the second data indicates a BAP address of the uppermost IAB node 2h-2-30, the second data is to be received and processed by the uppermost IAB node 2h-2-30, and thus the second data is processed as a BAP SDU and may be transferred to an upper layer.

Also, as shown in 2h-02-04, in a case where a F1 interface-related message is generated in an IAB node, a BAP layer of an IAB-MT of the IAB node, when a transmission link is present in wireless backhaul routing configuration information configured via an RRC message, the transmission link having a destination address or a path identifier which is the same as a BAP address or a BAP path identifier which corresponds to second data (or a BAP PDU or a BAP SDU), the BAP layer of the IAB-MT may select the transmission link and may determine transmission via the transmission link. Also, in a case where the BAP layer of the IAB-MT receives data from an upper layer, when wireless backhaul RLC channel mapping configuration information for a BAP SDU that receives the F1 interface-related message does not exist, the BAP layer may select a default RLC channel configured based on an RRC message. When the wireless backhaul RLC channel mapping configuration information for the BAP SDU or the F1 interface-related message exists, the BAP layer may select a RLC channel based on the mapping information. Also, when wireless backhaul configuration information or routing information does not exist, the BAP layer may select a default BAP address or a default BAP path identifier which is configured based on an RRC message, may transmit the BAP PDU, and thus may transmit the F1 interface-related message to the IAB-node 2 2h-2-20 via the default RLC channel, a selected RLC channel, or a RLC layer corresponding to the default RLC channel or the selected RCL channel, and a MAC layer.

The IAB-DU of the IAB-node 2 2h-2-20 may receive the F1 interface-related message via the MAC layer, the RLC layer (or the RLC channel) or the BAP layer. The IAB-DU may receive the F1 interface-related message (e.g., a BAP PDU) and may identify a BAP address of a BAP header or a BAP path identifier. When the BAP address of the BAP header is a BAP address of the IAB-node 2 2h-2-20, the F1 interface-related message is to be received and processed by the IAB-node 2 2h-2-20, such that the IAB-node 2 2h-2-20 may process the data as the BAP SDU and may transfer the data to an upper layer. When the BAP address of the BAP header is not the BAP address of the IAB-node 2 2h-2-20, the IAB-node 2 2h-2-20 may transfer the F1 interface-related message (or the BAP SDU) to the transmission part of the IAB-node 2 2h-2-20 or the BAP layer of the IAB-MT. In this regard, when a transmission link is present in wireless backhaul routing configuration information configured via an RRC message, the transmission link having a destination address, a path identifier or a transmission link (or identifier) which is the same as a BAP address, a BAP path identifier or a selected transmission link (or identifier) which corresponds to the F1 interface-related message (or a BAP PDU or a BAP SDU), the BAP layer of the IAB-MT may select the transmission link and may determine transmission via the transmission link. However, when the transmission link having the same information is not present in the wireless backhaul routing configuration information, the BAP layer may select a random transmission link. When the BAP layer selects the transmission link for the F1 interface-related message, the BAP layer may check a transmission RLC channel, which has a same value as a reception RLC channel of a reception link via which the F1 interface-related message is received, in wireless backhaul RLC channel mapping information that is configured based on an RRC message and includes a destination address, a path identifier or a transmission link (or identifier) which is the same as a BAP address, a BAP path identifier or a selected transmission link (or identifier) which corresponds to the F1 interface-related message (or a BAP PDU or a BAP SDU). Afterward, the BAP layer may select the transmission RLC channel checked with respect to the transmission link, and may transmit the F1 interface-related message to the uppermost IAB node 2h-2-30 via an RLC layer or a MAC layer corresponding to the transmission RLC channel. A BAP layer may receive the F1 interface-related message via a MAC layer, a reception RLC channel or a reception RLC layer of the IAB-DU of the uppermost IAB node 2h-2-30. When the BAP address of the BAP header of the F1 interface-related message indicates a BAP address of the uppermost IAB node 2h-2-30, the F1 interface-related message is to be received and processed by the uppermost IAB node 2h-2-30, and thus the F1 interface-related message is processed as a BAP SDU and may be transferred to an upper layer.

Hereinafter, provided is a method for detecting a data error occurrable during data transmission between radio nodes, and defending against an unexpected attack in the NR or 5G communication system supporting wireless backhaul.

Figure 2I:
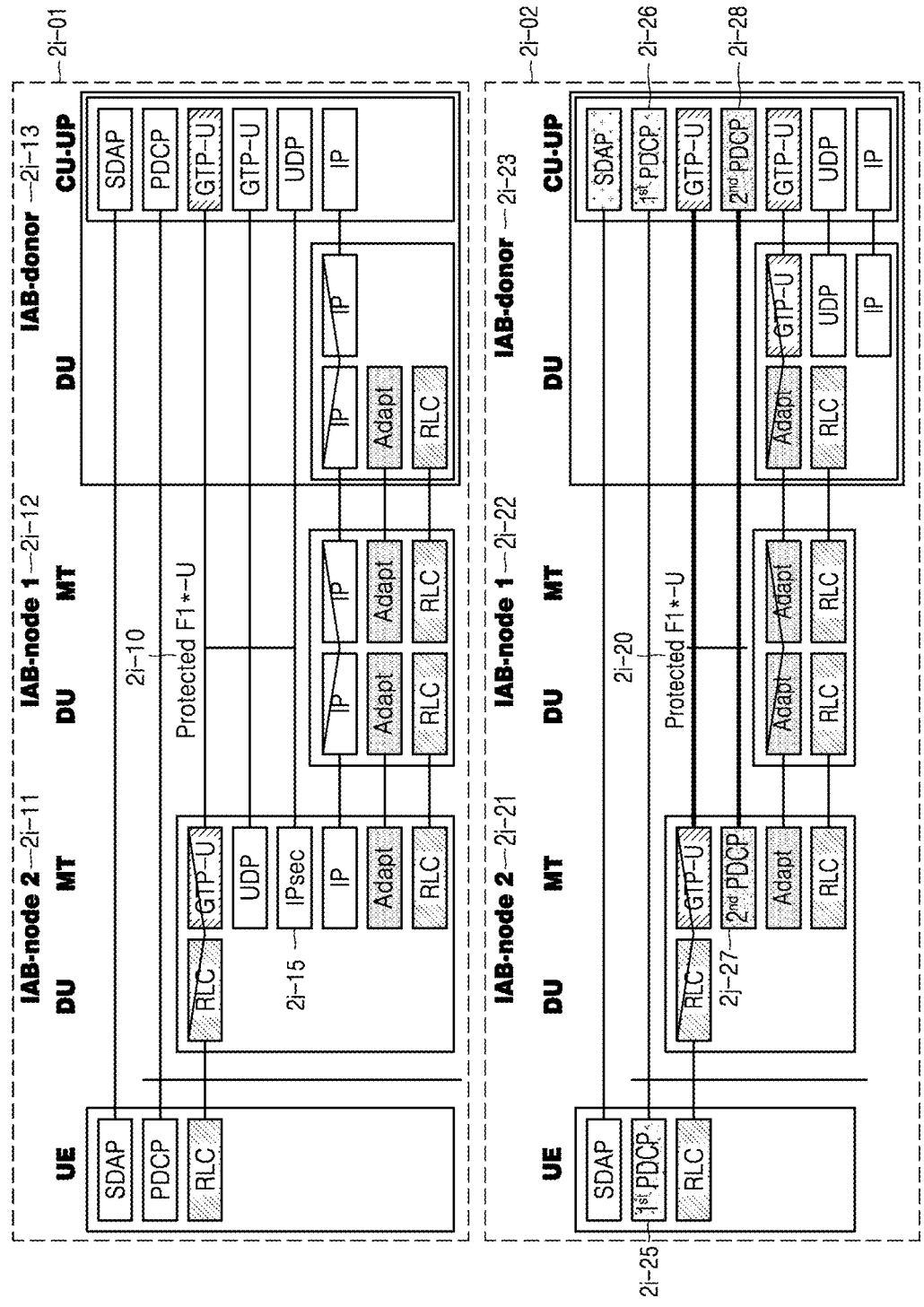
FIG. 2I illustrates a method of enhancing security in a wireless link or a wireless transmission section (e.g., a wireless link between a UE and a radio node, a wireless link between the UE and an uppermost radio node, or a wireless link between a UE-accessed radio node and the uppermost radio node in a wireless backhaul network), according to an embodiment of the disclosure.

FIG. 2I illustrates a method of enhancing security in a wireless link or a wireless transmission section (e.g., a wireless link between a UE and a radio node, a wireless link between the UE and an uppermost radio node, or a wireless link between a UE-accessed radio node and the uppermost radio node in a wireless backhaul network), according to an embodiment of the disclosure.

Referring to FIG. 2I, 2i-01 indicates a first embodiment for enhancing security when data is transmitted via a plurality of radio nodes or a plurality of hops in the wireless transmission section (e.g., the wireless link between the UE and the radio node, the wireless link between the UE and the uppermost radio node, or the wireless link between the UE-accessed radio node and the uppermost radio node in the wireless backhaul network).

In FIG. 2I, an F1 interface may be defined as a wireless link between the uppermost radio node and an end of the UE-accessed radio node (e.g., an interface between 2i-11 and 2i-13 or an interface between 2i-21 and 2i-23), and may include a plurality of radio nodes or a plurality of wireless links.

2i-01 indicates the first embodiment for enhancing security when data is transmitted via a plurality of radio nodes or a plurality of hops in the wireless transmission section (e.g., the wireless link between the UE and the radio node, the wireless link between the UE and the uppermost radio node, or the wireless link between the UE-accessed radio node and the uppermost radio node in the wireless backhaul network). In the first embodiment, each radio node (the UE, the radio node or the uppermost radio node) may configure a separate upper layer (e.g., an IPsec layer), and the separate upper layer may enhance security by configuring and performing a ciphering and deciphering procedure or an integrity protection and verification procedure. That is, to enhance security of an F1 interface 2i-10 between an uppermost node 2i-13 and a UE-accessed radio node 2i-11, each of the uppermost node 2i-13 and the UE-accessed radio node 2i-11 may configure a separate upper layer (e.g., an IPsec layer), may perform deciphering or integrity verification when transmitting data, and then may transmit the data. When the UE-accessed radio node 2i-11 or the uppermost node 2i-13 receives the data, the separate upper layer may perform deciphering or integrity verification, thereby defending against an unexpected attack or checking an error of the data error or integrity of the data.

In this regard, to enhance security of a wireless link between a radio node (or a UE-accessed radio node or a UE) and an uppermost radio node (a radio node), separate layers for the wireless link may be configured respectively for bearers or RLC channels in the radio node (or the UE-accessed radio node or the UE) and the uppermost radio node (the radio node), and may be set to configure and use a ciphering and deciphering procedure or an integrity protection and verification procedure. Therefore, one radio node may configure a separate upper layer with respect to a certain bearer or a certain RLC channel, and may perform a ciphering and deciphering procedure or an integrity protection and verification procedure, whereas the one radio node may not configure a separate upper layer with respect to another bearer or another RLC channel, and may not perform a ciphering and deciphering procedure nor an integrity protection and verification procedure.

Referring to FIG. 2I, 2i-02 indicates a second embodiment for enhancing security when data is transmitted via a plurality of radio nodes or a plurality of hops in a wireless transmission section (e.g., a wireless link between a UE and a radio node, a wireless link between the UE and a uppermost radio node, or a wireless link between a UE-accessed radio node and the uppermost radio node in the wireless backhaul network).

In the second embodiment, each radio node (the UE, the radio node or the uppermost radio node) may configure a separate upper layer (e.g., a separate PDCP layer 2i-27 or 2i-28), and the separate upper layer 2i-27 or 2i-28 may enhance security by configuring and performing a ciphering and deciphering procedure or an integrity protection and verification procedure. That is, to enhance security of an F1 interface 2i-20 between an uppermost node 2i-23 and a UE-accessed radio node 2i-21, each of the uppermost node 2i-13 and the UE-accessed radio node 2i-11 may configure a separate upper layer (e.g., a separate PDCP layer 2i-27 or 2i-28), may perform deciphering or integrity verification when transmitting data, and then may transmit the data. When the UE-accessed radio node 2i-21 or the uppermost node 2i-23 receives the data, the separate upper layer may perform deciphering or integrity verification, thereby defending against an unexpected attack or checking an error of the data error or integrity of the data.

In this regard, to enhance security of a wireless link between a radio node (or a UE-accessed radio node or a UE) and an uppermost radio node (a radio node), the separate layers 2i-27 and 2i-28 for the wireless link may be configured respectively for bearers or RLC channels in the radio node (or the UE-accessed radio node or the UE) and the uppermost radio node (the radio node), and may be set to configure and use a ciphering and deciphering procedure or an integrity protection and verification procedure. Therefore, one radio node may configure a separate upper layer (e.g., the separate layer 2i-27 or 2i-28) with respect to a certain bearer or a certain RLC channel, and may perform a ciphering and deciphering procedure or an integrity protection and verification procedure, whereas the one radio node may not configure a separate upper layer with respect to another bearer or another RLC channel, and may not perform a ciphering and deciphering procedure nor an integrity protection and verification procedure.

In the second embodiment, a radio node (the UE, the UE-accessed radio node or the uppermost radio node) generally does not configure the PDCP layer 2i-27 or 2i-28 above an ADAP layer or another upper layer with respect to data bearers (DRBs), but, to perform ciphering or integrity protection to enhance security of the F1 interface, the radio node may configure the PDCP layer 2i-27 or 2i-28 above an ADAP layer or another upper layer with respect to particular data bearers and may perform a ciphering or integrity protection procedure. The second embodiment may be applied to control bearers (SRBs).

Figure 2J:
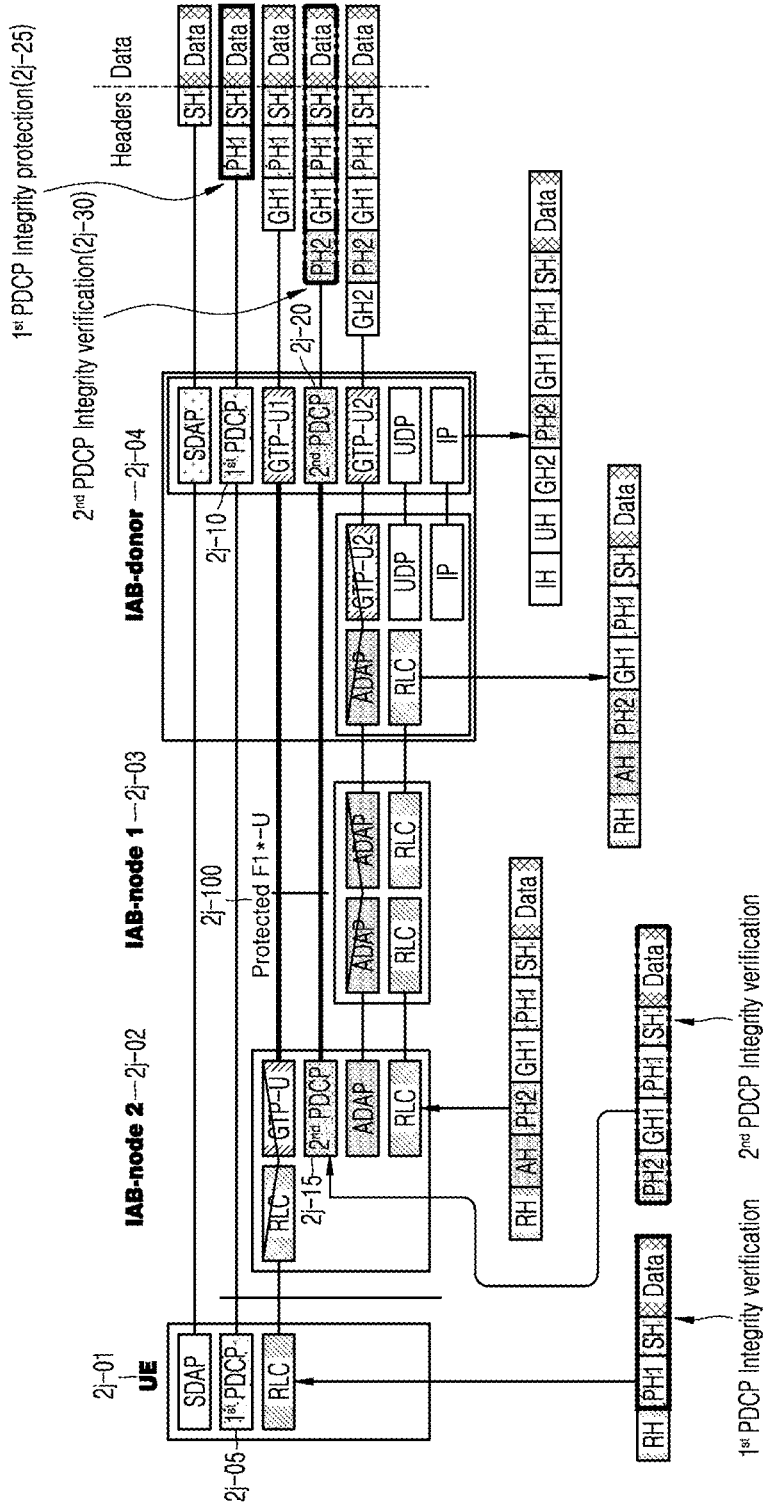
FIG. 2J illustrates a diagram for particularly describing a 2-1 embodiment in which a separate upper layer (e.g., a second PDCP layer) is configured and performs an integrity protection and verification procedure to enhance security of an F1 interface of a wireless transmission section in a wireless backhaul network architecture described above with reference to FIG. 2G, according to an embodiment of the disclosure.

FIG. 2J illustrates a diagram for particularly describing a 2-1 embodiment in which a separate upper layer (e.g., a second PDCP layer) is configured and performs an integrity protection and verification procedure to enhance security of an F1 interface of a wireless transmission section in a wireless backhaul network architecture described above with reference to FIG. 2G, according to an embodiment of the disclosure.

In FIG. 2J, a next-generation mobile communication BS of a wireless backhaul network may include an uppermost radio node 2j-04 and a plurality of intermediate radio nodes 2j-02 and 2j-03, and the uppermost radio node 2j-04 may perform data processing in a MAC layer, an RLC layer or a PDCP layer according to each bearer so as to process data with respect to a UE connected to a network. Also, the intermediate radio nodes 2j-02 and 2j-03 may perform data processing by grouping a plurality of items of data by respective RLC channels according to respective UEs, QoSs or a particular condition, the data being transmitted from a plurality of bearers with respect to a plurality of UEs. An ADAP layer may perform a procedure of dividing the RLC channels and classifying the plurality of items of data.

In FIG. 2J, in transmission of DL (UL) data, an uppermost node (or UE) may perform the transmission in a manner that a first PDCP layer 2j-05 or 2j-10 performs a ciphering procedure or an integrity protection procedure on data of an upper layer corresponding to a first data bearer and transfers the data to a lower layer. As shown in FIG. 2F, when integrity protection is configured in the first PDCP layer 2j-05 or 2j-10 via an RRC message, a data transmission rate may be limited. Therefore, in a general case, the integrity protection may not be configured in the first PDCP layer 2j-05 or 2j-10. When the first PDCP layer 2j-05 receives data, the first PDCP layer 2j-05 may perform deciphering and perform integrity verification when integrity protection is configured.

In FIG. 2J, to enhance security of an F1 interface 2j-100 that is a wireless link between an uppermost node 2j-04 and a UE-accessed radio node 2j-02, the uppermost node 2j-04 and the radio node 2j-02 may configure respective second PDCP layers 2j-20 and 2j-15 for each bearer or each RLC channel. Then, integrity protection may be configured and used in the second PDCP layers 2j-20 and 2j-15. When integrity protection is configured in the second PDCP layer 2j-20, a data transmission rate is not limited. When the integrity protection is configured, the second PDCP layer 2j-20 may perform the integrity protection on data received from an upper layer and a second PDCP header generated by the second PDCP layer 2j-20, performs the integrity protection, calculates data size (e.g., 4 bytes), concatenates MAC-I having a preset size to the end of the data, and transmits the data to a lower layer, such that transmission is performed.

The second PDCP layer 2j-15 receives the data, performs deciphering on the data, and performs integrity verification on the data when the integrity protection is configured. When the second PDCP layer 2j-15 performs the integrity verification, the second PDCP layer 2j-15 performs a calculation for integrity verification and compares generated X-MAC with MAC-I concatenated to the end of the received data. When the integrity verification by the radio node 2j-02 is successful, the radio node 2j-02 removes a header and MAC-I and transfers the received data to an upper layer. When the radio node 2j-02 fails to perform the integrity verification, the radio node 2j-02 may discard the received data. When the data is discarded due to the failure of the integrity verification, because data cannot be lost in the F1 interface 2j-100 even before the data is delivered to a UE, the radio node 2j-02 may request an uppermost radio node or a parent node for data retransmission. A request for the data retransmission may be performed in a manner that the lost data is reported and retransmission is requested via an RRC message, a newly-defined PDCP status report, a newly-defined PDCP control PDU, a new indicator of a PDCP status report, a new indicator of a PDCP header, a PDCP data recovery request or a PDCP reestablishment procedure request. When the retransmission is requested, the second PDCP layer 2*j*-20 of a transmitter may retransmit a plurality of items of data corresponding to second PDCP sequence numbers indicated to have been lost.

According to the 2-1 embodiment of the disclosure, a radio node (IAB node) may configure and use a plurality of different types of bearers or RLC channels by transceiving and transferring data in an efficient manner. Also, the radio node may configure different bearers or RLC channels from among a plurality of bearers or RLC channels described below and may use them in a simultaneous or accompanying manner.

First bearer or first RLC channel: The first bearer or the first RLC channel of a radio node may be configured as a channel for exchanging control messages (e.g., an application layer (AP) message) of upper layers between the radio node (IAB node) and an uppermost radio node (IAB donor). Also, to process data transmitted and received via the first bearer or the first RLC channel, upper layers, an ADAP layer, and an RLC layer may be configured and thus may perform data processing. When a bearer or an RLC channel is dedicated or fixed, the data processing may be performed without configuration of the ADAP layer.

Second bearer or second RLC channel: The second bearer or the second RLC channel of a radio node may be configured as a channel for exchanging control messages (e.g., an application layer (AP) message) of upper layers between the radio node (IAB node) and an uppermost radio node (IAB donor). Also, to process data transmitted and received via the second bearer or the second RLC channel, upper layers, an ADAP layer, and an RLC layer may be configured and thus may perform data processing. When a bearer or an RLC channel is dedicated or fixed, the data processing may be performed without configuration of the ADAP layer. Also, to enhance security of the control messages between the upper layers of the radio node (IAB node) and the upper layers of the uppermost radio node (IAB donor) (e.g., an F1 interface), a separate PDCP layer for application of the 2-1 embodiment may be additionally configured as an upper layer and may perform a ciphering and deciphering procedure or an integrity protection and verification procedure. When a bearer or an RLC channel is dedicated or fixed, data processing may be performed without configuration of an ADAP layer.

Third bearer or third RLC channel: The third bearer or the third RLC channel may be configured and used by the radio node to transmit data of a parent radio node, data of an uppermost radio node or data of a UE to a next radio node. Therefore, the third bearer or the third RLC channel may be configured with an ADAP layer and an RLC layer to process data to be transmitted to the next radio node and thus may perform data processing. Also, because the third bearer or the third RLC channel is designed to transmit data, an RRC layer or a PDCP layer may not be configured in the third bearer or the third RLC channel. The 2-1 embodiment of the disclosure may be applied to the third bearer or the third RLC channel so as to enhance security of a plurality of items of special data to be transmitted.

Fourth bearer or fourth RLC channel: The fourth bearer or the fourth RLC channel may be configured for the radio node to transmit and receive control messages (e.g., RRC messages) to and from a parent radio node (or an uppermost radio node) to establish connection to or access a network. Therefore, to process data for establishing connection to the network, the fourth bearer or the fourth RLC channel may be configured with an RRC layer, a PDCP layer, an ADAP layer, and an RLC layer and thus may perform data processing. Because the fourth bearer or the fourth RLC channel is designed to transmit and receive a control message of which security is important, the RRC layer and the PDCP layer may be configured at the fourth bearer or the fourth RLC channel. When a bearer or an RLC channel is dedicated or fixed, data processing may be performed without configuration of the ADAP layer.

As described above, according to an embodiment of the disclosure, a radio node in a wireless backhaul network may configure and use different bearers or RLC channels so as to efficiently perform an access to a wireless network, transmission of radio data, and use of a wireless network (e.g., a change in a wireless backhaul network topology, etc.). A plurality of configured RLC channels or bearers are configured as combinations of different layers and allow data processing to be effectively performed according to respective objectives. Also, to enhance security, the 2-1 embodiment of the disclosure may be configured in each of the bearers or each of the RLC channels.

Also, when the radio node transmits data, the radio node may identify the data by using a logical channel identifier (e.g., by identifying an upper layer control message with respect to an uppermost radio node, data to be transmitted to a next radio node or an RRC message for a connection access to a network) and may differently map or classify the data to a configured bearer or RLC channel and may transmit the data.

Also, when the radio node receives data via a MAC layer, the radio node identifies the data by using a logical channel identifier (e.g., by identifying an upper layer control message with respect to the uppermost radio node, data to be transmitted to a next radio node or an RRC message for a connection access to a network) and may differently map or classify the data to a configured bearer or RLC channel and may transmit the data to an upper layer.

In an embodiment of the disclosure, to indicate different layers in different bearers for a radio node, an uppermost radio node or a parent radio node may map, to bearer configuration information of an RRC message, a bearer identifier, a logical channel identifier, an RLC channel identifier or QoS flow information together with RRC layer configuration information, PDCP layer information, ADAP layer information, RLC layer information, MAC layer information or SDAP layer information, or may indicate whether to configure each layer, as described with reference to FIG. 2F.

Also, in an embodiment of the disclosure, to configure and use a separate PDCP layer to enhance security of the F1 interface, the radio node may derive a security key by applying one of methods below so as to set the security key to be used in the separate PDCP layer, and may apply and use the security key for an integrity protection and verification algorithm or a ciphering and deciphering algorithm of the separate PDCP layer.

Method 1: When the separate PDCP layer is requested to be configured in a particular bearer or an RLC channel for enhancement of security, the radio node and the parent radio node or the radio node and the uppermost radio node may trigger a ciphering configuration procedure to establish a separately and newly defined ciphering key, and the radio node may be newly configured with the security key from the uppermost radio node or the parent radio node and may apply and use the security key for the integrity protection and verification algorithm or the ciphering and deciphering algorithm of the separate PDCP layer. Therefore, the separate security key different from a security key pre-established by the radio node may be used. For example, the second bearer described above may perform ciphering and deciphering or integrity protection and verification by using a security key different from that of the fourth bearer.

Method 2: When the separate PDCP layer is requested to be configured in a particular bearer or an RLC channel for enhancement of security, the radio node may reuse a ciphering key that has been established when connection between the radio node and the uppermost radio node or the parent radio node was set up. That is, the radio node may apply and use the security key for the integrity protection and verification algorithm or the ciphering and deciphering algorithm of the separate PDCP layer by using the security key pre-established in the radio node. For example, the second bearer described above may perform ciphering and deciphering or integrity protection and verification by using a security key equal to that of the fourth bearer.

Method 3: When the separate PDCP layer is requested to be configured in a particular bearer or an RLC channel for enhancement of security, the radio node may reuse a ciphering key to derive a new security key of the separate PDCP layer, the ciphering key having been established when connection between the radio node and the uppermost radio node or the parent radio node was set up. For example, when driving the security key to be used in a new PDCP layer, the radio node may derive a new ciphering key based on a combination of a pre-established ciphering key and a security indicator for the separate PDCP layer that is newly defined, the new ciphering key being different from an existing ciphering key, and may apply and use the new ciphering key for the integrity protection and verification algorithm or the ciphering and deciphering algorithm of the separate PDCP layer. For example, the second bearer described above may perform ciphering and deciphering or integrity protection and verification by using a security key different from that of the fourth bearer.

Figure 2K:
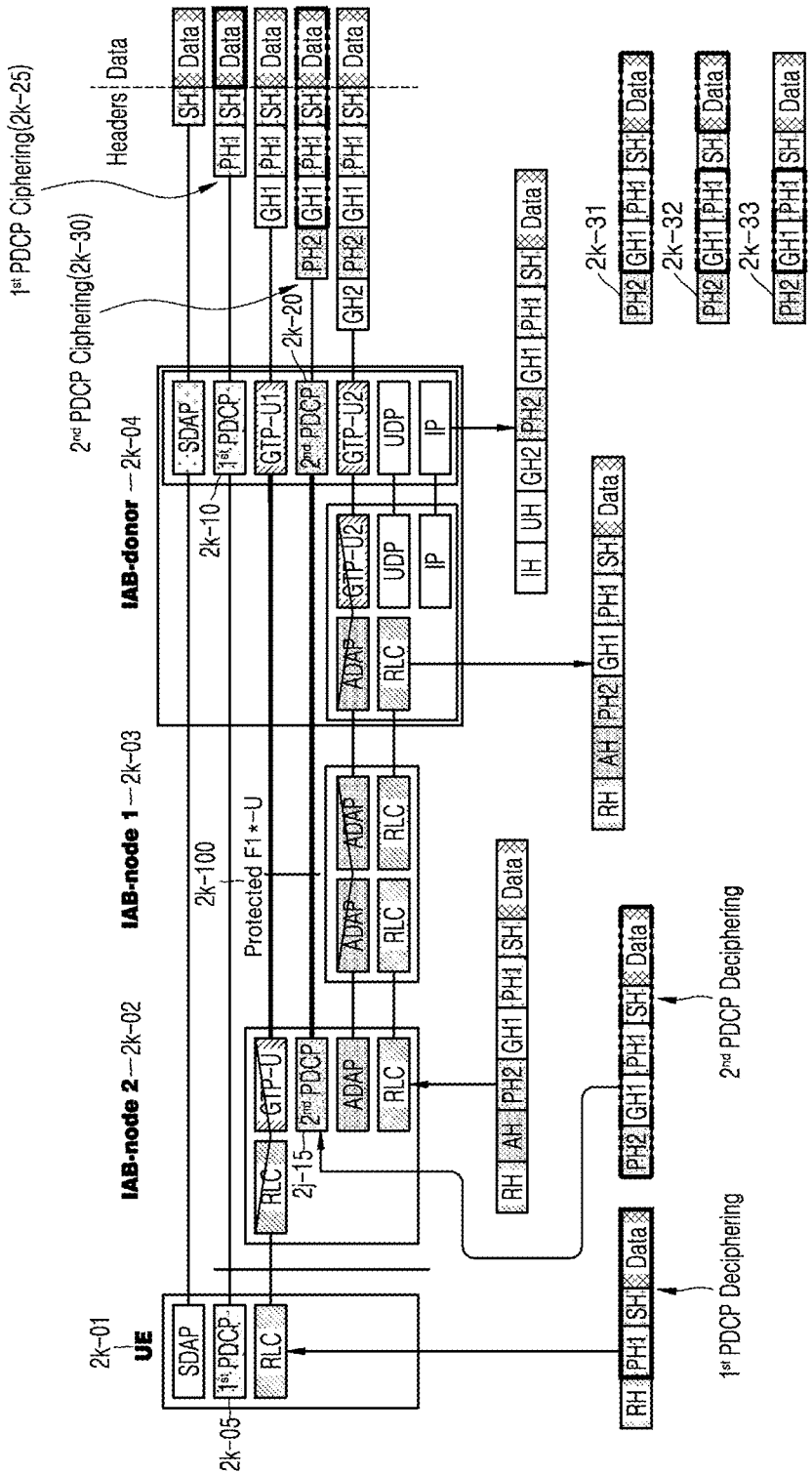
FIG. 2K illustrates a diagram for particularly describing a 2-2 embodiment in which a separate upper layer (e.g., a second PDCP layer) is configured and performs a ciphering and deciphering procedure to enhance security of an F1 interface of a wireless transmission section in a wireless backhaul network architecture described above with reference to FIG. 2G, according to an embodiment of the disclosure.

FIG. 2K illustrates a diagram for particularly describing a 2-2 embodiment in which a separate upper layer (e.g., a second PDCP layer) is configured and performs a ciphering and deciphering procedure to enhance security of an F1 interface of a wireless transmission section in a wireless backhaul network architecture described above with reference to FIG. 2G, according to an embodiment of the disclosure.

In FIG. 2K, a next-generation mobile communication BS of a wireless backhaul network may include an uppermost radio node 2k-04 and a plurality of intermediate radio nodes 2k-02 and 2k-03, and the uppermost radio node 2k-04 may perform data processing in a MAC layer, an RLC layer or a PDCP layer according to each bearer so as to process data with respect to a UE connected to a network. Also, the intermediate radio nodes 2j-02 and 2j-03 may perform data processing by grouping a plurality of items of data by respective RLC channels according to respective UEs, QoSs or a particular condition, the data being transmitted from a plurality of bearers with respect to a plurality of UEs. An ADAP layer may perform a procedure of dividing the RLC channels and classifying the plurality of items of data.

In FIG. 2K, in transmission of DL (UL) data, an uppermost node (or UE) may perform the transmission in a manner that a first PDCP layer 2k-05 or 2k-10 performs a ciphering procedure or an integrity protection procedure on data of an upper layer corresponding to a first data bearer and transfers the data to a lower layer. As shown in FIG. 2F, when integrity protection is configured in the first PDCP layer 2k-05 or 2k-10 via an RRC message, a data transmission rate may be limited. Therefore, in a general case, integrity protection may not be configured in the first PDCP layer 2j-05 or 2j-10. When the first PDCP layer 2k-05 receives data, the first PDCP layer 2k-05 may perform deciphering and perform integrity verification when integrity protection is configured.

In FIG. 2K, to enhance security of an F1 interface 2k-100 that is a wireless link between an uppermost node 2k-04 and a UE-accessed radio node 2k-02, the uppermost node 2k-04 and the radio node 2k-02 may configure respective second PDCP layers 2k-20 and 2k-15 for each bearer or each RLC channel. Then, the ciphering and deciphering procedure may be configured and used in the second PDCP layers 2k-20 and 2k-15. When the second PDCP layer 2k-20 is configured with a ciphering procedure, the second PDCP layer 2k-20 may perform ciphering on data received from an upper layer. In this regard, when the second PDCP layer 2k-20 performs ciphering, the second PDCP layer 2k-20 may apply one of methods below.

First ciphering method (2k-31): ciphering is not allowed for an SDAP header 2k-40 of an SDAP layer in the NR or 5G mobile communication system. However, the first ciphering method is characterized in that the SDAP header 2k-40 is ciphered when a second PDCP layer is configured as a separate PDCP layer so as to enhance security of the F1 interface 2k-100. That is, the second PDCP layer 2k-20 of a transmitter may perform ciphering on complete data (including an SDAP header) received from an upper layer and may transfer the data to a lower layer, thereby performing transmission. The second PDCP layer 2k-15 receives the data, deletes a second PDCP header from the received data, performs a deciphering procedure on the rest of the data and transmits the data to an upper layer. That is, the first ciphering method of enhancing security in the 2-2 embodiment of the disclosure may have characteristics as below when it is applied to a PDCP layer.

In a case where an SDAP layer is configured directly above a currently-configured PDCP layer, when the PDCP layer performs ciphering, the PDCP layer may perform ciphering on data (e.g., a PDCP SDU) except for a SDAP header generated by the SDAP layer, the data being received from an upper layer (the SDAP layer). Also, when the PDCP layer performs deciphering, the PDCP layer may perform deciphering on the data except for the SDAP header, the data being received from a lower layer (in a case of the PDCP layer configured at a UE or a central unit (CU) of an IAB donor).

In a case where the SDAP layer is not configured directly above the currently-configured PDCP layer (e.g., other layers are configured between the SDAP layer and the currently-configured PDCP layer), even when the SDAP header is included in the middle of data received from the upper layer, the PDCP layer does not exclude the SDAP layer and may perform ciphering on data (e.g., a PDCP SDU) including the SDAP header. Also, when a PDCP layer performs deciphering, the PDCP layer may perform deciphering on data including a SDAP header, without excluding the SDAP header, the data being received from the lower layer (in a case of the PDCP layer configured to enhance security of an F1 interface in an IAB node or a distributed unit (DU) of an IAB donor).

As another method, a PDCP layer may perform ciphering on data, except for an SDAP header, only when the data received from an upper layer includes the SDAP header at the front of the data, and may perform deciphering on data, except for an SDAP header, only when the data received from a lower layer includes the SDAP header at the front of the data. When the SDAP header does not exist at the front of the data received from the upper layer (e.g., the SDAP header exists at a position that is not the middle nor the front), the PDCP layer may perform ciphering on the data including the SDAP header, and when the SDAP header does not exist at the front of the data received from the lower layer (e.g., the SDAP header exists at a position that is not the middle nor the front), the PDCP layer may perform deciphering on the data including the SDAP header.

Second ciphering method (2$k$-32): ciphering is not allowed for the SDAP header 2$k$-40 of the SDAP layer in the NR or 5G mobile communication system. Therefore, the second ciphering method is characterized in that the SDAP header 2$k$-40 is not ciphered when a second PDCP layer is configured as a separate PDCP layer so as to enhance security of the F1 interface 2$k$-100. That is, when the second PDCP layer 2$k$-20 of the transmitter performs ciphering on complete data (including an SDAP header) received from an upper layer, the second PDCP layer 2$k$-20 may perform a ciphering procedure on data and a header portion except for the SDAP header and may transfer the data to a lower layer, thereby performing transmission. The second PDCP layer 2$k$-15 may receive the data, may delete a second PDCP header from the received data, may perform a deciphering procedure on the data and the header portion except for the SDAP header and may transmit the data to an upper layer. A second PDCP layer of an uppermost radio node may know a size of a first PDCP header of a first PDCP layer, such that the second PDCP layer may identify the SDAP header and performing ciphering. Also, a header of another upper layer has a length indicator with respect to the header, and thus a size of the header is detectable. The first PDCP header does not include an indicator for a size of the PDCP header, and a size of the PDCP header, as a length of a PDCP sequence number, may be determined to be, for example, two bytes or three bytes. Therefore, the UE-accessed radio node 2$k$-02 that is not configured with the first PDCP layer cannot detect the size of the first PDCP header of the first PDCP layer and thus the radio node 2$k$-02 cannot perform the deciphering procedure on the data and the header portion except for the SDAP header by identifying the SDAP header. Therefore, the uppermost radio node has to indicate, via an RRC message, a length of a first PDCP sequence number or the size of the first PDCP header of the first PDCP layer to the radio node 2$k$-02, according to each bearer or each RLC channel of each UE. As another method, by defining an indicator in the SDAP header, the first PDCP header, a second PDCP header, or another upper layer header, a size of the second PDCP header may be determined to be, for example, two bytes or three bytes.

Third ciphering method (2$k$-33): ciphering is not allowed for the SDAP header 2$k$-40 of the SDAP layer in the NR or 5G mobile communication system. Therefore, the third ciphering method is characterized in that, when a second PDCP layer is configured as a separate PDCP layer so as to enhance security of the F1 interface 2$k$-100, the SDAP header 2$k$-40 is not ciphered and only a header of an upper layer is ciphered. That is, when the second PDCP layer 2$k$-20 of the transmitter performs ciphering on complete data (including an SDAP header) received from the upper layer, the second PDCP layer 2$k$-20 may perform a ciphering procedure on the header of the upper layer, except for the SDAP header and data concatenated to the end of the SDAP header, and may transfer the data to a lower layer, thereby reducing processing complexity due to ciphering (the data concatenated to the end of the SDAP header has been already ciphered by a first PDCP layer). The second PDCP layer 2$k$-15 may receive the data, may delete a second PDCP header from the received data, may perform a deciphering procedure on headers of upper layers except for the SDAP header and the data concatenated to the end of the SDAP header, and may transmit the data to an upper layer. A second PDCP layer of an uppermost radio node may know a size of a first PDCP header of a first PDCP layer, such that the second PDCP layer may identify the SDAP header and performing ciphering. Also, a header of another upper layer has a length indicator with respect to the header, and thus a size of the header is detectable. The first PDCP header does not include an indicator for a size of the PDCP header, and a size of the PDCP header, as a length of a PDCP sequence number, may be determined to be, for example, two bytes or three bytes. Therefore, the UE-accessed radio node 2$k$-02 that is not configured with the first PDCP layer cannot detect the size of the first PDCP header of the first PDCP layer and thus the radio node 2$k$-02 cannot perform the deciphering procedure on the headers of the upper layers except for the SDAP header and the data concatenated to the end of the SDAP header by identifying the SDAP header. Therefore, the uppermost radio node has to indicate, via an RRC message, a length of a first PDCP sequence number or the size of the first PDCP header of the first PDCP layer to the radio node 2$k$-02, according to each bearer or each RLC channel of each UE. As another method, by defining an indicator in the SDAP header, the first PDCP header, a second PDCP header, or another upper layer header, a size of the second PDCP header may be determined to be, for example, two bytes or three bytes.

In the 2-2 embodiment of the disclosure, a ciphering and deciphering procedure with respect to the second PDCP layer has been described but, because data has been already ciphered by the first PDCP layer, even when the second PDCP layer performs ciphering one more time, security enhancement may mainly have an effect on an upper layer header. Therefore, to reduce a data processing load due to the ciphering and deciphering procedure, a second PDCP layer separately configured to enhance security of the F1 interface may be configured with only the integrity protection and verification procedure.

The methods of enhancing security of the F1 interface according to an embodiment of the disclosure may be extensively applied to a method of enhancing security of a wireless link between a UE and an uppermost radio node or a wireless link between the UE and a radio node.

According to the 2-2 embodiment of the disclosure, a radio node (IAB node) may configure and use a plurality of different types of bearers or RLC channels by transceiving and transferring data in an efficient manner. Also, the radio node may configure different bearers or RLC channels from among a plurality of bearers or RLC channels described below and may use them in a simultaneous or accompanying manner.

First bearer or first RLC channel: The first bearer or the first RLC channel of a radio node may be configured as a channel for exchanging control messages (e.g., an application layer (AP) message) of upper layers between the radio node (IAB node) and an uppermost radio node (IAB donor). Also, to process data transmitted and received via the first bearer or the first RLC channel, upper layers, an ADAP layer, and an RLC layer may be configured and thus may perform data processing. When a bearer or an RLC channel is dedicated or fixed, the data processing may be performed without configuration of the ADAP layer.

Second bearer or second RLC channel: The second bearer or the second RLC channel of a radio node may be configured as a channel for exchanging control messages (e.g., an application layer (AP) message) of upper layers between the radio node (IAB node) and an uppermost radio node (IAB donor). Also, to process data transmitted and received via the second bearer or the second RLC channel, upper layers, an ADAP layer, and an RLC layer may be configured and thus may perform data processing. When a bearer or an RLC channel is dedicated or fixed, the data processing may be performed without configuration of the ADAP layer. Also, to enhance security of the control messages between the upper layers of the radio node (IAB node) and the upper layers of the uppermost radio node (IAB donor) (e.g., the F1 interface), a separate PDCP layer for application of the 2-2 embodiment may be additionally configured as an upper layer and may perform a ciphering and deciphering procedure or an integrity protection and verification procedure. When a bearer or an RLC channel is dedicated or fixed, data processing may be performed without configuration of an ADAP layer.

Third bearer or third RLC channel: The third bearer or the third RLC channel may be configured and used by the radio node to transmit data of a parent radio node, data of an uppermost radio node or data of a UE to a next radio node. Therefore, the third bearer or the third RLC channel may be configured with an ADAP layer and an RLC layer to process data to be transmitted to the next radio node and thus may perform data processing. Also, because the third bearer or the third RLC channel is designed to transmit data, an RRC layer or a PDCP layer may not be configured in the third bearer or the third RLC channel. The 2-2 embodiment of the disclosure may be applied to the third bearer or the third RLC channel so as to enhance security of a plurality of items of special data to be transmitted.

Fourth bearer or fourth RLC channel: The fourth bearer or the fourth RLC channel may be configured for the radio node to transmit and receive control messages (e.g., RRC messages) to and from a parent radio node (or an uppermost radio node) to establish connection to or access a network. Therefore, to process data for establishing connection to the network, the fourth bearer or the fourth RLC channel may be configured with an RRC layer, a PDCP layer, an ADAP layer, and an RLC layer and thus may perform data processing. Because the fourth bearer or the fourth RLC channel is designed to transmit and receive a control message of which security is important, the RRC layer and the PDCP layer may be configured at the fourth bearer or the fourth RLC channel. When a bearer or an RLC channel is dedicated or fixed, data processing may be performed without configuration of the ADAP layer.

As described above, according to an embodiment of the disclosure, a radio node in a wireless backhaul network may configure and use different bearers or RLC channels so as to efficiently perform an access to a wireless network, transmission of radio data, and use of a wireless network (e.g., a change in a wireless backhaul network topology, etc.). A plurality of configured RLC channels or bearers are configured as combinations of different layers and allow data processing to be effectively performed according to respective objectives. Also, to enhance security, the 2-2 embodiment of the disclosure may be configured in each of the bearers or each of the RLC channels.

Also, when the radio node transmits data, the radio node may identify the data by using a logical channel identifier (e.g., by identifying an upper layer control message with respect to an uppermost radio node, data to be transmitted to a next radio node or an RRC message for a connection access to a network) and may differently map or classify the data to a configured bearer or RLC channel and may transmit the data.

Also, when the radio node receives data via a MAC layer, the radio node identifies the data by using a logical channel identifier (e.g., by identifying an upper layer control message with respect to the uppermost radio node, data to be transmitted to a next radio node or an RRC message for a connection access to a network) and may differently map or classify the data to a configured bearer or RLC channel and may transmit the data to an upper layer.

In an embodiment of the disclosure, to indicate different layers in different bearers for a radio node, an uppermost radio node or a parent radio node may map, to bearer configuration information of an RRC message, a bearer identifier, a logical channel identifier, an RLC channel identifier or QoS flow information together with RRC layer configuration information, PDCP layer information, ADAP layer information, RLC layer information, MAC layer information or SDAP layer information, or may indicate whether to configure each layer, as described with reference to FIG. 2F.

Also, in an embodiment of the disclosure, to configure and use a separate PDCP layer to enhance security of the F1 interface, the radio node may derive a security key by applying one of methods below so as to set the security key to be used in the separate PDCP layer, and may apply and use the security key for an integrity protection and verification algorithm or a ciphering and deciphering algorithm of the separate PDCP layer.

Method 1: When the separate PDCP layer is requested to be configured in a particular bearer or an RLC channel for enhancement of security, the radio node and the parent radio node or the radio node and the uppermost radio node may trigger a ciphering configuration procedure to establish a separately and newly defined ciphering key, and the radio node may be newly configured with the security key from the uppermost radio node or the parent radio node and may apply and use the security key for the integrity protection and verification algorithm or the ciphering and deciphering algorithm of the separate PDCP layer. Therefore, the separate security key different from a security key pre-established by the radio node may be used. For example, the second bearer described above may perform ciphering and deciphering or integrity protection and verification by using a security key different from that of the fourth bearer.

Method 2: When the separate PDCP layer is requested to be configured in a particular bearer or an RLC channel for enhancement of security, the radio node may reuse a ciphering key that has been established when connection between the radio node and the uppermost radio node or the parent radio node was set up. That is, the radio node may apply and use the security key for the integrity protection and verification algorithm or the ciphering and deciphering algorithm of the separate PDCP layer by using the security key pre-established in the radio node. For example, the second bearer described above may perform ciphering and deciphering or integrity protection and verification by using a security key equal to that of the fourth bearer.

Method 3: When the separate PDCP layer is requested to be configured in a particular bearer or an RLC channel for enhancement of security, the radio node may reuse a ciphering key to derive a new security key of the separate PDCP layer, the ciphering key having been established when connection between the radio node and the uppermost radio node or the parent radio node was set up. For example, when driving the security key to be used in a new PDCP layer, the radio node may derive a new ciphering key based on a combination of a pre-established ciphering key and a security indicator for the separate PDCP layer that is newly defined, the new ciphering key being different from an existing ciphering key, and may apply and use the new ciphering key for the integrity protection and verification algorithm or the ciphering and deciphering algorithm of the separate PDCP layer. For example, the second bearer described above may perform ciphering and deciphering or integrity protection and verification by using a security key different from that of the fourth bearer.

According to embodiments of this disclosure methods of enhancing security by configuring a separate second PDCP layer in each bearer or each RLC channel configured in radio nodes are described, such that security of a plurality of items of data transmitted between the radio nodes may be enhanced. The embodiments of the methods described in the disclosure may be extended to further enhance security between the radio nodes.

To route data among radio nodes, the radio nodes determine routing by using ADAP layers. An ADAP header of each ADAP layer may include a UE bearer identifier, a UE identifier, a routing identifier, a radio node address, QoS information, or the like. Therefore, when such information is changed by a hacker, an error may occur in routing when data is transmitted between the radio nodes, such that the data may not be correctly transmitted to a UE corresponding to a destination address of the data or the data may be lost. Thus, to solve the security problem, embodiments of the disclosure may be extensively applied as below.

For example, a parent radio node or an uppermost radio node may be configured with a separate PDCP layer below an ADAP layer, according to each bearer or each RLC channel configured in a child radio node via an RRC message, and may perform ciphering and deciphering, or integrity protection or integrity verification on an ADAP header or data (e.g., an ADAP SDU). That is, when data is transferred from the ADAP layer to a lower layer, a second PDCP layer configured there below may perform ciphering or integrity protection on the ADAP header or the data (e.g., an ADAP SDU) of the ADAP layer that is an upper layer and may transfer the data to a lower layer, and the data may be transmitted.

Also, when the separate second PDCP layer configured below the ADAP layer receives data from the lower layer, the separate second PDCP layer may perform a deciphering and integrity verification procedure on a plurality of items of data including an ADAP header.

In this regard, each of the parent radio node or the uppermost radio node may selectively activate (or configure) or inactivate (or does not configure) a ciphering and deciphering function or an integrity protection and verification function of the separate second PDCP layer via an RRC message, such that processing complexity of a radio node may be adjusted.

As another method, a ciphering and deciphering procedure may significantly increase data processing complexity of a radio node, such that the parent radio node or the uppermost radio node may configure a separate second light PDCP entity below an ADAP layer according to each bearer or each RLC channel configured for the child radio node via an RRC message, and may perform only integrity protection or integrity verification on an ADAP header or data (e.g., an ADAP SDU). In this regard, the second light PDCP entity may include a PDCP layer that does not perform a ciphering and deciphering procedure causing a processing load. That is, when data is transferred from the ADAP layer to a lower layer, the second light PDCP entity configured there below may perform only integrity protection on an ADAP header or data (e.g., an ADAP SDU) of the ADAP layer that is an upper layer and may transfer the data to a lower layer, and the data may be transmitted.

Also, when the separate second light PDCP entity configured below the ADAP layer receives data from the lower layer, the second light PDCP entity may perform an integrity verification procedure on a plurality of items of data including an ADAP header.

The second light PDCP entity may be implemented in a manner that a ciphering and deciphering function is not set or is inactivated in the second light PDCP entity. As another method, a ciphering and deciphering procedure or an integrity protection and verification procedure may be applied only to an upper layer header (e.g., an ADAP header or an upper layer header), such that complexity may be decreased.

Also, as described above, the second PDCP layer configured below the ADAP layer of the radio node according to each bearer or each RLC channel receives data from a lower layer and performs integrity verification on the data, and in this regard, when the integrity verification fails, the second PDCP layer may regard the data as attack and thus may perform protection by discarding the data. When the integrity verification fails, the second PDCP layer may declare a radio link failure by reporting the failure to an upper layer (e.g., an RRC layer), and may defend against an additional attack by reconfiguring a radio link to another radio node. When an error occurs in a normal packet, not caused by attack, the radio node may notify a transmitter of integrity verification failure and may request retransmission. For example, the radio node may newly define PDCP control data, may modify a previous PDCP status report or may define an indicator of a PDCP header, thereby indicating data loss due to the integrity verification failure or requesting retransmission.

The ADAP layer described in the disclosure may also be called different names including a multi-hop adaptation protocol (MAP) layer, a backhaul adaptation protocol (BAP) layer, and the like. However, only the names are different, and functions of the layers operate in a same manner.

In the disclosure, embodiments of methods of enhancing security by configuring a separate second PDCP layer according to each bearer or each RLC channel configured for a radio node so as to enhance security of a plurality of items of data transmitted between radio nodes (e.g., to enhance security at each hop or to enhance security between ends with respect to an F1 interface) are described.

Hereinafter, instead of the method of configuring the separate second PDCP layer, a method of adding a security enhancement function to the ADAP layer that functions to route data between radio nodes will now be described. That is, to enhance security of a plurality of items of data transmitted between the radio nodes (e.g., to enhance security at each hop or to enhance security between ends with respect to the F1 interface) without a necessity to configure the separate second PDCP layer, provided is a method of adding a function to the ADAP layer to perform ciphering and deciphering, or integrity protection or integrity verification on an ADAP header or data (e.g., an ADAP SDU). As described above, only a function of integrity protection or integrity verification may be introduced to the ADAP layer so as to decrease complexity of implementation of a radio node. Also, a parent radio node or an uppermost radio node may activate (or configure) or inactivate (or does not configure) a ciphering and deciphering function or an integrity protection and verification function.

To route data between the radio nodes, the radio nodes determine routing by using the ADAP layer. The ADAP header generated by the ADAP layer may include a UE bearer identifier, a UE identifier, a routing identifier, a radio node address, QoS information, or the like. Therefore, when such information is changed by a hacker, an error may occur in routing when data is transmitted between the radio nodes, such that the data may not be correctly transmitted to a UE corresponding to a destination address of the data or the data may be lost.

Accordingly, to solve the security problem, the disclosure provides a method of adding a security function to the ADAP layer at each of hops between the radio nodes so as to enhance security of a header (e.g., an ADAP header or an upper layer header) and data (hop-by-hop authentication and protection). The security function may be implemented using methods below.

The ADAP layer may be configured with a ciphering and deciphering algorithm or an integrity protection and verification algorithm, may apply a ciphering and deciphering procedure or an integrity protection and verification procedure to headers (e.g., an ADAP header or upper layer headers) and data, and may transfer, to a lower layer, the headers and the data to which ciphering or integrity protection is applied. With respect to a plurality of items of received data, the ADAP layer may apply a deciphering or integrity verification procedure to a header (e.g., an ADAP header or data) and data, and when the integrity verification fails, the ADAP layer may regard the data as attack and thus may perform a procedure of discarding the data. The ADAP layer may report the integrity verification failure and the attack to an upper layer (e.g., an RRC layer), and then the upper layer may disconnect connection and may indicate configuration of new connection.

In this regard, a ciphering and deciphering procedure may not be configured or may not be added as a function to the ADAP layer, and the ADAP layer may be configured with only the function of integrity protection or integrity verification, such that complexity of implementation of a radio node may be decreased. As another method, a ciphering and deciphering procedure or an integrity protection and verification procedure may be applied only to an upper layer header (e.g., the ADAP header or an upper layer header), such that complexity may be decreased.

In this regard, the ciphering and deciphering algorithm or the integrity protection or verification algorithm may be configured by an upper parent radio node (a parent IAB node) or an uppermost radio node (an IAB donor), and whether to activate (or configure) each function, or a security key (e.g., a public key, a private key, an authentication key, or the like) may also be determined and configured by the upper parent radio node or the uppermost radio node. For example, each radio node may perform a procedure of establishing a security key or a security algorithm (ciphering and deciphering, or integrity protection or integrity verification) with respect to the parent radio node or the uppermost radio node via an RRC message. Also, the security key may be newly assigned by the parent radio node or the uppermost radio node, or when there is a security key that is applied to a PDCP layer connected to an RRC layer and is used by a current radio node, the security key may be configured to be reused (e.g., to be reused by the ADAP layer). As another method, to decrease signaling overhead from each radio node to an uppermost parent radio node, a procedure of establishing a security key or a security algorithm (ciphering and deciphering, or integrity protection or integrity verification), based on a hop-by-hop security association establishment procedure, may be applied and used. Among radio nodes, the security key or the security algorithm (or a security enhancement method) may be newly assigned to a radio node by a parent radio node (or security keys of the radio nodes may be exchanged), or when there is a security key that is applied to a PDCP layer connected to an RRC layer and is used by a current radio node, the security key may be configured to be reused (e.g., to be reused by the ADAP layer).

When the ADAP layer applies an integrity protection or verification procedure to an upper layer header (e.g., the ADAP header or an upper layer header) or data, the ADAP layer may derive and generate a usage value of separate security/authentication code (e.g., token, a checksum field or an MAC-I field) and then may configure and transmit the usage value together with the upper layer header or the data to which integrity protection is applied, such that an ADAP layer of a receiver may perform integrity verification. The ADAP layer of the receiver may perform an integrity verification procedure on the received header or received data (e.g., the receiver derives separate security/authentication code by itself) and may compare the derived separate security/authentication code with the separate security/authentication code included in the received header or received data, thereby checking whether values are equal. When the values are equal, integrity verification may be regarded to be successful, and when the values are different from each other, the integrity verification may be regarded to have failed.

In this regard, the separate security/authentication code may be defined and included in one field of the upper layer header (e.g., the ADAP header) and may be used (or transmitted), and as another method, the separate security/authentication code may be attached to the end of the header or the data to which integrity protection is applied and may be transmitted. The separate security/authentication code may be defined to have a fixed length and thus a length field for indicating a size (or a length) of the separate security/authentication code is not necessary, and because the separate security/authentication code has the fixed length, ADAP layers of a transmitter and a receiver may easily implement a security procedure.

Also, ADAP control data (an ADAP control PDU) may be defined such that a security key (or a part of the security key) may be shared or verified between ADAP layers (radio nodes) by using the ADAP control data, not an RRC message. The ADAP control data may indicate the security key, a radio node identifier, a security algorithm (or method), or the like, may indicate whether reception of the ADAP control data or ADAP layer data is successful, and may include an indicator to activate or inactivate a ciphering and deciphering procedure, or an integrity protection or verification procedure. A security procedure (a ciphering and deciphering procedure, or an integrity protection or verification procedure) may not be applied to the ADAP control data. Also, an ADAP header may include an indicator indicating whether the ADAP layer data is the ADAP control data (the ADAP control PDU) or ADAP user data (an ADAP data PDU).

Also, a new ADAP control PDU or BAP control PDU may be defined to control data flow or network congestion in a wireless backhaul network. For example, when an amount of data stored in a radio node is greater than a certain threshold value but the radio node is not able to perform further transmission, e.g., when it is expected that network congestion is to occur due to a lack of transmission resources, first BAP control data (first BAP control PDU) may be newly defined and generation of the first BAP control data may be triggered. In this regard, the first BAP control data may include information about the amount of data that is stored or is stored without being transmitted, according to each UE, each bearer or each RLC channel, may be transmitted to a radio node, a parent radio node or an uppermost radio node, and thus may indicate a network congestion status as feedback information. The first BAP control data may include information such as an identifier of a UE, an identifier of a bearer of the UE, an identifier of an RLC channel, a BAP address or an identifier of a BAP path which causes network congestion or has a problem, may be transmitted to the radio node, the parent radio node or the uppermost radio node, and thus may indicate the network congestion status. Also, instead of the first BAP control data, a MAC layer may indicate triggering of a buffer status report. In this case, the MAC layer of a radio node may configure a buffer status report as MAC control information, may transmit the buffer status report to a radio node, the parent radio node or the uppermost radio node, and thus may indicate the network congestion status. Also, when an indicator triggering of the first BAP control data is included in BAP control data received from the radio node, the parent radio node or the uppermost radio node, the BAP control data may be triggered and generated. As another method, when indication of triggering of the first BAP control data is configured as a 1-bit indicator of a BAP header of data (a BAP PDU) received from the radio node, the parent radio node or the uppermost radio node, the first BAP control data may be triggered and generated. As another method, a timer may be configured via an RRC message, and whenever the timer expires, the first BAP control data may be periodically triggered and generated, and whenever the first BAP control data is triggered and generated or is transmitted, the timer may restart. When a radio link fails, the radio link is disconnected, or the radio link is changed to another radio node, the timer may stop, may be reset or may be released. Then, the radio node, the parent radio node or the uppermost radio node which received the first BAP control data may adjust network traffic with respect to the radio node. In this regard, when the first BAP control data is generated and configured, an identifier indicating the first BAP control data from among a plurality of items of BAP control data may be included and transmitted. For example, identifiers for identifying second BAP control data and the first BAP control data may be introduced.

Also, a new ADAP control PDU or a BAP control PDU may be defined to report a radio link status or a radio link failure in the wireless backhaul network. For example, when an IAB-MT of a radio node detects a radio link failure (RLF) with respect to the radio node, the parent radio node or the uppermost radio node, an IAB-DU of the radio node may trigger and generate newly-defined second BAP control data, and may indicate occurrence of the RLF to the radio node, the parent radio node or the uppermost radio node. In this regard, the second BAP control data may include an identifier of an address or a path of the radio node at which the RLF occurred, a BAP address, or an indicator of the RLF. Also, because the radio link is failed at the radio node, the radio node may indicate the RLF via the second BAP control data, and may include and transmit, to a radio node or a child radio node, information about a destination address to which data is to be newly transmitted or a link is to be newly established, a BAP address, a path identifier, or the like in the second BAP control data.

When the second BAP control data is received, a BAP layer of an IAB-MT of a radio node that receives the second BAP control data may reroute and transmit or retransmit a plurality of items of data to a new radio link, a radio link that is newly configured, or the radio link or the address indicated by the second BAP control data, the data including data (e.g., a BAP PDU or a BAP SDU) for which successful transmission is not acknowledged by a lower layer (e.g., an RLC layer) or data (e.g., a BAP PDU or a BAP SDU) that is not transferred to the lower layer yet. As another method, the BAP layer of the IAB-MT of the radio node that receives the second BAP control data may re-generate a BAP header with respect to the data including data (e.g., a BAP PDU or a BAP SDU) for which successful transmission is not acknowledged by a lower layer (e.g., an RLC layer) or data (e.g., a BAP PDU or a BAP SDU) that is not transferred to the lower layer yet, may re-generate data (a BAP PDU) whose BAP header including the new radio link, the radio link that is newly configured, the radio link or the address indicated by the second BAP control data, a BAP address or a path identifier, and may reroute and transmit or retransmit the plurality of items of data to the new radio link, the radio link that is newly configured, or the radio link or the address indicated by the second BAP control data. When the second BAP control data is received, a radio node that receives the second BAP control data may re-establish RLC layers or may reset a MAC layer.

Also, in the disclosure, when the parent radio node or the uppermost radio node indicates handover of a radio node via an RRC message, re-configures configuration information of the BAP layer via an RRC message, indicates a RLF via the second BAP control data, is reconfigured with BAP layer configuration information via a handover message or an RRC message or receives the second BAP control data, a radio node (or an RRC layer of the radio node) may indicate a BAP re-establishment procedure with respect to a BAP layer. The BAP re-establishment procedure with respect to the BAP layer may involve reconfiguring, in the BAP layer, mapping configuration information of the RLC channel which is configured in the RRC message or routing configuration information of a radio link. In the BAP re-establishment procedure with respect to the BAP layer, the BAP layer of the IAB-MT of the radio node may re-generate a BAP header with respect to the data including data (e.g., a BAP PDU or a BAP SDU) for which successful transmission is not acknowledged by a lower layer (e.g., an RLC layer) or data (e.g., a BAP PDU or a BAP SDU) that is not transferred to the lower layer yet, may re-generate data (a BAP PDU) whose BAP header including the new radio link, the radio link that is newly configured, the radio link or the address indicated by the second BAP control data, a BAP address or a path identifier, and may reroute and transmit or retransmit the plurality of items of data to the new radio link, the radio link that is newly configured, or the radio link or the address indicated by the second BAP control data or an RRC message. Also, when the BAP re-establishment procedure with respect to the BAP layer is performed, the radio node may re-establish RLC layers or may reset an MAC layer.

In this regard, when the second BAP control data is generated and configured, an identifier indicating the second BAP control data from among a plurality of items of BAP control data may be included and transmitted. For example, identifiers for identifying the second BAP control data and the first BAP control data may be introduced.

Therefore, in the disclosure, when a radio node receives BAP control data in the wireless backhaul network, the radio node may identify whether the BAP control data is the first BAP control data or the second BAP control data by identifying an identifier of the BAP control data, may perform the aforementioned processing or procedure when the received BAP control data is the first BAP control data, and may perform the aforementioned processing or procedure when the received BAP control data is the second BAP control data.

Figure 2L:
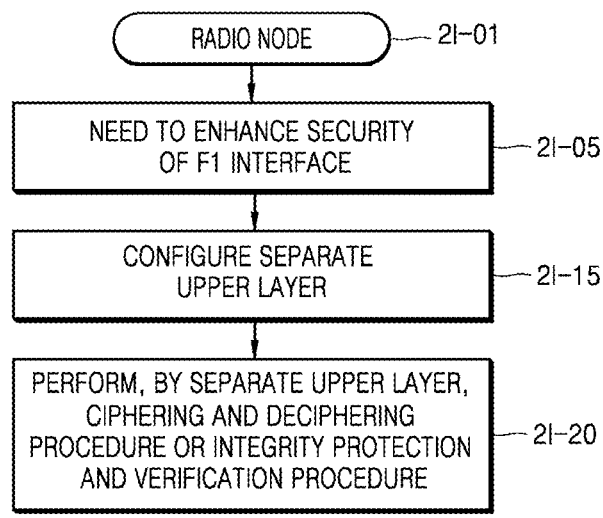
FIG. 2L illustrates a diagram illustrating operations of a radio node (an uppermost radio node, an intermediate node or a UE), according to an embodiment of the disclosure.

FIG. 2L illustrates a diagram of operations of a radio node (an uppermost radio node, an intermediate node or a UE), according to an embodiment of the disclosure.

Referring to FIG. 2L, when it is determined that it is requested to enhance security in a wireless link or a wireless transmission section (e.g., a wireless link between a UE and a radio node, a wireless link between the UE and an uppermost radio node, or a wireless link between a UE-accessed radio node and the uppermost radio node in a wireless backhaul network) (2*l*-05), for example, it is requested to enhance security of an F1 interface, the uppermost radio node may configure a separate upper layer (e.g., an IPsec layer or a second PDCP layer) in radio nodes (e.g., the uppermost radio node and the UE-accessed radio node) at ends of the F1 interface (2*l*-15), and may allow the separate upper layer to configure and perform a ciphering and deciphering procedure or an integrity protection and verification procedure, thereby enhancing security (2*l*-20). When a radio node or an uppermost node receives data, a separate upper layer may perform deciphering or integrity verification, thereby defending against an unexpected attack or checking an error of the data error or integrity of the data.

Figure 2M:
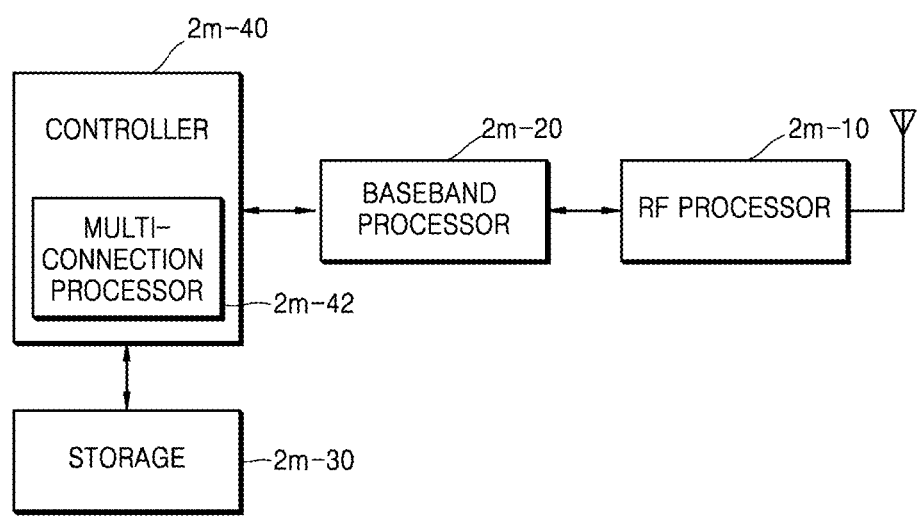
FIG. 2M illustrates a configuration of a UE or a radio node, according to an embodiment of the disclosure.

FIG. 2M illustrates a configuration of a UE or a radio node, according to an embodiment of the disclosure.

Referring to FIG. 2M, the UE includes a RF processor 2*m*-10, a baseband processor 2*m*-20, a storage 2*m*-30, and a controller 2*m*-40.

The RF processor 2*m*-10 may perform functions for transmitting and receiving signals through wireless channels, e.g., band conversion and amplification of the signals. That is, the RF processor 2*m*-10 may up-convert a baseband signal provided from the baseband processor 2*m*-20, into an RF band signal and then may transmit the RF band signal through an antenna, and may down-convert an RF band signal received through the antenna, into a baseband signal. For example, the RF processor 2*m*-10 may include a transmit filter, a receive filter, an amplifier, a mixer, an oscillator, a DAC, an ADC, or the like. Although only one antenna is illustrated in FIG. 2M, the UE may include a plurality of antennas. The RF processor 2*m*-10 may include a plurality of RF chains. In addition, the RF processor 2*m*-10 may perform beamforming. For beamforming, the RF processor 2*m*-10 may adjust phases and powers of signals to be transmitted or received through a plurality of antennas or antenna elements. The RF processor 2*m*-10 may perform a MIMO operation and may receive a plurality of layers in the MIMO operation. The RF processor 2*m*-10 may perform receiving beam sweeping by appropriately configuring a plurality of antennas or antenna elements or may adjust a direction and a beam width of a received beam to coordinate with a transmit beam, by the control of the controller 2*m*-40.

The baseband processor 2*m*-20 may convert between a baseband signal and a bitstream based on physical layer specifications of a system. For example, for data transmission, the baseband processor 2*m*-20 may generate complex symbols by encoding and modulating a transmit bitstream. For data reception, the baseband processor 2*m*-20 may reconstruct a received bitstream by demodulating and decoding a baseband signal provided from the RF processor 2*m*-10. For example, according to an OFDM scheme, for data transmission, the baseband processor 2*m*-20 may generate complex symbols by encoding and modulating a transmit bitstream, may map the complex symbols to subcarriers, and then may configure OFDM symbols by performing an IFFT operation and CP insertion. For data reception, the baseband processor 2*m*-20 may segment a baseband signal provided from the RF processor 2*m*-10, into OFDM symbol units, may reconstruct signals mapped to subcarriers by performing a FFT operation, and then may reconstruct a received bitstream by demodulating and decoding the signals.

The baseband processor 2*m*-20 and the RF processor 2*m*-10 transmit and receive signals as described above. The baseband processor 2*m*-20 and the RF processor 2*m*-10 may also be called a transmitter, a receiver, a transceiver, or a communicator. At least one of the baseband processor 2*m*-20 or the RF processor 2*m*-10 may include a plurality of communication modules to support a plurality of different radio access technologies. At least one of the baseband processor 2*m*-20 or the RF processor 2*m*-10 may include different communication modules to process signals of different frequency bands. For example, the different radio access technologies may include an LTE network, an NR network, or the like. The different frequency bands may include a super-high frequency (SHF) (e.g., 2.2 GHz, 2 GHz) band and a millimeter wave (mmWave) (e.g., 60 GHz) band. The UE may transmit and receive signals to and from a base station by using the baseband processor 2*m*-20 and the RF processor 2*m*-10. In this regard, the signals may include control information and data.

The storage 2*m*-30 may store basic programs, application programs, and data, e.g., configuration information, for operations of the UE. The storage 2*m*-30 may provide the stored data upon request by the controller 2*m*-40. The storage 2*m*-30 may include any or a combination of storage media such as ROM, RAM, a hard disk, a -CD-ROM, and a DVD. The storage 2*m*-30 may include a plurality of memories. In an embodiment of the disclosure, the storage 2*m*-30 may store a program for supporting beam-based cooperative communication.

The controller 2*m*-40 controls overall operations of the UE. For example, the controller 2*m*-40 may transmit and receive signals through the baseband processor 2*m*-20 and the RF processor 2*m*-10. The controller 2*m*-40 may record and read data on or from the storage 2*m*-30. To this end, the controller 2*m*-40 may include at least one processor. For example, the controller 2*m*-40 may include CP for controlling communications and an AP for controlling an upper layer such as an application program. According to an embodiment of the disclosure, the controller 2*m*-40 may include a multi-connection processor 2*m*-42 configured to process a process operating in a multi-connection mode.

Figure 2N:
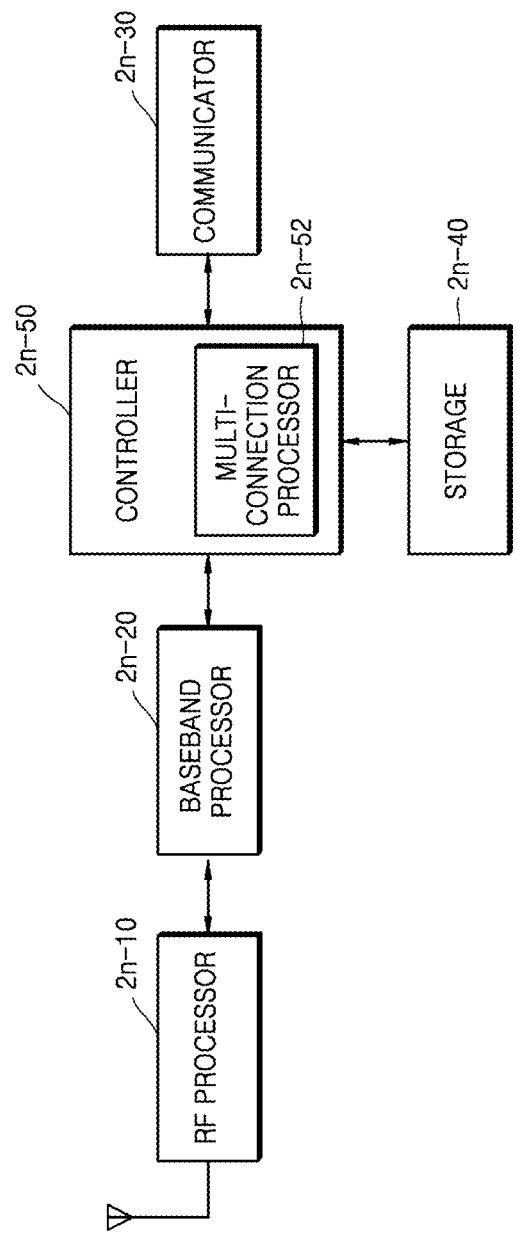
FIG. 2N illustrates a block diagram of a configuration of a transmission/reception point (TRP) device or a radio node in a wireless communication system, according to an embodiment of the disclosure.

FIG. 2N illustrates a block diagram of a configuration of a TRP device or a radio node in a wireless communication system, according to an embodiment of the disclosure.

Referring to FIG. 2N, the TRP device may include an RF processor 2*n*-10, a baseband processor 2*n*-20, a backhaul communicator 2*n*-30 (also referred to as the communicator 2*n*-30), a storage 2*n*-40, and a controller 2*n*-50.

The RF processor 2*n*-10 may perform functions for transmitting and receiving signals through wireless channels, e.g., band conversion and amplification of the signals. That is, the RF processor 2*n*-10 may up-convert a baseband signal provided from the baseband processor 2*n*-20, into an RF band signal and then may transmit the RF band signal through an antenna, and may down-convert an RF band signal received through the antenna, into a baseband signal. For example, the RF processor 2*n*-10 may include a transmit filter, a receive filter, an amplifier, a mixer, an oscillator, a DAC, an ADC, or the like. Although only one antenna is illustrated in FIG. 2N, the TRP device may include a plurality of antennas. The RF processor 2n-10 may include a plurality of RF chains. In addition, the RF processor 2n-10 may perform beamforming. For beamforming, the RF processor 2n-10 may adjust phases and powers of signals to be transmitted or received through a plurality of antennas or antenna elements. The RF processor 2n-10 may perform a DL MIMO operation by transmitting one or more layers.

The baseband processor 2n-20 may convert between a baseband signal and a bitstream based on physical layer specifications of a first wireless access technology. For example, for data transmission, the baseband processor 2n-20 may generate complex symbols by encoding and modulating a transmit bitstream. For data reception, the baseband processor 2n-20 may reconstruct a received bitstream by demodulating and decoding a baseband signal provided from the RF processor 2n-10. For example, according to an OFDM scheme, for data transmission, the baseband processor 2n-20 may generate complex symbols by encoding and modulating a transmit bitstream, may map the complex symbols to subcarriers, and then may configure OFDM symbols by performing an IFFT operation and CP insertion. For data reception, the baseband processor 2n-20 may segment a baseband signal provided from the RF processor 2n-10, into OFDM symbol units, may reconstruct signals mapped to subcarriers by performing a FFT operation, and then may reconstruct a received bitstream by demodulating and decoding the signals. The baseband processor 2n-20 and the RF processor 2n-10 may transmit and receive signals as described above. The baseband processor 2n-20 and the RF processor 2n-10 may also be called a transmitter, a receiver, a transceiver, a communicator or a wireless communicator.

The communicator 2n-30 may provide an interface for communicating with other nodes within a network. The TRP device may transmit and receive signals to and from a UE by using the baseband processor 2n-20 and the RF processor 2n-10. In this regard, the signals may include control information and data.

The storage 2n-40 may store basic programs, application programs, and data, e.g., configuration information, for operations of the TRP device. In particular, the storage 2n-40 may store, for example, information about bearers assigned for a connected UE and measurement results reported from the connected UE. The storage 2n-40 may store criteria information used to determine whether to provide or release dual connectivity to or from the UE. The storage 2n-40 may provide the stored data upon request by the controller 2n-50. The storage 2n-40 may include any or a combination of storage media such as ROM, RAM, a hard disk, a CD-ROM, and a DVD. The storage 2n-40 may include a plurality of memories. In an embodiment of the disclosure, the storage 2n-40 may store a program for supporting beam-based cooperative communication.

The controller 2n-50 may control overall operations of the TRP device. For example, the controller 2n-50 may transmit and receive signals through the baseband processor 2n-20 and the RF processor 2n-10, or the backhaul communicator 2n-30. The controller 2n-50 may record and read data on or from the storage 2n-40. To this end, the controller 2n-50 may include at least one processor. According to an embodiment of the disclosure, the controller 2n-50 may include a multi-connection processor 2n-52 configured to process a process operating in a multi-connection mode.

The methods according to embodiments of the disclosure as described in the specification or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to embodiments of the disclosure as described the specification or in the following claims.

The programs (e.g., software modules or software) may be stored in non-volatile memory including RAM or flash memory, ROM, electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), and a storage area network (SAN). Such a storage device may access, via an external port, a device performing the embodiments of the disclosure. Furthermore, a separate storage device on the communication network may access the electronic device performing the embodiments of the disclosure.

In the afore-described embodiments of the disclosure, an element or elements included in the disclosure are expressed in a singular or plural form depending on the described embodiments of the disclosure. However, the singular or plural form is selected appropriately for a situation assumed for convenience of description, the disclosure is not limited to the singular or plural form, and an element expressed in a singular form may include a plurality of elements and elements expressed in a plural form may include a single element.

According to the embodiments of the disclosure, a mobile communication system may effectively provide services.

Although the present disclosure has been described with various embodiments, various changes and modifications may be suggested to one skilled in the art. It is intended that the present disclosure encompass such changes and modifications as fall within the scope of the appended claims.

What is claimed is:

1. An integrated Access Backhaul (IAB) node in a wireless communication system, the IAB node comprising:
   a transceiver; and
   at least one controller coupled with the transceiver and configured to:
      configured a second packet data convergence protocol (PDCP) layer;
      configure a first radio bearer and at least one second radio bearer;
      process, at the second PDCP layer, at least one of a control message or data transmitted via the at least second one radio bearer; and
      perform, at the second PDCP layer, ciphering and deciphering process or integrity protection and verification on the control message and the data transmitted through the at least one second radio bearer,
         wherein the first radio bearer is associated with first PDCP layers included in a User Equipment (UE) and an IAB donor node, and wherein the at least one second radio bearer is mapped to a radio link control (RLC) layer through a backhaul adaptation protocol (BAP) layer.

2. The IAB node of claim 1, wherein the second PDCP layer is configured for at least one radio bearer from among the at least one second radio bearer.

3. The IAB node of claim 1, wherein the first radio bearer comprises a signaling radio bearer (SRB) for transmitting and receiving the control message.

4. The IAB node of claim 1,
wherein the at least one second radio bearer comprises at least one of a SRB for transmitting the control message between the IAB node and the IAB donor node, and a data radio bearer (DRB) for transmitting the data to a next IAB node.

5. The IAB node of claim 1, wherein the at least one controller is further configured to:
receive, from an upper node, configuration information about the second PDCP layer; and
configure the second PDCP layer for at least one radio bearer from among the at least one second radio bearer, based on the configuration information.

6. The IAB node of claim 1, wherein the at least one controller is further configured to:
receive a configuration for a new security key for the second PDCP layer, use a preset security key for the IAB node as the new security key, or generate the new security key based on the preset security key for the IAB node.

7. The IAB node of claim 1, wherein the at least one controller is further configured to:
cipher complete data including a service data adaptation protocol (SDAP) header received from an upper layer, cipher data received from the upper layer except for the SDAP header, or cipher a header of the upper layer.

8. The IAB node of claim 1, wherein the at least one controller is further configured to map, at the BAP layer, an RLC channel received by at least one receiving RLC layer to at least one transmitting RLC layer.

9. A communication method performed by an integrated Access Backhaul (IAB) node in a wireless communication system, the communication method comprising:
configuring a second packet data convergence protocol (PDCP) layer;
configuring a first radio bearer and at least one second radio bearer;
processing, at the second PDCP layer, at least one of a control message or data transmitted via the at least one second radio bearer; and
performing, at the second PDCP layer, ciphering and deciphering process or integrity protection and verification on the control message and the data transmitted through the at least one second radio bearer,
wherein the first radio bearer is associated with first PDCP layers included in a User Equipment (UE) and an IAB donor node, and
wherein the at least one second radio bearer is mapped to a radio link control (RLC) layer through a backhaul adaptation protocol (BAP) layer.

10. The communication method of claim 9, wherein the second PDCP layer is configured for at least one radio bearer from among the at least one second radio bearer.

11. The communication method of claim 9,
wherein the first radio bearer comprises a signaling radio bearer (SRB) for transmitting and receiving the control message.

12. The communication method of claim 9,
wherein the at least one second radio bearer comprises at least one of a SRB for transmitting the control message between the IAB node and the IAB donor node, and a data radio bearer (DRB) for transmitting the data to a next IAB node.

13. The communication method of claim 9, further comprising:
receiving, from an upper node, configuration information about the second PDCP layer; and
configuring the second PDCP layer for at least one radio bearer from among the at least one second radio bearer, based on the configuration information.

14. The communication method of claim 9, wherein the processing, at the second PDCP layer, of at least one of the control message or the data transmitted by at least one radio bearer comprises:
receiving a configuration for a new security key for the second PDCP layer, using a preset security key for the IAB node as the new security key, or generating the new security key based on the preset security key for the IAB node.

15. The communication method of claim 9, wherein the processing, at the second PDCP layer, of at least one of the control message or the data transmitted by at least one radio bearer comprises:
ciphering complete data including a service data adaptation protocol (SDAP) header received from an upper layer, ciphering data received from the upper layer except for the SDAP header, or ciphering a header of the upper layer.

16. The communication method of claim 9, further comprising mapping, at the BAP layer, an RLC channel received by at least one receiving RLC layer to at least one transmitting RLC layer.

* * * * *